United States Patent
Wang et al.

(10) Patent No.: US 12,512,065 B2
(45) Date of Patent: Dec. 30, 2025

(54) DISPLAY SUBSTRATE AND DISPLAY APPARATUS

(71) Applicants: Chengdu BOE Optoelectronics Technology Co., Ltd., Sichuan (CN); BOE Technology Group Co., Ltd., Beijing (CN)

(72) Inventors: Xinxin Wang, Beijing (CN); Lu Bai, Beijing (CN); Yang Zhou, Beijing (CN); Song Liu, Beijing (CN); Yi Qu, Beijing (CN); Zhiwen Chu, Beijing (CN); Lei He, Beijing (CN); Peng Xu, Beijing (CN)

(73) Assignees: Chengdu BOE Optoelectronics Technology Co., Ltd., Sichuan (CN); Beijing BOE Technology Development Co., Ltd., Beijing (CN)

( * ) Notice: Subject to any disclaimer, the term of this patent is extended or adjusted under 35 U.S.C. 154(b) by 58 days.

(21) Appl. No.: 18/559,332

(22) PCT Filed: Feb. 22, 2023

(86) PCT No.: PCT/CN2023/077607
§ 371 (c)(1),
(2) Date: Nov. 6, 2023

(87) PCT Pub. No.: WO2024/174118
PCT Pub. Date: Aug. 29, 2024

(65) Prior Publication Data
US 2025/0111828 A1   Apr. 3, 2025

(51) Int. Cl.
*G09G 3/3266* (2016.01)

(52) U.S. Cl.
CPC ... *G09G 3/3266* (2013.01); *G09G 2310/0267* (2013.01); *G09G 2310/0286* (2013.01); *G09G 2310/08* (2013.01); *G09G 2330/021* (2013.01)

(58) Field of Classification Search
CPC ............... G09G 3/3266; G09G 2300/0408
See application file for complete search history.

(56) References Cited

U.S. PATENT DOCUMENTS

2020/0126470 A1   4/2020   Gao et al.
2020/0135764 A1   4/2020   Ha et al.
(Continued)

FOREIGN PATENT DOCUMENTS

CN   108646474 A   10/2018
CN   109147645 A   1/2019
(Continued)

*Primary Examiner* — Kevin M Nguyen
(74) *Attorney, Agent, or Firm* — Ling Wu; Stephen Yang; Ling and Yang Intellectual Property

(57) ABSTRACT

Disclosed are a display substrate and a display apparatus, wherein the display substrate may include a base substrate including a display region and a non-display region, and a drive circuit layer disposed on the base substrate, the drive circuit layer includes a pixel drive circuit located in the display region and a gate drive circuit located in the non-display region; a boundary of the display region includes an arc-shaped boundary, a non-display region located on an outside of the arc-shaped boundary is referred to as a rounded corner region, and the rounded corner region includes a plurality of first regions and at least one second region; the gate drive circuit is configured to provide a drive signal to the pixel drive circuit, and is partially located within a first region, and the second region is located between adjacent first regions.

19 Claims, 48 Drawing Sheets

(56) References Cited

U.S. PATENT DOCUMENTS

| | | | |
|---|---|---|---|
| 2021/0035902 A1* | 2/2021 | Kang | ................... H10D 84/907 |
| 2021/0043147 A1 | 2/2021 | Hao et al. | |
| 2022/0415250 A1 | 12/2022 | Choi et al. | |

FOREIGN PATENT DOCUMENTS

| CN | 110265468 A | 9/2019 |
|---|---|---|
| CN | 209691758 U | 11/2019 |
| CN | 111105741 A | 5/2020 |
| CN | 113808517 A | 12/2021 |
| CN | 114041182 A | 2/2022 |
| KR | 10-2021-0083052 A | 7/2021 |

* cited by examiner

DISPLAY SUBSTRATE AND DISPLAY APPARATUS

CROSS-REFERENCE TO RELATED APPLICATION

The present application is a U.S. National Phase Entry of International Application No. PCT/CN2023/077607 having an international filing date of Feb. 22, 2023, contents of which are hereby incorporated by reference.

TECHNICAL FIELD

The present disclosure relates to, but is not limited to, the field of display technologies, in particular to a display substrate and a display apparatus.

BACKGROUND

An Organic Light Emitting Diode (OLED) and a Quantum dot Light Emitting Diode (QLED) are active light emitting display devices and have advantages such as self-luminescence, a wide viewing angle, a high contrast ratio, low power consumption, an extremely high response speed, lightness and thinness, flexibility, and a low cost. With constant development of display technologies, a flexible display apparatus (Flexible Display) in which an OLED or a QLED is used as a light emitting device and signal control is performed through a Thin Film Transistor (TFT) has become a mainstream product in the field of display at present.

SUMMARY

The following is a summary of subject matters described herein in detail. The summary is not intended to limit the protection scope of claims.

In a first aspect, the present disclosure also provides a display substrate including: a base substrate and a drive circuit layer disposed on the base substrate, the base substrate includes: a display region and a non-display region, the drive circuit layer includes: a pixel drive circuit located in the display region and a gate drive circuit located in the non-display region; a boundary of the display region includes an arc-shaped boundary, and a non-display region located on an outside of the arc-shaped boundary is referred to as a rounded corner region, wherein the rounded corner region includes a plurality of first regions and at least one second region; the gate drive circuit is configured to provide a drive signal to the pixel drive circuit, and is partially located within a first region, the second region is located between adjacent first regions, extension lines of two boundaries of the second region close to two adjacent first regions intersect, and an area of the second region is smaller than that of the first region.

In an exemplary implementation mode, the drive circuit layer further includes: at least one of a dummy register and a dummy via; the second region is provided with the dummy register or the dummy via.

In an exemplary implementation mode, the second region is provided with a dummy via when an included angle between first regions located on two sides of the second region is smaller than a threshold angle; the second region is provided with a dummy register when an included angle between the first regions located on two sides of the second region is larger than the threshold angle.

In an exemplary implementation mode, the threshold angle is about 10 degrees to 14 degrees.

In an exemplary implementation mode, when the drive circuit layer includes a dummy register, a structure of the dummy register is the same as that of a part of the gate drive circuit.

In an exemplary implementation mode, structures of dummy registers in at least two second regions are different.

In an exemplary implementation mode, when the drive circuit layer includes a dummy via, the drive circuit layer further includes: a dummy active layer, an orthographic projection of the dummy via on the base substrate is at least partially overlapped with an orthographic projection of the dummy active layer on the base substrate, and the dummy active layer is exposed.

In an exemplary implementation mode, the display region includes: a plurality of sub-pixels in which a plurality of transistors and vias exposing active layers of the plurality of transistors are provided; a ratio between a sum of areas of all dummy vias located in the second region and an area of the second region is a first ratio, and a ratio between a sum of areas of all vias located in a sub-pixel and an area of the sub-pixel is a second ratio, the first ratio and the second ratio are approximately equal.

In an exemplary implementation mode, a distance between a boundary of the dummy via and a boundary of the dummy active layer exposed by the dummy via is a first distance, and a distance between a boundary of a via and a boundary of an active layer of a transistor exposed by the via is a second distance, the first distance and the second distance is approximately equal.

In an exemplary implementation mode, an area of the dummy via is approximately equal to an area of at least one of the vias.

In an exemplary implementation mode, the boundary of the display region further includes: a straight line boundary connected with the arc-shaped boundary, a non-display region located on an outside of the straight line boundary is referred to as a straight line region, and a part of the gate drive circuit is located in the straight line region; the gate drive circuit includes a plurality of drive circuits, wherein an arrangement direction of a plurality of drive circuits located in the rounded corner region is an extension direction of a boundary of at least one first region close to the second region, and an arrangement direction of a plurality of drive circuits located in the straight line region intersects with an extension direction of the straight line boundary; the first region is provided with a partial circuit of each drive circuit.

In an exemplary implementation mode, the pixel drive circuit includes: a light emitting transistor and a writing transistor, and the plurality of drive circuits include: a light emitting drive circuit and a scan drive circuit, the light emitting drive circuit is electrically connected with the light emitting transistor, the scan drive circuit is electrically connected with the writing transistor, and the scan drive circuit is located on a side of the light emitting drive circuit close to the display region; the light emitting drive circuit includes a plurality of cascaded light emitting shift registers, and the scan drive circuit includes a plurality of cascaded scan shift registers; the first region is provided with one light emitting shift register and at least one scan shift register.

In an exemplary implementation mode, the drive circuit layer further includes: a light emitting initial signal line, a first light emitting clock signal line, a second light emitting clock signal line, a first light emitting power supply line, a second light emitting power supply line, a scan initial signal line, a first scan clock signal line, a second scan clock signal line, a first scan power supply line, and a second scan power supply line that are located in the non-display region; the light emitting drive circuit is electrically connected with the light emitting initial signal line, the first light emitting clock signal line, the second light emitting clock signal line, the first light emitting power supply line, and the second light emitting power supply line, respectively, and is located between the first light emitting power supply line and the second light emitting power supply line; the scan drive circuit is electrically connected with the scan initial signal line, the second scan clock signal line, the first scan clock signal line, the first scan power supply line, and the second scan power supply line, respectively, and is located between the first scan power supply line and the second scan power supply line; the second light emitting clock signal line is located on a side of the light emitting initial signal line close to the display region, the first light emitting clock signal line is located on a side of the second light emitting clock signal line close to the display region, the second light emitting power supply line is located on a side of the first light emitting clock signal line close to the display region, the first light emitting power supply line is located on a side of the second light emitting power supply line close to the display region, the scan initial signal line is located on a side of the first light emitting power supply line close to the display region, the second scan clock signal line is located on a side of the scan initial signal line close to the display region, the first scan clock signal line is located on a side of the scan initial signal line close to the display region, the second scan power supply line is located on a side of the first scan clock signal line close to the display region, and the first scan power supply line is located on a side of the second scan power supply line close to the display region.

In an exemplary implementation mode, a first signal line located in the straight line region has a shape of a straight line and an extension direction is the same as the extension direction of the straight line boundary, the first signal line is any one of the light emitting initial signal line, the first light emitting clock signal line, the second light emitting clock signal line, the first light emitting power supply line, the second light emitting power supply line, the scan initial signal line, the first scan clock signal line, the second scan clock signal line, the first scan power supply line, and the second scan power supply line; a first signal line located in the rounded corner region has a shape of a bending line and is composed of a plurality of straight line segments, an extension direction of a straight line segment is the same as an extension direction of a boundary of a first region or the second region where the straight line segment is located away from the display region.

In an exemplary implementation mode, the light emitting shift register includes a plurality of light emitting transistors and a plurality of light emitting capacitors, the scan shift register includes a plurality of scan transistors and a plurality of scan capacitors, the light emitting capacitors and the scan capacitors each include a first electrode plate and a second electrode plate, and the drive circuit layer includes: a semiconductor layer, a first conductive layer, a second conductive layer, and a third conductive layer stacked sequentially; the semiconductor layer at least includes: active layers of the plurality of light emitting transistors and active layers of the plurality of scan transistors; the first conductive layer at least includes: control electrodes of the plurality of light emitting transistors, first electrode plates of the plurality of light emitting capacitors, control electrodes of the plurality of scan transistors, and first electrode plates of the plurality of scan capacitors; the second conductive layer at least includes second electrode plates of the plurality of light emitting capacitors and second electrode plates of the plurality of scan capacitors; the third conductive layer at least includes the light emitting initial signal line, the first light emitting clock signal line, the second light emitting clock signal line, the first light emitting power supply line, the second light emitting power supply line, the scan initial signal line, the first scan clock signal line, the second scan clock signal line, the first scan power supply line, and the second scan power supply line, first electrodes and second electrodes of the plurality of light emitting transistors, and first electrodes and second electrodes of the plurality of scan transistors.

In an exemplary implementation mode, when the second region includes a dummy register, the dummy register includes: at least one of a dummy light emitting shift register and a dummy scan shift register; the dummy light emitting shift register is electrically connected with at least one of the first light emitting power supply line and the second light emitting power supply line, and is located between the first light emitting power supply line and the second light emitting power supply line, and the dummy scan shift register is electrically connected with at least one of the first scan power supply line and the second scan power supply line, and is located between the first scan power supply line and the second scan power supply line.

In an exemplary implementation mode, an orthographic projection of the dummy light emitting shift register on the base substrate is not overlapped with orthographic projections of the light emitting initial signal line, the first light emitting clock signal line, and the second light emitting clock signal line on the base substrate; an orthographic projection of the dummy scan shift register on the base substrate is not overlapped with orthographic projections of the scan initial signal line, the first scan clock signal line, and the second scan clock signal line on the base substrate.

In an exemplary implementation mode, a quantity of transistors of the dummy light emitting shift register is less than a quantity of transistors of the light emitting shift register, and a quantity of transistors of the dummy scan shift register is less than or equal to a quantity of transistors of the scan shift register.

In an exemplary implementation mode, the dummy light emitting shift register includes at least one dummy light emitting transistor, and the dummy scan shift register includes at least one dummy scan transistor; the semiconductor layer further includes an active layer of the at least one dummy light emitting transistor and an active layer of the at least one dummy scan transistor; the first conductive layer further includes: a control electrode of the at least one dummy light emitting transistor and a control electrode of the at least one dummy scan transistor; the second conductive layer further includes a first electrode and a second electrode of the at least one dummy light emitting transistor, and a first electrode and a second electrode of the at least one dummy scan transistor.

In an exemplary implementation mode, the pixel drive circuit includes: a light emitting transistor, a writing transistor, and a control transistor, the plurality of drive circuits include a light emitting drive circuit, a control drive circuit, and a scan drive circuit, the light emitting drive circuit is electrically connected with the light emitting transistor, the scan drive circuit is electrically connected with the writing transistor, and the control drive circuit is electrically connected with the control transistor, transistor types of the writing transistor and the control transistor are opposite, the control drive circuit is located on a side of the light emitting drive circuit close to the display region, and the scan drive circuit is located on a side of the control drive circuit close to the display region; the light emitting drive circuit includes a plurality of cascaded light emitting shift registers, the control drive circuit includes a plurality of cascaded control shift registers, and the scan drive circuit includes a plurality of cascaded scan shift registers; the first region is provided with one light emitting shift register, at least one control shift register, and at least one scan shift register.

In an exemplary implementation mode, the drive circuit layer further includes: a light emitting initial signal line, a first light emitting clock signal line, a second light emitting clock signal line, a first light emitting power supply line, a second light emitting power supply line, a third light emitting power supply line, a control initial signal line, a first control clock signal line, a second control clock signal line, a first control power supply line, a second control power supply line, a third control power supply line, a scan initial signal line, a first scan clock signal line, a second scan clock signal line, a first scan power supply line, and a second scan power supply line that are located in the non-display region; the light emitting drive circuit is electrically connected with the light emitting initial signal line, the first light emitting clock signal line, the second light emitting clock signal line, the first light emitting power supply line, the second light emitting power supply line, and the third light emitting power supply line, and an orthographic projection of the light emitting drive circuit on the base substrate is partially overlapped with orthographic projections of the first light emitting clock signal line, the second light emitting clock signal line, the first light emitting power supply line, and the third light emitting power supply line on the base substrate, the control drive circuit is electrically connected with the control initial signal line, the first control clock signal line, the second control clock signal line, the first control power supply line, the second control power supply line, and the third control power supply line respectively, the control drive circuit is located between the second control clock signal line and the control initial signal line, and an orthographic projection of the control drive circuit on the base substrate is partially overlapped with orthographic projections of the first control power supply line, the second control power supply line, and the third control power supply line on the base substrate, the scan drive circuit is electrically connected with the scan initial signal line, the first scan clock signal line, the second scan clock signal line, the first scan power supply line, and the second scan power supply line respectively, and is located between the first scan power supply line and the second scan power supply line; the second light emitting clock signal line is located on a side of the second light emitting power supply line close to the display region, the first light emitting clock signal line is located on a side of the second light emitting clock signal line close to the display region, the first light emitting power supply line is located on a side of the first light emitting clock signal line close to the display region, the third light emitting power supply line is located on a side of the first light emitting power supply line close to the display region, the second control clock signal line is located on a side of the third light emitting power supply line close to the display region, the first control clock signal line is located on a side of the second light emitting power supply line close to the display region, the second control power supply line is located on a side of the first control clock signal line close to the display region, the first control power supply line is located on a side of the second control power supply line close to the display region, the light emitting initial signal line is located on a side of the first control power supply line close to the display region, the control initial signal line is located on a side of the light emitting initial signal line close to the display region, the scan initial signal line is located on a side of the control initial signal line close to the display region, the second scan clock signal line is located on a side of the scan initial signal line close to the display region, the first scan clock signal line is located on a side of the scan initial signal line close to the display region, the second scan power supply line is located on a side of the first scan clock signal line close to the display region, the first scan power supply line is located on a side of the second scan power supply line close to the display region, and an orthographic projection of the second control power supply line on the base substrate is at least partially overlapped with an orthographic projection of the third control power supply line on the base substrate.

In an exemplary implementation mode, a second signal line located in the straight line region has a shape of a straight line and an extension direction is the same as the extension direction of the straight line boundary; the second signal line is any one of the light emitting initial signal line, the first light emitting clock signal line, the second light emitting clock signal line, the first light emitting power supply line, the second light emitting power supply line, the third light emitting power supply line, the control initial signal line, the first control clock signal line, the second control clock signal line, the first control power supply line, the second control power supply line, the third control power supply line, the scan initial signal line, the first scan clock signal line, the second scan clock signal line, the first scan power supply line, and the second scan power supply line; a second signal line located in the rounded corner region has a shape of a bending line and is composed of a plurality of straight line segments, an extension direction of a straight line segment is the same as an extension direction of a boundary of a first region or the second region where the straight line segment is located away from the display region.

In an exemplary implementation mode, the light emitting shift register includes a plurality of light emitting transistors and a plurality of light emitting capacitors, the control shift register includes a plurality of control transistors and a plurality of control capacitors, the scan shift register includes a plurality of scan transistors and a plurality of scan capacitors, the light emitting capacitors, the control capacitors, and the scan capacitors each include a first electrode plate and a second electrode plate, and the drive circuit layer includes: a semiconductor layer, a first conductive layer, a second conductive layer, a third conductive layer, and a fourth conductive layer stacked sequentially; the semiconductor layer at least includes active layers of the plurality of light emitting transistors, active layers of the plurality of control transistors, and active layers of the plurality of scan transistors; the first conductive layer at least includes control electrodes of the plurality of light emitting transistors, first electrode plates of the plurality of light emitting capacitors, control electrodes of the plurality of control transistors, first electrode plates of the plurality of control capacitors, control electrodes of the plurality of scan transistors, and first electrode plates of the plurality of scan capacitors; the second conductive layer at least includes second electrode plates of the plurality of light emitting capacitors, second electrode plates of the plurality of control capacitors, and second electrode plates of the plurality of scan capacitors; the third conductive layer at least includes the second light emitting power supply line, the first control clock signal line, the second control clock signal line, the third control power supply line, the light emitting initial signal line, the control initial signal line, the scan initial signal line, the first scan clock signal line, the second scan clock signal line, the first scan power supply line, the second scan power supply line, first electrodes and second electrodes of the plurality of light emitting transistors, first electrodes and second electrodes of the plurality of control transistors, and first electrodes and second electrodes of the plurality of scan transistors; the fourth conductive layer at least includes the first light emitting clock signal line, the second light emitting clock signal line, the first light emitting power supply line, the third light emitting power supply line, the first control power supply line, and the second control power supply line.

In an exemplary implementation mode, when the second region includes a dummy register, the dummy register includes: at least one of a dummy light emitting shift register, a dummy control shift register, and a dummy scan shift register; the dummy light emitting shift register is electrically connected with at least one of the first light emitting power supply line and the second light emitting power supply line, and is located between the first light emitting power supply line and the second light emitting power supply line, the dummy control shift register is electrically connected with at least one of the first control power supply line and the second control power supply line, and is located between the first control clock signal line and the control initial signal line, and the dummy scan shift register is electrically connected with at least one of the first scan power supply line and the second scan power supply line, and is located between the first scan power supply line and the second scan power supply line.

In an exemplary implementation mode, an orthographic projection of the dummy light emitting shift register on the base substrate is not overlapped with an orthographic projection of the light emitting initial signal line on the base substrate; an orthographic projection of the dummy control shift register on the base substrate is not overlapped with orthographic projections of the control initial signal line, the first control clock signal line, and the second control clock signal line on the base substrate; an orthographic projection of the dummy scan shift register on the base substrate is not overlapped with orthographic projections of the scan initial signal line, the first scan clock signal line, and the second scan clock signal line on the base substrate.

In an exemplary implementation mode, a quantity of transistors of the dummy light emitting shift register is less than a quantity of transistors of the light emitting shift register, a quantity of transistors of the dummy control shift register is less than a quantity of transistors of the control shift register, and a quantity of transistors of the dummy scan shift register is less than or equal to a quantity of transistors of the scan shift register.

In an exemplary implementation mode, the dummy light emitting shift register includes at least one dummy light emitting transistor, the dummy control shift register includes at least one dummy control transistor, and the dummy scan shift register includes at least one dummy scan transistor; the semiconductor layer further includes an active layer of the at least one dummy light emitting transistor, an active layer of the at least one dummy control transistor, and an active layer of the at least one dummy scan transistor; the first conductive layer further includes a control electrode of the at least one dummy light emitting transistor, a control electrode of the at least one dummy control transistor, and a control electrode of the at least one dummy scan transistor; the second conductive layer further includes a first electrode and a second electrode of the at least one dummy light emitting transistor, a first electrode and a second electrode of the at least one dummy control transistor, and a first electrode and a second electrode of the at least one dummy scan transistor.

In an exemplary implementation mode, the semiconductor layer further includes: a dummy active layer when the second region includes a dummy via; the drive circuit layer further includes a first insulation layer, a second insulation layer, and a third insulation layer which are stacked sequentially, wherein the first insulation layer is located between the semiconductor layer and the first conductive layer, the second insulation layer is located between the first conductive layer and the second conductive layer, and the third insulation layer is located between the second conductive layer and the third conductive layer, and the dummy via is disposed on the first insulation layer, the second insulation layer, and the third insulation layer.

In an exemplary implementation mode, the drive circuit layer further includes: at least one initial power supply line located in the non-display region; the initial power supply line is configured to provide an initial signal to the pixel drive circuit, the initial power supply line is located on a side of the first scan power supply line close to the display region and is located on the third conductive layer.

In a second aspect, the present disclosure also provides a display apparatus, including the above display substrate.

Other aspects may be understood upon reading and understanding drawings and detailed description.

BRIEF DESCRIPTION OF DRAWINGS

Accompanying drawings are used for providing further understanding of technical solutions of the present disclosure, constitute a part of the specification, and are used for explaining the technical solutions of the present disclosure together with the embodiments of the present disclosure, but do not constitute limitations on the technical solutions of the present disclosure. Shapes and sizes of various components in the drawings do not reflect actual scales, but are only intended to schematically illustrate contents of the present disclosure.

DETAILED DESCRIPTION

Figure 1A:
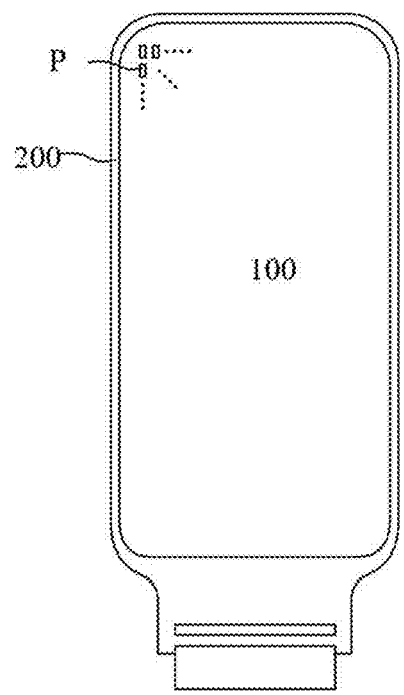
FIG. 1A is a schematic diagram of a structure of a display substrate.

To make objectives, technical solutions, and advantages of the present disclosure clearer, embodiments of the present disclosure will be described in detail with reference to the accompanying drawings. It is to be noted that implementation modes may be implemented in a plurality of different forms. Those of ordinary skills in the art may easily understand such a fact that modes and contents may be transformed into various forms without departing from the purpose and scope of the present disclosure. Therefore, the present disclosure should not be explained as being limited to contents described in following implementation modes only. The embodiments in the present disclosure and features in the embodiments may be combined randomly with each other if there is no conflict. In order to keep following description of the embodiments of the present disclosure clear and concise, detailed description of part of known functions and known components are omitted in the present disclosure. The drawings of the embodiments of the present disclosure only involve structures involved in the embodiments of the present disclosure, and for other structures, reference may be made to conventional designs.

Scales of the drawings in the present disclosure may be used as a reference in actual processes, but are not limited thereto. For example, a width-length ratio of a channel, a thickness and spacing of each film layer, and a width and spacing of each signal line may be adjusted according to actual needs. A quantity of pixels in a display substrate and a quantity of sub-pixels in each pixel are not limited to numbers shown in the drawings. The drawings described in the present disclosure are schematic structural diagrams only, and one mode of the present disclosure is not limited to shapes, numerical values, or the like shown in the drawings.

Ordinal numerals such as "first", "second", and "third" in the specification are set to avoid confusion between constituent elements, but not to set a limit in quantity.

In the specification, for convenience, wordings indicating orientation or positional relationships, such as "middle", "upper", "lower", "front", "back", "vertical", "horizontal", "top", "bottom", "inside", and "outside", are used for illustrating positional relationships between constituent elements with reference to the drawings, and are merely for facilitating the description of the specification and simplifying the description, rather than indicating or implying that a referred apparatus or element must have a particular orientation and be constructed and operated in the particular orientation. Therefore, they cannot be understood as limitations on the present disclosure. The positional relationships between the constituent elements are changed as appropriate according to directions for describing various constituent elements. Therefore, appropriate replacements may be made according to situations without being limited to the wordings described in the specification.

In the specification, unless otherwise specified and defined explicitly, terms "mount", "mutually connect", and "connect" should be understood in a broad sense. For example, a connection may be a fixed connection, or a detachable connection, or an integrated connection; it may be a mechanical connection or an electrical connection; and it may be a direct mutual connection, or an indirect connection through middleware, or internal communication between two elements. Those of ordinary skills in the art may understand specific meanings of these terms in the present disclosure according to specific situations.

In the specification, a transistor refers to an element which at least includes three terminals, i.e., a gate electrode, a drain electrode, and a source electrode. The transistor has a channel region between the drain electrode (drain electrode terminal, drain region, or drain) and the source electrode (source electrode terminal, source region, or source), and a current can flow through the drain electrode, the channel region, and the source electrode. It is to be noted that, in the specification, the channel region refers to a region through which the current mainly flows.

In the specification, a first electrode may be a drain electrode, and a second electrode may be a source electrode; or, the first electrode may be a source electrode, and the second electrode may be a drain electrode. In a case that transistors with opposite polarities are used, in a case that a direction of a current changes during operation of a circuit, or the like, functions of the "source electrode" and the "drain electrode" are sometimes interchanged. Therefore, the "source electrode" and the "drain electrode" are interchangeable in the specification.

In the specification, an "electrical connection" includes a case that constituent elements are connected together through an element with a certain electrical effect. The "element with a certain electrical effect" is not particularly limited as long as electrical signals may be sent and received between the connected constituent elements. Examples of the "element with a certain electrical effect" not only include an electrode and a wiring, but also include a switching element such as a transistor, a resistor, an inductor, a capacitor, and another element with various functions, etc.

In the specification, "parallel" refers to a state in which an angle formed by two straight lines is above −10° and below 10°, and thus also includes a state in which the angle is above −5° and below 5°. In addition, "perpendicular" refers to a state in which an angle formed by two straight lines is above 80° and below 100°, and thus also includes a state in which the angle is above 85° and below 95°.

In the specification, a "film" and a "layer" are interchangeable. For example, a "conductive layer" may be replaced with a "conductive film" sometimes. Similarly, an "insulation film" may be replaced with an "insulation layer" sometimes.

In the specification, "disposed in a same layer" refers to a structure formed by patterning two (or more than two) structures through a same patterning process, and their materials may be the same or different. For example, materials of precursors for forming multiple structures disposed in a same layer are the same, and final materials may be the same or different.

In the present disclosure, "about" refers to that a boundary is not defined so strictly and numerical values within process and measurement error ranges are allowed.

A display substrate has advantages of a high resolution, a high reaction speed, high brightness, and a high aperture ratio, etc., and has a wide application prospect. A drive circuit is disposed in the display substrate to drive a pixel drive circuit to emit light, thereby achieving display. A shape of the display substrate is generally a rounded rectangle, and four corners of the rounded rectangle are referred to as rounded corner regions. Drive circuits are placed in the rounded corner regions according to an arc trend of the rounded corner regions, which will cause some blank regions generated between the drive circuits. If the blank regions are too large, etching will be uneven, which will affect stability of transmission of output signals of the drive circuits adversely and affect a display effect adversely.

Figure 1B:
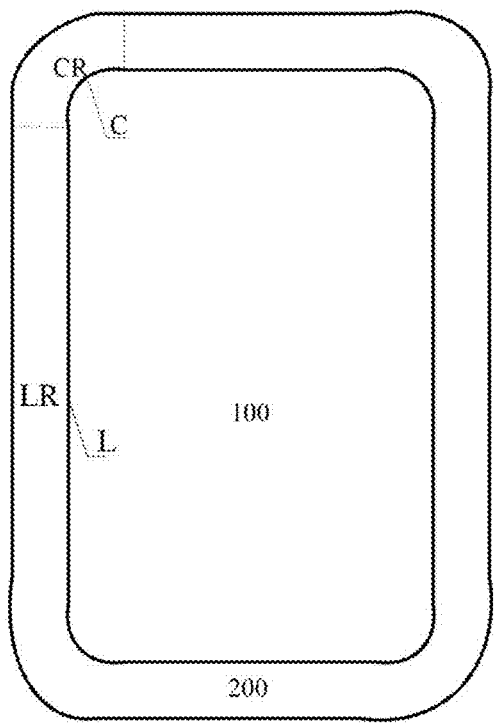
FIG. 1B is a schematic diagram of region division of a display substrate.
Figure 2:
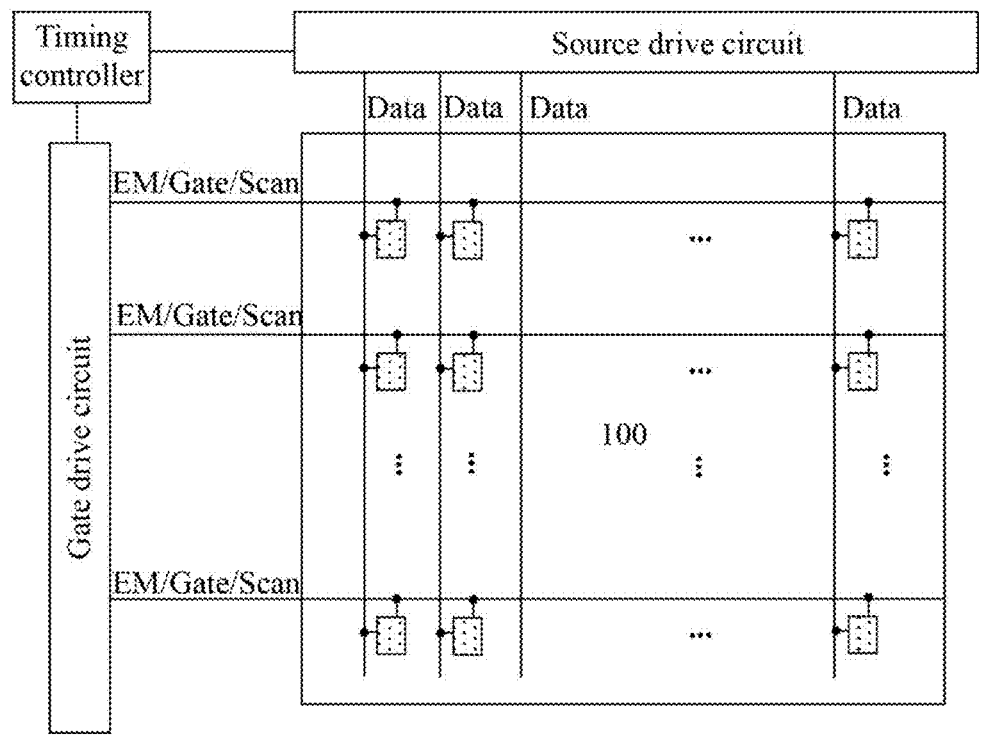
FIG. 2 is a schematic diagram of a structure of another display substrate.

FIG. 1A is a schematic diagram of a structure of a display substrate, FIG. 1B is a schematic diagram of region division of a display substrate, and FIG. 2 is a schematic diagram of a structure of another display substrate. As shown in FIGS. 1A, 1B, and 2, a display substrate may include a display region 100 and a non-display region 200, a boundary of the display region 100 includes at least one arc-shaped boundary C and a straight line boundary L, and the non-display region 200 includes a rounded corner region CR located on an outside of the arc-shaped boundary C and a straight line region LR located at the straight line boundary L.

In an exemplary implementation mode, a shape of a boundary of the display region may be a rounded rectangle, which is not limited here in the present disclosure.

The display substrate according to the present disclosure may achieve a function of bending four sides at a large angle, thus improving a wrinkling problem of module attaching and improving a yield of products.

In an exemplary implementation mode, as shown in FIGS. 1A and 2, the display region may include pixel units P arranged in an array, at least one pixel unit includes at least three sub-pixels, and at least one sub-pixel includes a pixel drive circuit and a light emitting device. A pixel drive circuit located in a same sub-pixel is electrically connected with a light emitting device and is configured to drive the light emitting device to emit light.

In an exemplary implementation mode, the pixel unit may include a red (R) sub-pixel, a green (G) sub-pixel, and a blue (B) sub-pixel, or may include a red sub-pixel, a green sub-pixel, a blue sub-pixel, and a white sub-pixel, which is not limited in the present disclosure.

In an exemplary implementation mode, a shape of a sub-pixel in a pixel unit may be a rectangle, a rhombus, a pentagon, or a hexagon. When the pixel unit includes three sub-pixels, the three sub-pixels may be arranged side by side horizontally, side by side vertically, or in a manner like a Chinese character "品". When the pixel unit includes four sub-pixels, the four sub-pixels may be arranged side by side horizontally, side by side vertically, or in a manner to form a square, which is not limited in the present disclosure.

In an exemplary implementation mode, the light emitting device may be an Organic Light Emitting Diode (OLED) or a Quantum dot Light Emitting Diode (QLED). Among them, the OLED may include a first electrode (anode), an organic emitting layer, and a second electrode (cathode) that are stacked.

In an exemplary implementation mode, the organic emitting layer may include a Hole Injection Layer (HIL), a Hole Transport Layer (HTL), an Electron Block Layer (EBL), an Emitting Layer (EML), a Hole Block Layer (HBL), an Electron Transport Layer (ETL), and an Electron Injection Layer (EIL) that are stacked. In an exemplary implementation mode, hole injection layers of all sub-pixels may be connected together to be a common layer, electron injection layers of all the sub-pixels may be connected together to be a common layer, hole transport layers of all the sub-pixels may be connected together to be a common layer, electron transport layers of all the sub-pixels may be connected together to be a common layer, hole block layers of all the sub-pixels may be connected together to be a common layer, emitting layers of adjacent sub-pixels may be overlapped slightly or may be isolated, and electron block layers of adjacent sub-pixels may be overlapped slightly or may be isolated.

In an exemplary implementation mode, as shown in FIG. 1A, the non-display region 200 may include a bonding region located on a side of the display region 100 and a bezel region located on another side of the display region 100. Among them, a rounded corner region is located in the bezel region.

In an exemplary implementation mode, the bonding region may include a lead region, a bending region, and a composite circuit region which are disposed sequentially along a direction away from the display region, the lead region is connected to the display region 100, the bending region is connected to the lead region, and the composite circuit region is connected to the bending region.

In an exemplary implementation mode, the lead region may be provided with a plurality of lead out lines. Ends of one part of the plurality of lead out lines are correspondingly connected with a plurality of data fanout lines in the display region 100, and ends of the other part of the plurality of lead out lines are correspondingly connected with a plurality of data lines in the display region 100, and the other ends of the plurality of lead out lines go cross the bending region to be connected with an integrated circuit of the composite circuit region, so that the integrated circuit applies data signals to the data lines through the lead out lines and the data fanout lines.

In an exemplary implementation mode, the bending region may be bent with a curvature, so that a surface of the composite circuit region may be turned over, that is, a surface of the composite circuit region facing upwards may be converted to face downwards through bending of the bending region. In an exemplary implementation mode, when the bending region is bent, the compound circuit region may be overlapped with the display region 100.

In an exemplary implementation mode, the compound circuit region may include an antistatic region, a drive chip region, and a bonding pin region. An Integrated Circuit (IC) may be bonded and connected to the drive chip region, and a Flexible Printed Circuit (FPC) may be bonded and connected to the bonding pin region.

In an exemplary implementation mode, the integrated circuit may generate a drive signal required for driving a sub-pixel, and may provide a drive signal to a sub-pixel in the display region 100. For example, the drive signal may be a data signal that drives luminance of the sub-pixel. In an exemplary implementation mode, the integrated circuit may be bonded and connected to the drive chip region through an anisotropic conductive film or other ways. In an exemplary implementation mode, the bonding pin region may be provided with a bonding pad including multiple pins, and the flexible circuit board may be bonded and connected to the bonding pad.

In an exemplary implementation mode, as shown in FIG. 2, the display substrate may include a timing controller, a data drive circuit, a gate drive circuit, and a pixel array, the timing controller is respectively connected with the data drive circuit and the gate drive circuit, the data drive circuit is connected with a data signal line Data, respectively, and the gate drive circuit is connected with a gate line, the gate line may include one or more of a light emitting signal line EM, a scan signal line Gate, and a control signal line Scan. The pixel drive circuit is connected with the gate line and the data signal line, respectively.

In an exemplary implementation mode, the timing controller may supply a grayscale value and a control signal suitable for a specification of the data drive circuit to the data drive circuit, may supply a clock signal, a start signal, and the like suitable for a specification of the gate drive circuit to the gate drive circuit, and may supply a clock signal, an emission stop signal, and the like suitable for a specification of the light emitting drive circuit to the light emitting drive circuit. The data drive circuit may generate a data voltage to be provided to a data signal line by using the gray-scale value and the control signal received from the timing controller. For example, the data drive circuit may sample the gray-scale value using a clock signal, and apply a data voltage corresponding to the gray-scale value to the data signal line by taking a pixel row as a unit.

In an exemplary implementation mode, the gate drive circuit may generate a scan signal to be provided to the gate line by receiving a clock signal, a start signal, and the like from the timing controller. For example, the gate drive circuit may sequentially provide a signal with an on-level pulse to gate lines. For example, the gate drive circuit may be constructed in a form of a shift register and may generate a scan signal by sequentially transmitting a start signal provided in a form of an on-level pulse to a next stage circuit under control of the clock signal.

In an exemplary implementation mode, the pixel drive circuit may have a structure of 3T1C, 4T1C, 5T1C, 5T2C, 6T1C, 7T1C, or 8T1C.

Figure 3A:
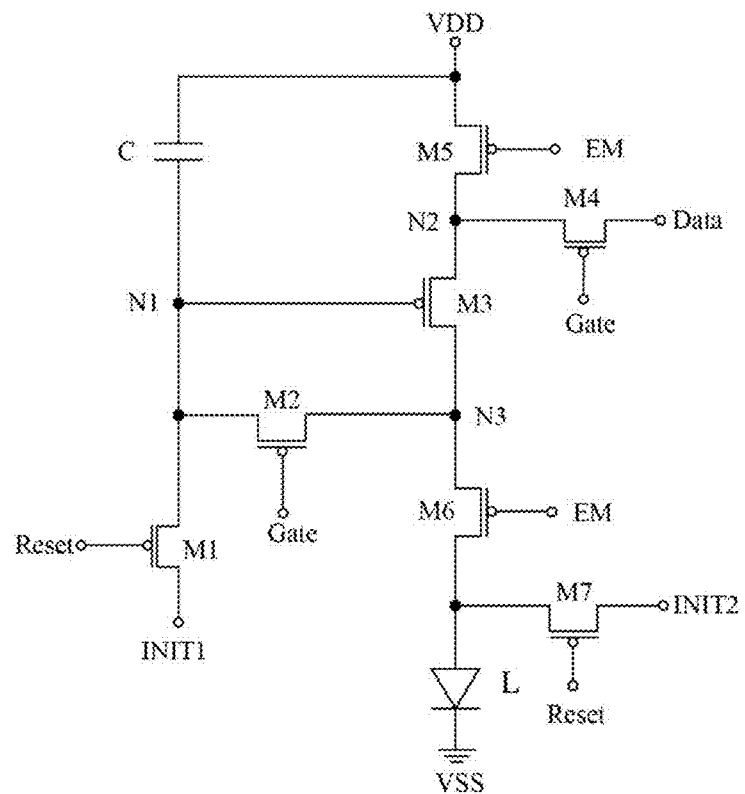
FIG. 3A is an equivalent circuit diagram of a pixel drive circuit.

In an exemplary implementation mode, FIG. 3A is an equivalent circuit diagram of a pixel drive circuit. As shown in FIG. 3A, the pixel drive circuit may include seven transistors (a first transistor M1 to a seventh transistor M7), one capacitor C, and eight signal lines (a data signal line Data, a scan signal line Gate, a reset signal line Reset, a light emitting signal line EM, a first initial signal line INIT1, a second initial signal line INIT2, a high-level power supply line VDD, and a low-level power supply line VSS).

In an exemplary implementation mode, as shown in FIG. 3A, a first electrode plate of the capacitor C is connected with the high-level power supply line VDD and a second electrode plate of the capacitor C is connected with a first node N1. A control electrode of the first transistor M1 is connected with the reset signal line Reset, a first electrode of the first transistor M1 is connected with the first initial signal line INIT1, and a second electrode of the first transistor is connected with the first node N1; a control electrode of the second transistor M2 is connected with the scan signal line Gate, a first electrode of the second transistor M2 is connected with the first node N1, and a second electrode of the second transistor M2 is connected with a second node N2. A control electrode of the third transistor M3 is connected with the first node N1, a first electrode of the third transistor M3 is connected with the second node N2, and a second electrode of the third transistor M3 is connected with a third node N3. A control electrode of the fourth transistor M4 is connected with the scan signal line Gate, a first electrode of the fourth transistor M4 is connected with the data signal line Data, and a second electrode of the fourth transistor M4 is connected with the second node N2. A control electrode of the fifth transistor M5 is connected with the light emitting signal line EM, a first electrode of the fifth transistor M5 is connected with the high-level power supply line VDD, and a second electrode of the fifth transistor M5 is connected with the second node N2; a control electrode of the sixth transistor M6 is connected with the light emitting signal line EM, a first electrode of the sixth transistor M6 is connected with the third node N3, and a second electrode of the sixth transistor M6 is connected with a first electrode of a light emitting device L. A control electrode of the seventh transistor M7 is connected with the reset signal line Reset or the scan signal line Gate, a first electrode of the seventh transistor M7 is connected with the second initial signal line INIT2, a second electrode of the seventh transistor M7 is connected with the first electrode of the light emitting device L, and a second electrode of the light emitting device is connected with the low-level power supply line VSS. FIG. 3A is illustrated by taking the control electrode of the seventh transistor M7 and the reset signal line Reset as an example.

In an exemplary implementation mode, the first transistor M1 may be referred to as a node reset transistor, and when an effective level signal is input to the reset signal line Reset, the first transistor M1 transmits an initialization voltage to the first node N1 to initialize a charge amount of the first node N1.

In an exemplary implementation mode, the second transistor M2 may be referred to as a compensation transistor, and when an effective level signal is input to a control signal line SL, the second transistor M2 transmits a signal of the second node N2 to the first node N1 to compensate a signal of the first node N1.

In an exemplary implementation mode, the third transistor M3 may be referred to as a drive transistor, and the third transistor M3 determines a drive current which flows between the high-level power supply line VDD and the low-level power supply line VSS according to a potential difference between the control electrode and the first electrode.

In an exemplary implementation mode, the fourth transistor M4 may be referred to as a writing transistor or the like, when an effective level signal is input to the scan signal line Gate, the fourth transistor M4 enables a data voltage of the data signal line Data to be input to the third node N3.

In an exemplary implementation mode, the fifth transistor M5 and the sixth transistor M6 may be referred to as light emitting transistors. When an effective level signal is input to the light emitting signal line EM, the fifth transistor M5 and the sixth transistor M6 enable the light emitting device to emit light by forming a drive current path between the high-level power supply line VDD and the low-level power supply line VSS.

In an exemplary implementation mode, the seventh transistor M7 may be referred to as an anode reset transistor, when an effective level signal is input to the reset signal line Reset or the scan signal line Gate, the seventh transistor M7 transmits an initialization voltage to the first electrode of the light emitting device L to initialize a charge amount of the first electrode of the light emitting device L.

In an exemplary implementation mode, a signal of the high-level power supply line VDD is a high-level signal continuously provided, and a signal of the low-level power supply line VSS is a low-level signal.

Transistors may be divided into N-type transistors and P-type transistors according to their characteristics. When a transistor is a P-type transistor, a turn-on voltage is a low-level voltage (e.g., 0V, −5 V, −10 V, or other suitable voltages), and a turn-off voltage is a high-level voltage (e.g., 5 V, 10 V, or other suitable voltages). When a transistor is an N-type transistor, a turn-on voltage is a high-level voltage (e.g., 5 V, 10 V, or other suitable voltages), and a turn-off voltage is a low-level voltage (e.g., 0 V, −5 V, −10 V, or other suitable voltages).

In an exemplary implementation mode, the first transistor M1 to the seventh transistor M7 may be P-type transistors, or may be N-type transistors. Use of a same type of transistors in a pixel drive circuit may simplify a process flow, reduce a process difficulty of a display panel, and improve a product yield. In some possible implementation modes, the first transistor M1 to the seventh transistor M7 may include a P-type transistor and an N-type transistor.

In an exemplary implementation mode, for the first transistor M1 to the seventh transistor M7, low temperature poly silicon thin film transistors may be adopted, or oxide thin film transistors may be adopted, or both a low temperature poly silicon thin film transistor and an oxide thin film transistor may be adopted. An active layer of a low temperature poly silicon thin film transistor may be made of Low Temperature Poly Silicon (LTPS for short), and an active layer of an oxide thin film transistor may be made of an oxide semiconductor (Oxide). The low temperature poly silicon thin film transistor has advantages of a high mobility, fast charging, and the like. The oxide thin film transistor has advantages of a low leakage current and the like. The low temperature poly silicon thin film transistor and the oxide thin film transistor are integrated on one display substrate to form a Low Temperature Polycrystalline Oxide (LTPO for short) display substrate, so that advantages of the low temperature poly silicon thin film transistor and the oxide thin film transistor may be utilized, low-frequency drive may be achieved, power consumption may be reduced, and display quality may be improved.

In an exemplary implementation mode, when the display substrate is an LTPO display substrate, the first transistor T1 and the second transistor T2 may be N-type transistors, and remaining transistors are P-type transistors. When the display substrate is an LTPS display substrate, the first transistor M1 to the seventh transistor M7 are P-type transistors.

In an exemplary implementation mode, when the display substrate is an LTPO display substrate and when the first transistor T1 and the second transistor T2 are N-type transistors, the first transistor T1 and the second transistor T2 may also be referred to as control transistors, and similarly, an N-type transistor in the pixel drive circuit may be referred to as a control transistor.

Figure 3B:
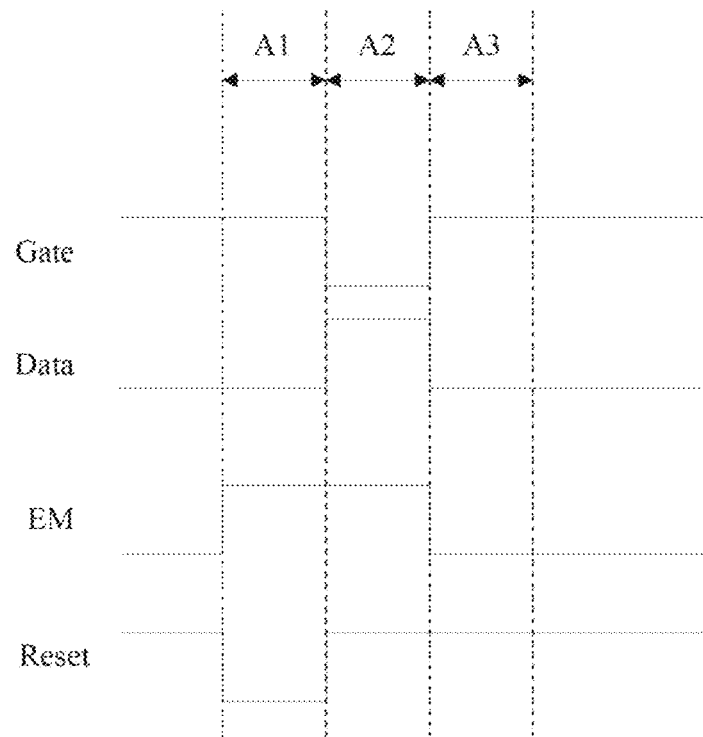
FIG. 3B is a working timing diagram of the pixel drive circuit provided in FIG. 3A.

FIG. 3B is a working timing diagram of the pixel drive circuit provided in FIG. 3A. FIG. 3B is illustrated by taking a case that transistors in FIG. 3A are all P-type transistors as an example. An exemplary embodiment of the present disclosure is described below with reference to a working process of the pixel drive circuit illustrated in FIG. 3B. In an exemplary implementation mode, the working process of the pixel drive circuit may include following stages.

In a first stage A1, referred to as a reset stage, signals of the scan signal line Gate and the light emitting signal line EM are both high-level signals, and a signal of the reset signal line Reset is a low-level signal. The signal of the reset signal line Reset is the low-level signal, the first transistor M1 is turned on, a signal of the first initial signal line INIT1 is provided to the first node N1 to initialize the capacitor C and clear an original data voltage in the capacitor C, the seventh transistor M7 is turned on, an initial voltage of the second initial signal line INIT2 is provided to the first electrode of the light emitting device L, to initialize (reset) the first electrode of the light emitting device L and empty a pre-stored voltage therein, and initialization is completed. The signals of the scan signal line Gate and the light emitting signal line EM are high-level signals, the second transistor M2, the fourth transistor M4, the fifth transistor M5, and the sixth transistor M6 are turned off, and the light emitting device L does not emit light in this stage.

In a second stage A2, referred to as a data writing stage or a threshold compensation stage, a signal of the scan signal line Gate is a low-level signal, signals of the light emitting signal line EM and the reset signal line Reset are high-level signals, and the data signal line Data outputs a data voltage. In this stage, since a signal of the first node N1 is a low-level signal, the third transistor M3 is turned on. The signal of the scan signal line Gate is the low-level signal, the second transistor T2 and the fourth transistor M4 are turned on, the second transistor M2 and the fourth transistor M4 are turned on so that the data voltage output by the data signal line Data is provided to the first node N1 through the second node N2, the turned-on third transistor M3, the third node N3, and the turned-on second transistor M2, and the capacitor C is charged with a difference between the data voltage output by the data signal line Data and a threshold voltage of the third transistor M3 until a voltage of the first node N1 is Vd−|Vth|, Vd is the data voltage output by the data signal line Data and Vth is the threshold voltage of the third transistor M3, so as to ensure that the light emitting device L does not emit light. A signal of the reset signal line Reset is a high-level signal, so that the first transistor M1 is turned off. A signal of the light emitting signal line EM is a high-level signal, so that the fifth transistor M5 and the sixth transistor M6 are turned off.

In a third stage A3, referred to as a light emitting stage, signals of the scan signal line Gate and the reset signal line Reset are high-level signals, and a signal of the light emitting signal line EM is a low-level signal. The signal of the light emitting signal line EM is the low-level signal, the fifth transistor M5 and the sixth transistor M6 are turned on, and a power supply voltage output by the high-level power supply line VDD provides a drive voltage to the first electrode of the light emitting device L through the turned-on fifth transistor M5, the third transistor M3, and the sixth transistor M6, to drive the light emitting device L to emit light.

In a drive process of the pixel drive circuit, a drive current flowing through the third transistor M3 (drive transistor) is determined by a voltage difference between the control electrode and the first electrode. Since the voltage of the first node N1 is Vd−|Vth|, the drive current of the third transistor M3 is as follows.

$$I = K*(Vgs - Vth)^2 = K*[(Vdd - Vd + |Vth|) - Vth]^2 = K*(Vdd - Vd)^2$$

Herein, I is the drive current flowing through the third transistor M3, i.e., a drive current for driving the light emitting device L, K is a constant, Vgs is the voltage difference between the control electrode and the first electrode of the third transistor M3, Vth is the threshold voltage of the third transistor M3, Vd is the data voltage output by the data signal line Data, and Vdd is the power voltage output by the high-level power supply line VDD.

Figure 4A:
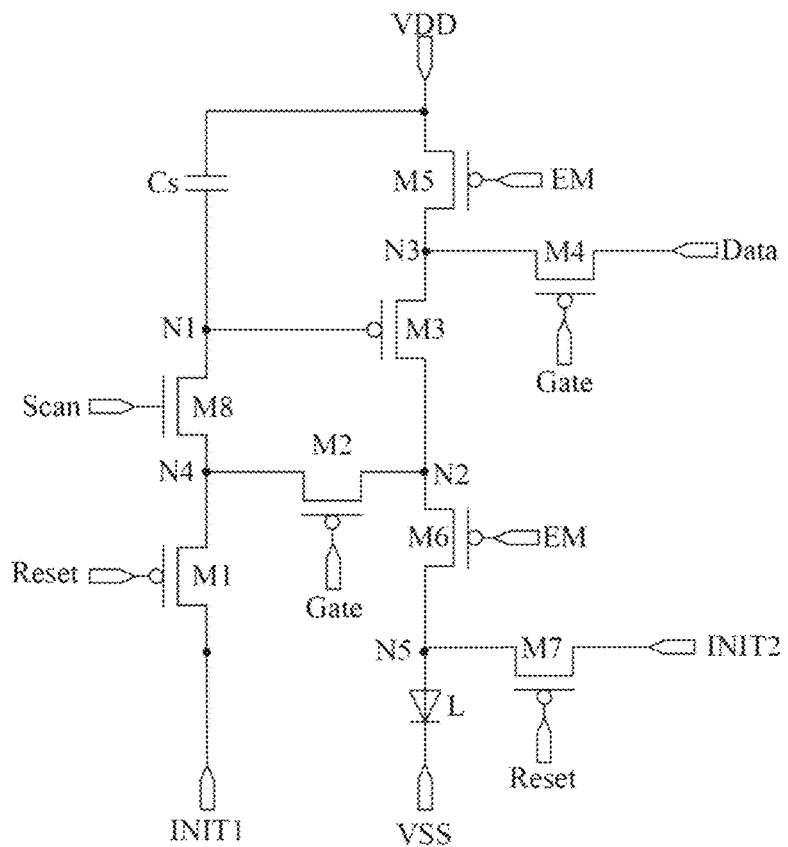
FIG. 4A is an equivalent circuit diagram of another pixel drive circuit.

In an exemplary implementation mode, FIG. 4A is an equivalent circuit diagram of another pixel drive circuit. As shown in FIG. 4A, the pixel drive circuit may include eight transistors (a first transistor M1 to an eighth transistor M8), one capacitor C, and nine signal lines (a data signal line Data, a control signal line Scan, a scan signal line Gate, a reset signal line Reset, a light emitting signal line EM, a first initial signal line INIT1, a second initial signal line INIT2, a high-level power supply line VDD, and a low-level power supply line VSS).

In an exemplary implementation mode, the pixel drive circuit provided in FIG. 4A is suitable for an LTPO display substrate.

In an exemplary implementation mode, a first electrode plate of the capacitor C is connected with the high-level power supply line VDD, and a second electrode plate of the capacitor C is connected with a first node N1. A control electrode of the first transistor M1 is connected with the reset signal line Reset, a first electrode of the first transistor M1 is connected with the first initial signal line INIT1, and a second electrode of the first transistor is connected with a fourth node N4. A control electrode of the second transistor M2 is connected with the scan signal line Gate, a first electrode of the second transistor M2 is connected with the fourth node N4, and a second electrode of the second transistor M2 is connected with a second node N2. A control electrode of the third transistor M3 is connected with the first node N1, a first electrode of the third transistor M3 is connected with the second node N2, and a second electrode of the third transistor M3 is connected with a third node N3. A control electrode of the fourth transistor M4 is connected with the scan signal line Gate, a first electrode of the fourth transistor M4 is connected with the data signal line Data, and a second electrode of the fourth transistor M4 is connected with the third node N3. A control electrode of the fifth transistor M5 is connected with the light emitting signal line EM, a first electrode of the fifth transistor M5 is connected with the high-level power supply line VDD, and a second electrode of the fifth transistor M5 is connected with the third node N3. A control electrode of the sixth transistor M6 is connected with the light emitting signal line EM, a first electrode of the sixth transistor M6 is connected with the second node N2, and a second electrode of the sixth transistor M6 is connected with a first electrode of a light emitting device L. A control electrode of the seventh transistor M7 is connected with the reset signal line Reset, a first electrode of the seventh transistor M7 is connected with the second initial signal line INIT2, a second electrode of the seventh transistor M7 is connected with the first electrode of the light emitting device L, and a second electrode of the light emitting device L is connected with the low-level power supply line VSS. A control electrode of the eighth transistor M8 is connected with the control signal line Scan, a first electrode of the eighth transistor M8 is connected with the first node N1, and a second electrode of the eighth transistor M8 is connected with the fourth node N4.

In an exemplary implementation mode, the control electrode of the seventh transistor M7 may also be connected with the scan signal line Gate, the first electrode of the seventh transistor M7 is connected with the second initial signal line INIT2, the second electrode of the seventh transistor M7 is connected with the first electrode of the light emitting device L, and the second electrode of the light emitting device L is connected with the low-level power supply line VSS.

In an exemplary implementation mode, the first transistor M1 may be referred to as a node reset transistor, and when an effective level signal is input to the reset signal line RESET, the first transistor M1 transmits an initialization voltage to the first node N1 to initialize a charge amount of the first node N1.

In an exemplary implementation mode, the eighth transistor M8 may be referred to as a compensation reset transistor, and when an effective level signal is input to the control signal line Scan, the eighth transistor M8 transmits a signal of the fourth node N4 to the first node N1, not only a charge amount of the first node may be initialized, but also threshold compensation may be performed on the third transistor M3.

In an exemplary implementation mode, the second transistor M2 may be referred to as a compensation transistor, and when an effective level signal is input to the scan signal line Gate, the second transistor M2 enables a signal of the second node N2 to be written into the fourth node N4.

In an exemplary implementation mode, the third transistor M3 may be referred to as a drive transistor, and the third transistor M3 determines a drive current flowing between a high-level power supply terminal VDD and a low-level power supply terminal VSS according to a potential difference between the control electrode and the first electrode.

In an exemplary implementation mode, the fourth transistor M4 may be referred to as a writing transistor, when an effective level signal is input to the scan signal line Gate, the fourth transistor M4 enables a data voltage of the data signal line Data to be input to the pixel drive circuit.

In an exemplary implementation mode, the fifth transistor M5 and the sixth transistor M6 may be referred to as light emitting transistors. When an effective level signal is input to the light emitting signal line EM, the fifth transistor M5 and the sixth transistor M6 enable a light emitting device to emit light by forming a drive current path between the high-level power supply line VDD and the low-level power supply line VSS.

In an exemplary implementation mode, the seventh transistor M7 may be referred to as an anode reset transistor, when an effective level signal is input to the reset signal line Reset or the scan signal line Gate, the seventh transistor M7 transmits an initialization voltage to the first electrode of the light emitting device L to initialize a charge amount of the first electrode of the light emitting device L.

In an exemplary implementation mode, a signal of the high-level power supply line VDD is a high-level signal continuously provided, and a signal of the low-level power supply line VSS is a low-level signal.

In an exemplary implementation mode, the eighth transistor M8 is a metal oxide transistor, and is an N-type transistor, and the first transistor M1 to the seventh transistor M7 are low temperature poly silicon transistors and are P-type transistors.

In an exemplary implementation mode, the eighth transistor M8 may be referred to as a control transistor.

In an exemplary implementation mode, the eighth transistor M8 is an oxide transistor and may reduce a leakage current, improve performance of the pixel drive circuit, and may reduce power consumption of the pixel drive circuit.

Figure 4B:
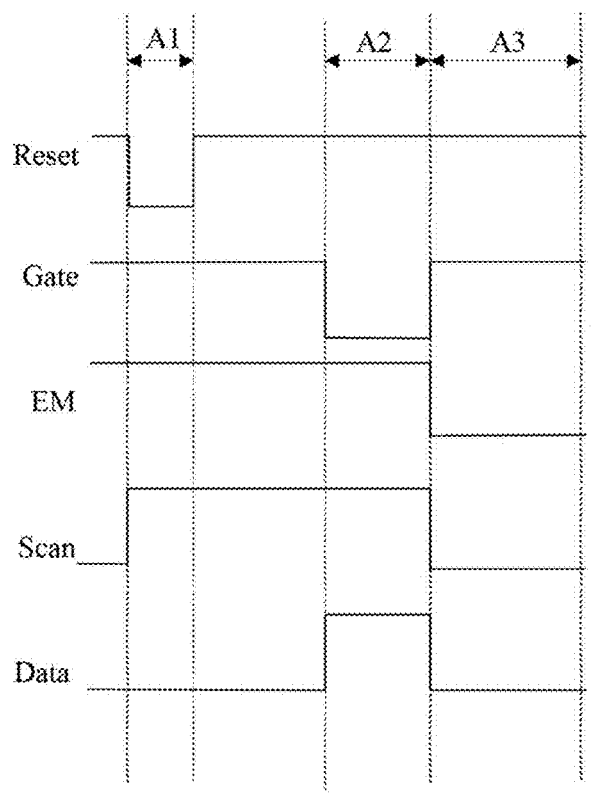
FIG. 4B is a working timing diagram of the pixel drive circuit provided in FIG. 4A.

FIG. 4B is a working timing diagram of the pixel drive circuit provided in FIG. 4A. An exemplary embodiment of the present disclosure is described below with reference to a working process of the pixel drive circuit illustrated in FIG. 4B. The working process of the pixel drive circuit may include following stages.

In a first stage A1, referred to as a reset stage, signals of the control signal line Scan, the light emitting signal line EM, and the scan signal line Gate are all high-level signals, and a signal of the reset signal line Reset is a low-level signal. The signal of the reset signal line Reset is the low-level signal, the first transistor M1 is turned on, a signal of the first initial signal line INIT1 is provided to the fourth node N4, the seventh transistor M7 is turned on, an initial voltage of the second initial signal line INIT2 is provided to the first electrode of the light emitting device L to initialize (reset) the first electrode of the light emitting device L, for example, empty a pre-stored voltage therein, initialization is completed, and the light emitting device L is ensured not to emit light. A signal of the control signal line Scan is a high-level signal, the eighth transistor M8 is turned on, a signal of the fourth node N4 is provided to the first node N1 to initialize the capacitor C, and an original data voltage in the capacitor C is cleared. Signals of the scan signal line Gate and the light emitting signal line EM are high-level signals, and the second transistor M2, the fourth transistor M4, the fifth transistor M5, the sixth transistor M6, and the seventh transistor M7 are turned off, and the light emitting device L does not emit light in this stage.

In a second stage A2, referred to as a data writing stage or a threshold compensation stage, a signal of the scan signal line Gate is a low-level signal, signals of the reset signal line Reset, the light emitting signal line EM, and the control signal line Scan are high-level signals, and the data signal line Data outputs a data voltage. In this stage, since a signal of the first node N1 is a low-level signal, the third transistor M3 is turned on. The signal of the scan signal line Gate is the low-level signal, the second transistor M2 and the fourth transistor M4 are turned on, a signal of the control signal line Scan is a high-level signal, and the eighth transistor M8 is turned on. The second transistor M2, the fourth transistor M4, and the eighth transistor M8 are turned on so that a data voltage output by the data signal line Data is provided to the first node N1 through the third node N3, the turned-on third transistor M3, the second node N2, the turned-on second transistor M2, the fourth node N4, and the turned-on eighth transistor M8. A difference between the data voltage output by the data signal line Data and a threshold voltage of the third transistor M3 is charged into the capacitor C until a voltage of the first node N1 is Vd−|Vth|, wherein Vd is the data voltage output by the data signal line Data, and Vth is the threshold voltage of the third transistor M3. A signal of the reset signal line Reset is a low-level signal, and the first transistor M1 and the seventh transistor M7 are turned off. A signal of the light emitting signal line EM is a high-level signal, and the fifth transistor M5 and the sixth transistor M6 are turned off.

In a third stage A3, referred to as a light emitting stage, signals of the control signal line Scan and the light emitting signal line EM are both low-level signals, and signals of the scan signal line Gate and the reset signal line Reset are high-level signals. A signal of the reset signal line Reset is a low-level signal, and the first transistor M1 and the seventh transistor M7 are turned off. A signal of the control signal line Scan is a low-level signal, the signals of the scan signal line GATE and the reset signal line Reset are the high-level signals, and the second transistor M2, the fourth transistor M4, and the eighth transistor M8 are turned off. A signal of the light emitting signal line EM is a low-level signal, the fifth transistor M5 and the sixth transistor M6 are turned on, and a power supply voltage output by the high-level power supply terminal VDD provides a drive voltage to the first electrode of the light emitting device L through the turned-on fifth transistor M5, the third transistor M3, and the sixth transistor M6, so as to drive the light emitting device L to emit light.

In a drive process of the pixel drive circuit, a drive current flowing through the third transistor M3 (drive transistor) is determined by a voltage difference between the control electrode and the first electrode. Since the voltage of the first node N1 is Vd−|Vth|, the drive current of the third transistor M3 is as follows.

$$I = K*(Vgs - Vth)^2 = K*[(Vdd - Vd + |Vth|) - Vth]^2 = K*(Vdd - Vd)^2$$

Among them, I is the drive current flowing through the third transistor M3, that is, a drive current for driving the light emitting device L, K is a constant, Vgs is the voltage difference between the control electrode and the first electrode of the third transistor M3, Vth is the threshold voltage of the third transistor M3, Vd is the data voltage output by the data signal line Data, and Vdd is the power supply voltage output by the high-level power supply terminal VDD.

Figure 5:
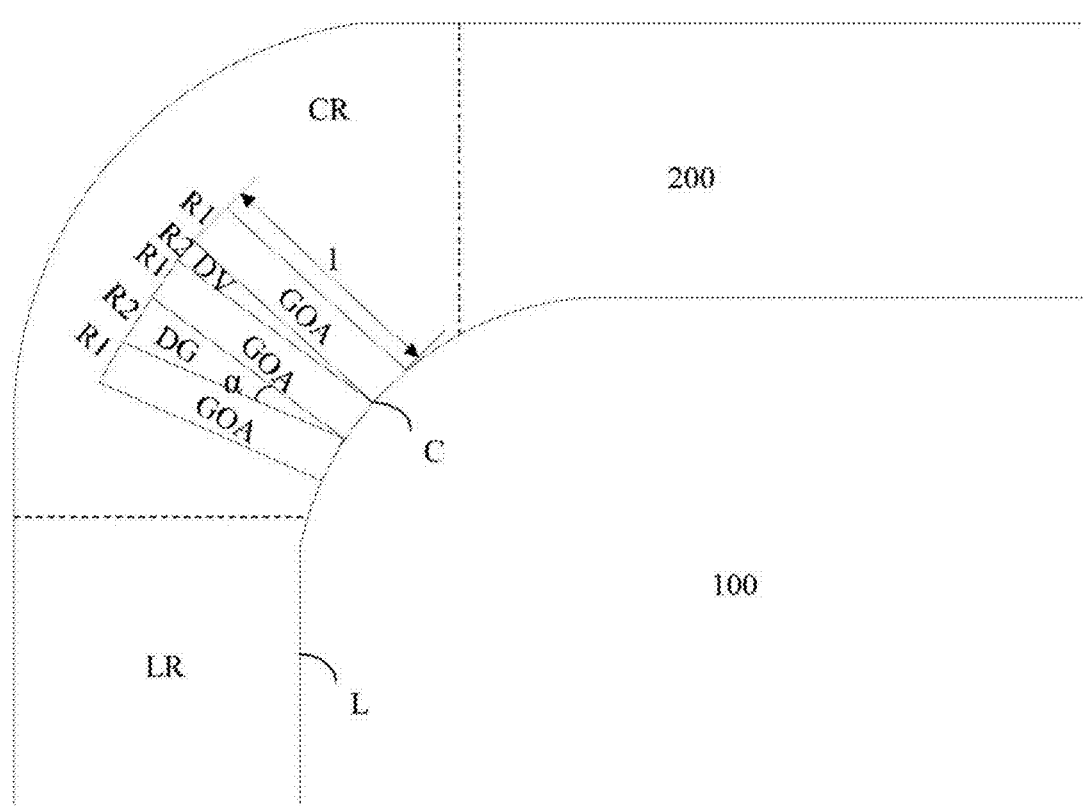
FIG. 5 is a partial schematic diagram of a display substrate provided by an embodiment of the present disclosure.

FIG. 5 is a partial schematic diagram of a display substrate provided by an embodiment of the present disclosure. As shown in FIG. 5, the display substrate provided by the embodiment of the present disclosure may include a base substrate and a drive circuit layer disposed on the base substrate, the base substrate includes a display region 100 and a non-display region 200, the drive circuit layer includes a pixel drive circuit located in the display region 100 and a gate drive circuit (Gate Driver on Array (GOA)) located in the non-display region 200; a boundary of the display region includes an arc-shaped boundary, and a non-display region located on an outside of the arc-shaped boundary is referred to as a rounded corner region CR, and the rounded corner region CR includes a plurality of first regions R1 and at least one second region R2.

In an exemplary implementation mode, the gate drive circuit may be configured to provide a drive signal to the pixel drive circuit and is partially located within a first region R1.

In an exemplary implementation mode, as shown in FIG. 5, the second region R2 may be located between adjacent first regions R1, extension lines of two boundaries of the second region R1 close to two adjacent first regions intersect, and an area of the second region R2 is smaller than an area of a first region R1.

In an exemplary implementation mode, the second region may be interspersed between part of adjacent first regions.

In an exemplary implementation mode, a shape of a first region may be a square.

In an exemplary implementation mode, extension lines of two boundaries of the second region R2 close to two adjacent first regions intersect, i.e., the extension lines of the two boundaries of the second region R1 close to the two adjacent first regions are not parallel, exemplarily, a shape of the second region may be a square with missing corners or a triangle. The shape of the second region may be determined according to layout of the gate drive circuit, which is not limited in present disclosure. FIG. 5 is illustrated by taking a case that the shape of the second region R2 is a triangle as an example.

In an exemplary implementation mode, as shown in FIG. 5, the boundary of the display region may further include a straight line boundary L, and a non-display region located on an outside of the straight line boundary may be referred to as a straight line region LR. Part of the gate drive circuit may be located within the straight line region LR.

In an exemplary implementation mode, the base substrate may be a rigid base substrate or a flexible base substrate, wherein the rigid base substrate may be, but is not limited to, one or more of glass and metal foil; the flexible base substrate may be, but is not limited to, one or more of polyethylene terephthalate, ethylene terephthalate, polyether ether ketone, polystyrene, polycarbonate, polyarylate, polyarylester, polyimide, polyvinyl chloride, polyethylene, and textile fibers.

In an exemplary implementation mode, the display substrate may be an LTPO display substrate or an LTPS display substrate.

In an exemplary implementation mode, gate drive circuits in the display substrate may be of two, three, or more types, depending on a structure of the display substrate, which is not limited in present disclosure.

In an exemplary implementation mode, as shown in FIG. 5, a length/of the first region R1 may be 100 microns to 500 microns.

In the present disclosure, an area of the second region R2 is smaller than an area of a first region R1, so that a gap between part of adjacent first regions R1 may be reduced, thus ensuring etching uniformity between film layers, enhancing transmission stability of a drive signal output by the gate drive circuit, and further enhancing a display effect of the display substrate.

In an exemplary implementation mode, as shown in FIG. 5, the drive circuit layer may further include at least one of a dummy register DG and a dummy via DV; the second region R2 is provided with a dummy register DG or a dummy via DV. FIG. 5 is illustrated by taking a case that the drive circuit layer includes a dummy register DG and a dummy via DV as an example.

In an exemplary implementation mode, when the drive circuit layer includes a dummy register, a structure of the dummy register is the same as that of some gate drive circuits. Herein, the structure may refer to a pattern. The structure of the dummy register is the same as that of some gate drive circuits, which may ensure etching uniformity of the display substrate.

In an exemplary implementation mode, the dummy register includes at least one transistor, a structure of the transistor is complete and a high-level signal or a low-level signal is connected into, so that the dummy register may be prevented from being in a floating connection state, causing static electricity, and further affecting a normal circuit adversely.

In an exemplary implementation mode, structures of the dummy registers in at least two second regions are not identical.

In an exemplary implementation mode, when the drive circuit layer includes a dummy via, the drive circuit layer may further include a dummy active layer, an orthographic projection of the dummy via on the base substrate is at least partially overlapped with an orthographic projection of the dummy active layer on the base substrate, and the dummy active layer is exposed.

In an exemplary implementation mode, the dummy via may facilitate ensuring etching uniformity of a film layer and improving characteristic offset of a transistor.

In an exemplary implementation mode, the second region R2 may be provided with a dummy via DV when an included angle α between first regions R1 located on two sides of the second region R2 is less than a threshold angle.

In an exemplary implementation mode, the second region R2 may be provided with a dummy register DG when an included angle α between first regions R1 located on two sides of the second region R2 is greater than a threshold angle.

In an exemplary implementation mode, the threshold angle is about 10 degrees to 14 degrees and exemplarily the threshold angle may be 12 degrees.

In an exemplary implementation mode, the display region includes a plurality of sub-pixels in which a plurality of transistors and vias exposing active layers of the plurality of transistors are provided.

A ratio between a sum of areas of all dummy vias located in the second region and an area of the second region is a first ratio, a ratio between a sum of areas of all vias located in one sub-pixel and an area of the sub-pixel is a second ratio, and the first ratio and the second ratio are approximately equal.

In an exemplary implementation mode, a distance between a boundary of a dummy via and a boundary of a dummy active layer exposed by the dummy via is a first distance, a distance between a boundary of a via and a boundary of an active layer of a transistor exposed by the via is a second distance, and the first distance is approximately equal to the second distance.

In an exemplary implementation mode, an area of a dummy via is approximately equal to an area of at least one via.

In an exemplary implementation mode, the gate drive circuit may include: a plurality of drive circuits; a first region is provided with a partial circuit of each drive circuit.

In an exemplary implementation mode, an arrangement direction of a plurality of drive circuits located in the rounded corner region is an extension direction of a boundary of at least one first region close to the second region, and an arrangement direction of a plurality of drive circuits located in the straight line region intersects with an extension direction of the straight line boundary.

In an exemplary implementation mode, the display region may include a first side and a second side disposed oppositely, and the gate drive circuit may be located on the first side and/or the second side of the display region.

In an exemplary implementation mode, the display substrate may further include a plurality of signal lines located in the non-display region, and an arrangement of signal lines in the rounded corner region and an arrangement of signal lines in the straight line region are consistent.

Figure 6A:
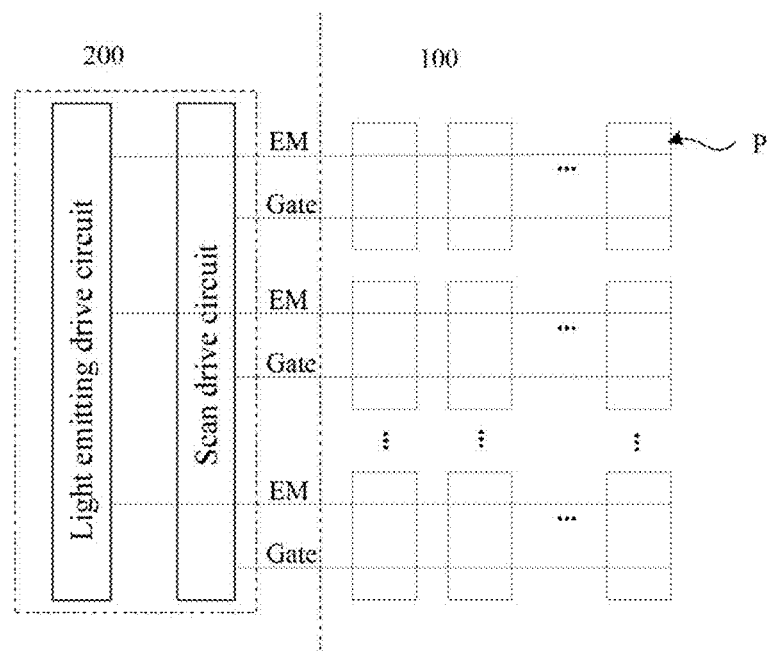
FIG. 6A is a schematic diagram of a structure of a display substrate.
Figure 6B:
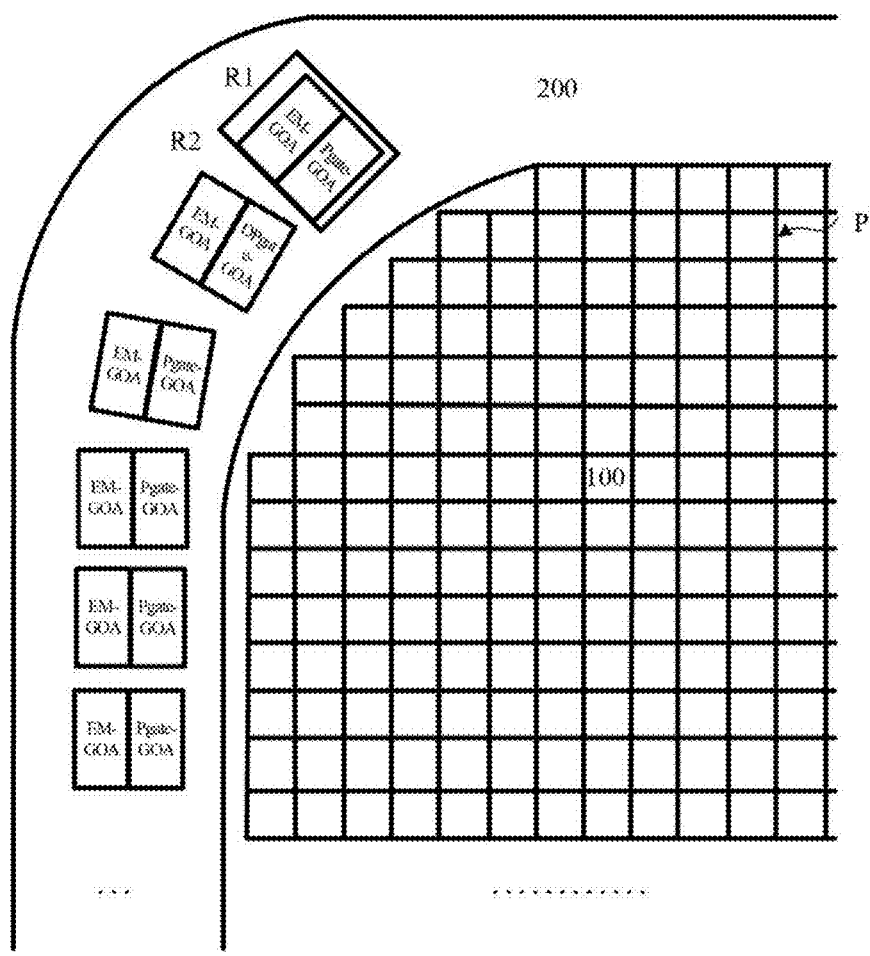
FIG. 6B is a partial schematic diagram of the display substrate provided in FIG. 6A.
Figure 6C:
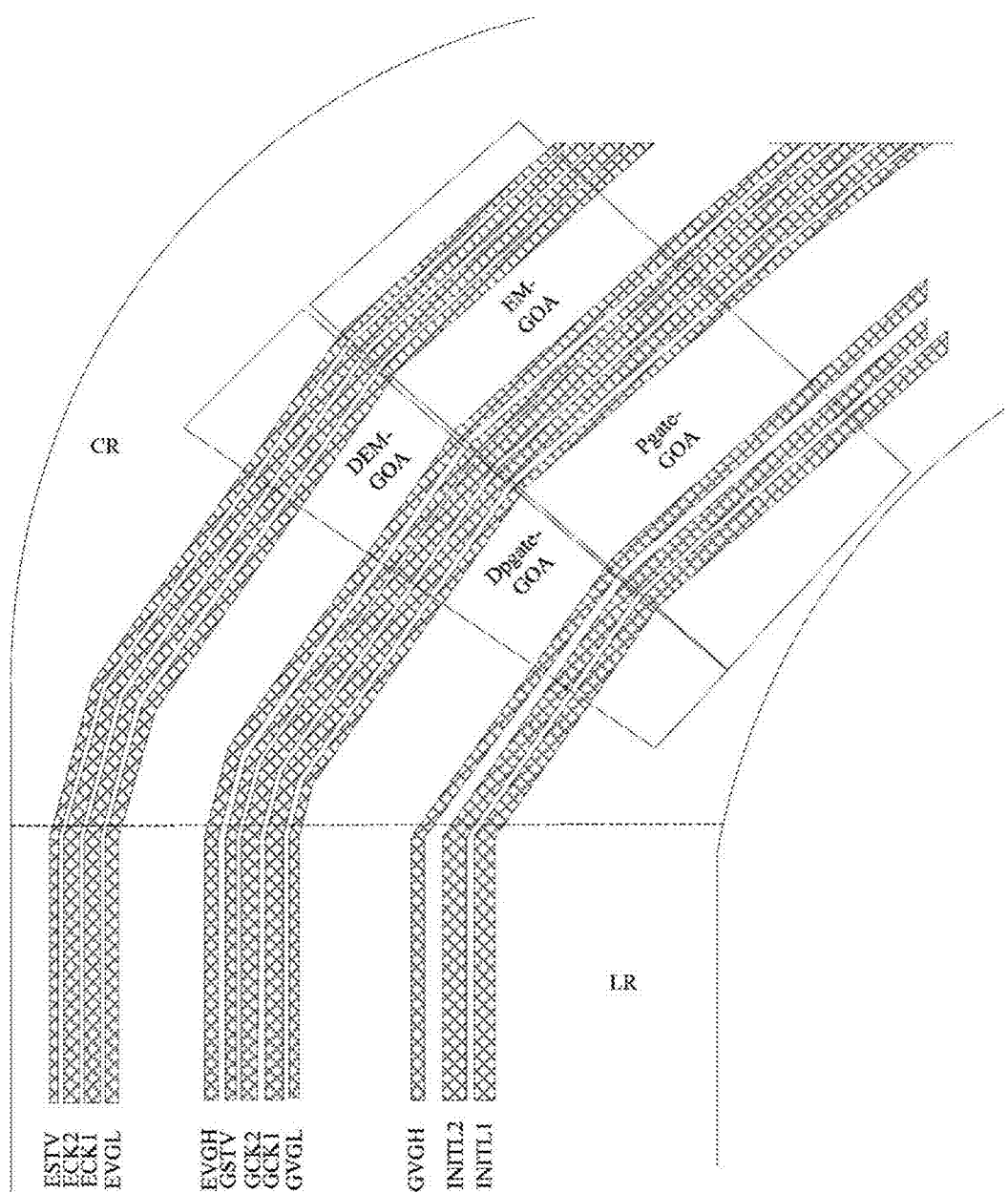
FIG. 6C is another schematic diagram of the display substrate provided in FIG. 6A.

FIG. 6A is a schematic diagram of a structure of a display substrate, FIG. 6B is a partial schematic diagram of the display substrate provided in FIG. 6A, and FIG. 6C is another schematic diagram of the display substrate provided in FIG. 6A. As shown in FIGS. 6A, 6B, and 6C, when the display substrate is an LTPS display substrate, a pixel drive circuit includes a light emitting transistor and a writing transistor, and a plurality of drive circuits may include a light emitting drive circuit and a scan drive circuit, the light emitting drive circuit is electrically connected with the light emitting transistor, the scan drive circuit is electrically connected with the writing transistor, and the scan drive circuit is located on a side of the light emitting drive circuit close to a display region 100.

In an exemplary implementation mode, as shown in FIG. 6A, the light emitting drive circuit is electrically connected with the pixel drive circuit through a light emitting signal line EM, and the scan drive circuit is electrically connected with the pixel drive circuit through a scan signal line Gate.

In an exemplary implementation mode, as shown in FIGS. 6B and 6C, the light emitting drive circuit may include a plurality of cascaded light emitting shift registers EM-GOA, the scan drive circuit includes a plurality of cascaded scan shift registers Pgate-GOA, and a first region R1 is provided with one light emitting shift register EM-GOA and at least one scan shift register Pgate-GOA. FIG. 6B is illustrated by taking a case that the first region R1 is provided with one light emitting shift register EM-GOA and one scan shift register Pgate-GOA as an example.

Figure 7A:
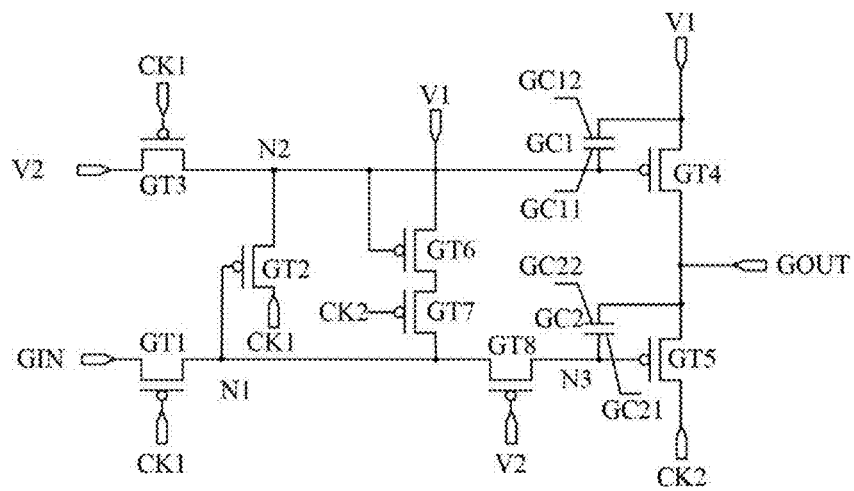
FIG. 7A is an equivalent circuit diagram of a scan shift register.

In an exemplary implementation mode, the scan shift register may have a circuit structure of 8T2C, and the light emitting shift register have a circuit structure of 10T3C or 12T3C, which is not limited in present disclosure In an exemplary implementation mode, FIG. 7A is an equivalent circuit diagram of a scan shift register. As shown in FIG. 7A, the scan shift register may include a first scan transistor GT1 to an eighth scan transistor GT8, a first scan capacitor GC1 and a second scan capacitor GC2.

In an exemplary implementation mode, as shown in FIG. 7A, a control electrode of the first scan transistor GT1 is electrically connected with a first clock signal terminal CK1, a first electrode of the first scan transistor GT1 is electrically connected with an input terminal GIN, and a second electrode of the first scan transistor GT1 is electrically connected with a first node N1; a control electrode of the second scan transistor GT2 is electrically connected with the first node N1, a first electrode of the second scan transistor GT2 is electrically connected with the first clock signal terminal CK1, and a second electrode of the second scan transistor GT2 is electrically connected with a second node N2; a control electrode of the third scan transistor GT3 is electrically connected with the first clock signal terminal CK1, a first electrode of the third scan transistor GT3 is electrically connected with a second power supply terminal V2, and a second electrode of the third scan transistor GT3 is electrically connected with the second node N2; a control electrode of the fourth scan transistor GT4 is electrically connected with the second node N2, a first electrode of the fourth scan transistor GT4 is electrically connected with a first power supply terminal V1, and a second electrode of the fourth scan transistor GT4 is electrically connected with an output terminal GOUT; a control electrode of the fifth scan transistor GT5 is electrically connected with a third node N3, a first electrode of the fifth scan transistor GT5 is electrically connected with a second clock signal terminal CK2, and a second electrode of the fifth scan transistor GT5 is electrically connected with the output terminal GOUT; a control electrode of the sixth scan transistor GT6 is electrically connected with the second node N2, a first electrode of the sixth scan transistor GT6 is electrically connected with the first power supply terminal V1, and a second electrode of the sixth scan transistor GT6 is electrically connected with a first electrode of the seventh scan transistor GT7; a control electrode of the seventh scan transistor GT7 is electrically connected with the second clock signal terminal CK2, and a second electrode of the seventh scan transistor GT7 is electrically connected with the first node N1; a control electrode of the eighth scan transistor GT8 is electrically connected with the second power supply terminal V2, a first electrode of the eighth scan transistor GT8 is electrically connected with the first node N1, and a second electrode of the eighth scan transistor GT8 is electrically connected with the third node N3; a first electrode plate GC11 of the first scan capacitor GC1 is electrically connected with the second node N2, and a second electrode plate GC12 of the first scan capacitor GC1 is electrically connected with the first power supply terminal V1; a first electrode plate GC21 of the second scan capacitor GC2 is electrically connected with the third node N3, and a second electrode plate GC22 of the second scan capacitor GC2 is electrically connected with the output terminal GOUT.

In an exemplary implementation mode, the first scan transistor GT1 to the eighth scan transistor GT8 may be P-type transistors or may be N-type transistors.

In an exemplary implementation mode, the first power supply terminal V1 continuously provides a high-level signal and the second power supply terminal V2 continuously provides a low-level signal.

Figure 7B:
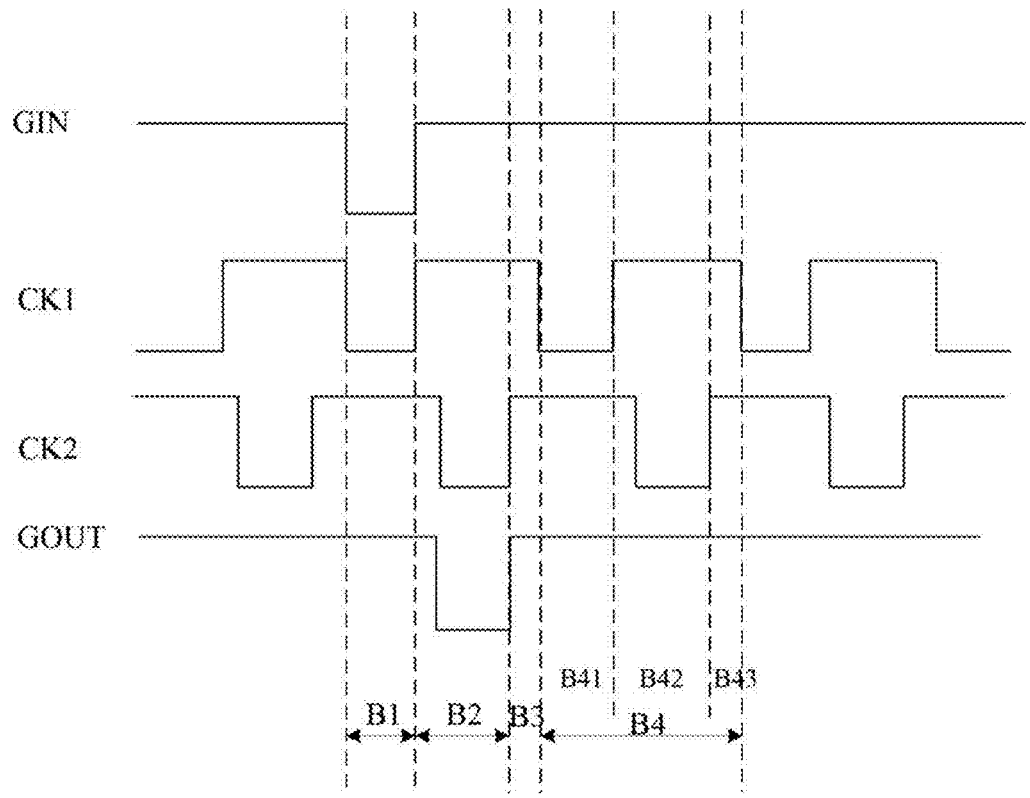
FIG. 7B is a timing diagram of the scan shift register provided in FIG. 7A.

FIG. 7B is a timing diagram of the scan shift register provided in FIG. 7A, FIG. 7B is illustrated by taking a case that the first scan transistor GT1 to the eighth scan transistor GT8 are P-type transistors as an example. As shown in FIG. 7B, a working process of a scan shift register provided by an exemplary embodiment includes following stages.

In an input stage B1, signals of the first clock signal terminal CK1 and the input terminal GIN are low-level signals, and a signal of the second clock signal terminal CK2 is a high-level signal. Since a signal of the first clock signal terminal CK1 is a low-level signal, the first scan transistor GT1 is turned on, and a signal of the input terminal GIN is transmitted to the first node N1 through the first scan transistor GT1. Since the eighth scan transistor GT8 receives a low-level signal of the second power supply terminal V2, the eighth scan transistor GT8 is in an ON state. A level of the third node N3 may turn on the fifth scan transistor GT5, and the signal of the second clock signal terminal CK2 is transmitted to the output terminal GOUT through the fifth scan transistor GT5, that is, in the input stage B1, a signal of the output terminal GOUT is the signal of the second clock signal terminal CK2 which is the high-level signal. In addition, since the signal of the first clock signal terminal CK1 is the low-level signal, the third scan transistor GT3 is turned on, and the low-level signal of the second power supply terminal V2 is transmitted to the second node N2 via the third scan transistor GT3. At this point, both the fourth scan transistor GT4 and the sixth scan transistor GT6 are turned on. Since the signal of the second clock signal terminal CK2 is the high-level signal, the seventh scan transistor GT7 is turned off.

In an output stage B2, a signal of the first clock signal terminal CK1 is a high-level signal, a signal of the second clock signal terminal CK2 is a low-level signal, and a signal of the input terminal GIN is a high-level signal. The fifth scan transistor GT5 is turned on, and the signal of the second clock signal terminal CK2 is used as a signal of the output terminal GOUT via the fifth scan transistor GT5. In the output phase B2, a signal at one end of the second scan capacitor GC2 connected with the output terminal GOUT, becomes a signal of the second power supply terminal V2. Due to a bootstrap function of the second scan capacitor GC2, the eighth scan transistor GT8 is turned off, the fifth scan transistor GT5 may be turned on better, and the signal of the output terminal GOUT is a low-level signal. In addition, the signal of the first clock signal terminal CK1 is the high-level signal, so that both the first scan transistor GT1 and the third scan transistor GT3 are turned off. The second scan transistor GT2 is turned on, and the high-level signal of the first clock signal terminal CK1 is transmitted to the second node N2 via the second scan transistor GT2, so that both the fourth scan transistor GT4 and the sixth scan transistor GT6 are turned off. Since the signal of the second clock signal terminal CK2 is the low-level signal, the seventh scan transistor GT7 is turned on.

In a buffering stage B3, signals of the first clock signal terminal CK1 and the second clock signal terminal CK2 are both high-level signals, a signal of the input terminal GIN is a high-level signal, the fifth scan transistor GT5 is turned on, and a signal of the second clock signal terminal CK2 is used as an output signal via the fifth control transistor GT5. Due to a bootstrap function of the second scan capacitor GC2, a level of a signal of the first node N1 becomes V2-Vth. In addition, a signal of the first clock signal terminal CK1 is a high-level signal, so that the first scan transistor GT1 and the third scan transistor GT3 are both turned off, the eighth scan transistor GT8 is turned on, the second scan transistor GT2 is turned on, and the high-level signal of the first scan clock signal terminal CK1 is transmitted to the second node N2 via the second scan transistor GT2, and thus both the fourth scan transistor GT4 and the sixth scan transistor GT6 are turned off. Since a signal of the second clock signal terminal CK2 is a high-level signal, the seventh scan transistor GT7 is turned off.

In a first sub-stage B41 of a stabilization stage B4, a signal of the first clock signal terminal CK1 is a low-level signal, and signals of the second clock signal terminal CK2 and the input terminal GIN are high-level signals. Since the signal of the first clock signal terminal CK1 is the low-level signal, the first scan transistor GT1 is turned on, a signal of the input terminal GIN is transmitted to the first node N1 via the first scan transistor GT1, and the second scan transistor GT2 is turned off. Since the eighth scan transistor GT8 is in an ON state, the fifth scan transistor GT5 is turned off. Since the signal of the first clock signal terminal CK1 is at a low level, the third scan transistor GT3 is turned on, the fourth scan transistor GT4 and the sixth scan transistor GT6 are both turned on, and a high-level signal of the first power supply terminal V1 is transmitted to the output terminal GOUT via the fourth scan transistor GT4, that is, a signal of the output terminal GOUT is a high-level signal.

In a second sub-stage B42 of the stabilization stage B4, a signal of the first clock signal terminal CK1 is a high-level signal, a signal of the second clock signal terminal CK2 is a low-level signal, and a signal of the input terminal GIN is a high-level signal. Both the fifth scan transistor GT5 and the second scan transistor GT2 are turned off. The signal of the first clock signal terminal CK1 is the high-level signal, so that the first scan transistor GT1 and the third scan transistor GT3 are both turned off. Under a holding function of the first scan capacitor GC1, the fourth scan transistor GT4 and the sixth scan transistor GT6 are both turned on, and a high-level signal is transmitted to the output terminal GOUT via the fourth scan transistor GT4, that is, a signal of the output terminal GOUT is a high-level signal.

In the second sub-phase B42, since the signal of the second clock signal terminal CK2 is the low-level signal, the seventh scan transistor GT7 is turned on, thus a high-level signal is transmitted to the third node N3 and the first node N1 via the sixth scan transistor GT6 and the seventh scan transistor GT7, so that signals of the third node N3 and the first node N1 are kept as high-level signals.

In a third sub-stage B43, signals of the first clock signal terminal CK1 and the second clock signal terminal CK2 are both high-level signals, and a signal of the input terminal GIN is a high-level signal. The fifth scan transistor GT5 and the second scan transistor GT2 are turned off. A signal of the first clock signal terminal CK1 is a high-level signal, so that the first scan transistor GT1 and the third scan transistor GT3 are both turned off, and the fourth scan transistor GT4 and the sixth scan transistor GT6 are both turned on. A high-level signal is transmitted to the output terminal GOUT via the fourth scan transistor GT4, that is, a signal of the output terminal GOUT is a high-level signal.

Figure 8A:
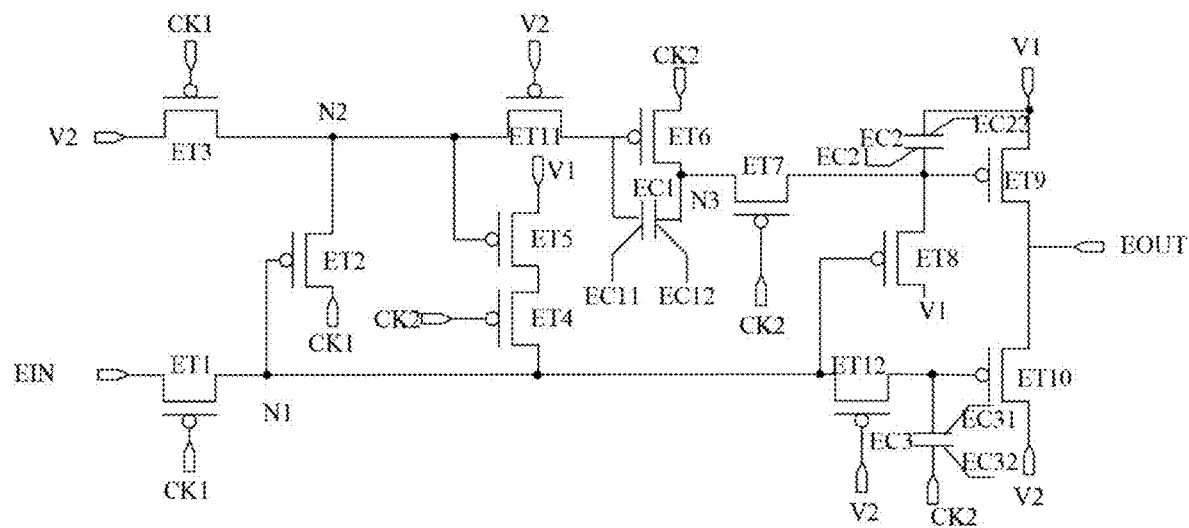
FIG. 8A is an equivalent circuit diagram of a light emitting shift register of the display substrate provided in FIG. 6A.

FIG. 8A is an equivalent circuit diagram of a light emitting shift register of the display substrate provided in FIG. 6A. As shown in FIG. 8A, the light emitting shift register may include a first light emitting transistor ET1 to a twelfth light emitting transistor ET12 and a first light emitting capacitor EC1 to a third light emitting capacitor EC3.

In an exemplary implementation mode, as shown in FIG. 8A, a control electrode of the first light emitting transistor ET1 is electrically connected with the first clock signal terminal CK1, a first electrode of the first light emitting transistor ET1 is electrically connected with the input terminal EIN, and a second electrode of the first light emitting transistor ET1 is electrically connected with the first node N1; a control electrode of the second light emitting transistor ET2 is electrically connected with the first node N1, a first electrode of the second light emitting transistor ET2 is electrically connected with the first clock signal terminal CK1, and a second electrode of the second light emitting transistor ET2 is electrically connected with the second node N2; a control electrode of the third light emitting transistor ET3 is electrically connected with the first clock signal terminal CK1, a first electrode of the third light emitting transistor ET3 is electrically connected with the second power supply terminal V2, and a second electrode of the third light emitting transistor ET3 is electrically connected with the second node N2; a control electrode of the fourth light emitting transistor ET4 is electrically connected with the second clock signal terminal CK2, a first electrode of the fourth light emitting transistor ET4 is electrically connected with the first node N1, and a second electrode of the fourth light emitting transistor ET4 is electrically connected with a first electrode of the fifth light emitting transistor ET5; a control electrode of the fifth light emitting transistor ET5 is electrically connected with the second node N2, and a second electrode of the fifth light emitting transistor ET5 is electrically connected with the first power supply terminal V1; a control electrode of the eleventh light emitting transistor ET11 is electrically connected with the second power supply terminal V2, a first electrode of the eleventh light emitting transistor ET11 is electrically connected with the second node N2, and a second electrode of the eleventh light emitting transistor ET11 is electrically connected with a control electrode of the sixth light emitting transistor ET6; a first electrode of the sixth light emitting transistor ET6 is electrically connected with the second clock signal terminal CK2, and a second electrode of the sixth light emitting transistor ET6 is electrically connected with the third node N3; a control electrode of the seventh light emitting transistor ET7 is electrically connected with the second clock signal terminal CK2, a first electrode of the seventh light emitting transistor ET7 is electrically connected with the third node N3, and a second electrode of the seventh light emitting transistor ET7 is electrically connected with a control electrode of the ninth light emitting transistor ET9; a control electrode of the eighth light emitting transistor ET8 is electrically connected with the first node N1, a first electrode of the eighth light emitting transistor ET8 is electrically connected with the first power supply terminal V1, and a second electrode of the eighth light emitting transistor ET8 is electrically connected with a control electrode of the ninth light emitting transistor ET9; a first electrode of the ninth light emitting transistor ET9 is electrically connected with the first power supply terminal V1, and a second electrode of the ninth light emitting transistor ET9 is electrically connected with the output terminal EOUT; a control electrode of the twelfth light emitting transistor ET12 is electrically connected with the second power supply terminal, a first electrode of the twelfth light emitting transistor ET12 is electrically connected with the first node N1, a second electrode of the twelfth light emitting transistor ET12 is electrically connected with a control electrode of the tenth light emitting transistor ET10, a first electrode of the tenth light emitting transistor ET10 is electrically connected with the second power supply terminal V2, and a second electrode of the tenth light emitting transistor ET10 is electrically connected with the output terminal EOUT; a first electrode plate of the first light emitting capacitor EC1 is electrically connected with the control electrode of the sixth light emitting transistor ET6, and a second electrode plate of the first light emitting capacitor EC1 is electrically connected with the third node N3; a first electrode plate of the second light emitting capacitor EC2 is electrically connected with the control electrode of the ninth light emitting transistor ET9, and a second electrode plate of the second light emitting capacitor EC2 is electrically connected with the first power supply terminal V1; a first electrode plate of the third light emitting capacitor EC3 is electrically connected with the control electrode of the tenth light emitting transistor ET10, and a second electrode plate of the third light emitting capacitor EC3 is electrically connected with the second clock signal terminal CK2.

In an exemplary implementation mode, the first light emitting transistor ET1 to the twelfth light emitting transistor to ET12 may be P-type transistors or may be N-type transistors.

In an exemplary implementation mode, the first power supply terminal V1 continuously provides a high-level signal, the second power supply terminal V2 continuously provides a low-level signal, and the eleventh light emitting transistor ET11 and the twelfth light emitting transistor ET12 are continuously turned on.

Figure 8B:
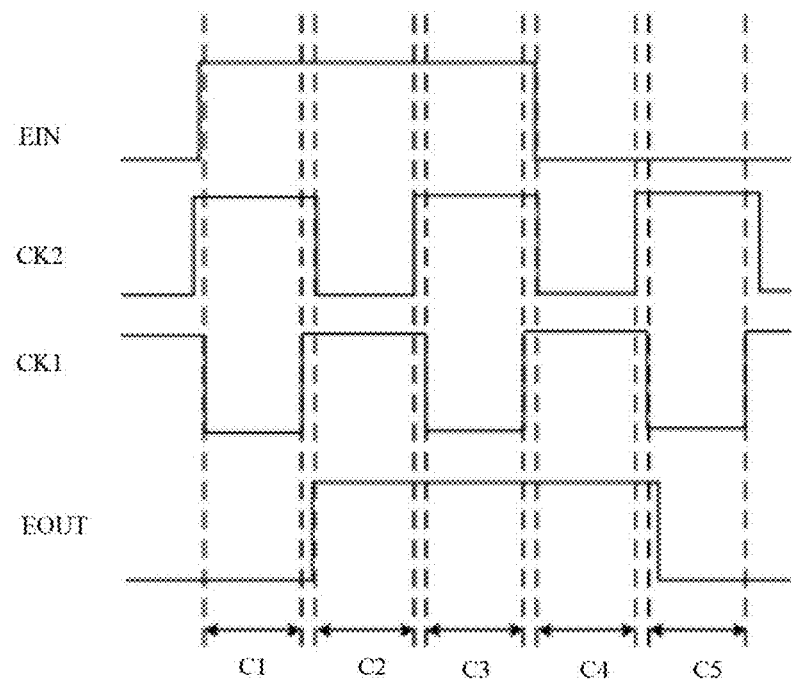
FIG. 8B is a timing diagram of the light emitting shift register provided in FIG. 8A.

FIG. 8B is a timing diagram of the light emitting shift register provided in FIG. 8A. FIG. 8A is illustrated by taking a case that the first light emitting transistor ET1 to the twelfth light emitting transistor ET12 are P-type transistors as an example. As shown in FIG. 8B, a working process of a light emitting shift register provided by an exemplary embodiment may include following stages.

In a first stage C1, a signal of the first clock signal terminal CK1 is at a low level, so the first light emitting transistor ET1 and the third light emitting transistor ET3 are turned on. The turned-on first light emitting transistor ET1 transmits a high-level signal of the input terminal EIN to the first node N1, and a signal of the first node N1 becomes a high-level signal, so the second light emitting transistor ET2, the eighth light emitting transistor ET8, and the tenth light emitting transistor ET10 are turned off. In addition, the turned-on third light emitting transistor ET3 transmits a low-level signal of the second power supply terminal V2 to the second node N2, and a signal of the second node N2 becomes a low-level signal, so the fifth light emitting transistor ET5 and the sixth light emitting transistor ET6 are turned on. Since a signal of the second clock signal terminal CK2 is a high-level signal, the seventh light emitting transistor ET7 is turned off. In addition, the ninth light emitting transistor ET9 is turned off due to a storage function of the third light emitting capacitor EC3. In the first stage C1, since both the ninth light emitting transistor ET9 and the tenth light emitting transistor ET10 are turned off, a signal of the output terminal EOUT is kept at a previous low level.

In a second stage C2, a signal of the second clock signal terminal CK2 is at a low level, so the fourth light emitting transistor ET4 and the seventh light emitting transistor ET7 are turned on. Since a signal of the first clock signal terminal CK1 is at a high level, the first light emitting transistor ET1 and the third light emitting transistor ET3 are turned off. Due to a storage function of the first light emitting capacitor EC1, the second node N2 may continue to maintain a low level of a previous stage, so the fifth light emitting transistor ET5 and the sixth light emitting transistor ET6 are turned on. A high-level signal of the first power supply terminal V1 is transmitted to the first node N1 through the turned-on fifth light emitting transistor ET5 and the fourth light emitting transistor ET4, and a level of the first node N1 continues to maintain a high level of the previous stage, so the second light emitting transistor ET2, the eighth light emitting transistor ET8, and the tenth light emitting transistor ET10 are turned off. In addition, a low-level signal of the second clock signal terminal CK2 is transmitted to the control electrode of the ninth light emitting transistor ET9 through the turned-on sixth light emitting transistor ET6 and the seventh light emitting transistor ET7, the ninth light emitting transistor ET9 is turned on, and the turned-on ninth light emitting transistor ET9 outputs the high-level signal of the first power supply terminal V1, and a signal of the output terminal EOUT is at a high level.

In a third stage C3, a signal of the first clock signal terminal CK1 is at a low level, so the first light emitting transistor ET1 and the third light emitting transistor ET3 are turned on. A signal of the second clock signal terminal CK2 is at a high level, so the fourth light emitting transistor ET4 and the seventh light emitting transistor ET7 are turned off. Due to a storage function of the third light emitting capacitor EC3, the ninth light emitting transistor ET9 maintains a turned-on state, the turned-on ninth light emitting transistor ET9 outputs a high-level signal of the first power supply terminal V1, and a signal of the output terminal EOUT still remains at a high level.

In a fourth stage C4, a signal of the first clock signal terminal CK1 is at a high level, so the first light emitting transistor ET1 and the third light emitting transistor ET3 are turned off. A signal of the second clock signal terminal CK2 is at a low level, so the fourth light emitting transistor ET4 and the seventh light emitting transistor ET7 are turned on. Due to a storage function of the second light emitting capacitor EC2, a level of the first node N1 maintains a high level of a previous stage, and the second light emitting transistor ET2, the eighth light emitting transistor ET8, and the tenth light emitting transistor ET10 are turned off. Due to a storage function of the first light emitting capacitor EC1, the second node N2 continues to maintain a low level of the previous stage, the fifth light emitting transistor ET5 and the sixth light emitting transistor ET6 are turned on. In addition, a low-level signal of the second clock signal terminal CK2 is transmitted to the control electrode of the ninth light emitting transistor ET9 through the turned-on sixth light emitting transistor ET6 and the seventh light emitting transistor ET7, so the ninth light emitting transistor ET9 is turned on, the turned-on ninth light emitting transistor ET9 outputs a high-level signal of the first power supply terminal V1, and a signal of the output terminal EOUT still remains at a high level.

In a fifth stage C5, a signal of the first clock signal terminal CK1 is at a low level, so the first light emitting transistor ET1 and the third light emitting transistor ET3 are turned on. A signal of the second clock signal terminal CK2 is at a high level, so the fourth light emitting transistor ET4 and the seventh light emitting transistor ET7 are turned off. The turned-on first light emitting transistor ET1 transmits a high-level signal of the input terminal EIN to the first node N1, and a signal of the first node N1 becomes a low-level signal, so the second light emitting transistor ET2, the eighth light emitting transistor ET8, and the tenth light emitting transistor ET10 are turned on. The turned-on second light emitting transistor ET2 transmits the signal of the first clock signal terminal CK1 which is at the low-level to the second node N2, a level of the second node N2 may be pulled down, so the second node N2 continues to maintain a low level of a previous stage, and the fifth light emitting transistor ET5 and the sixth light emitting transistor ET6 are turned on. In addition, the turned-on eighth light emitting transistor ET8 transmits a high-level signal of the first power supply terminal V1 to the control electrode of the ninth light emitting transistor ET9, so the ninth light emitting transistor ET9 is turned off. The turned-on tenth light emitting transistor ET10 outputs a low-level signal of the second power supply terminal V2, and a signal of the output terminal EOUT turns to be at a low level.

Figure 9:
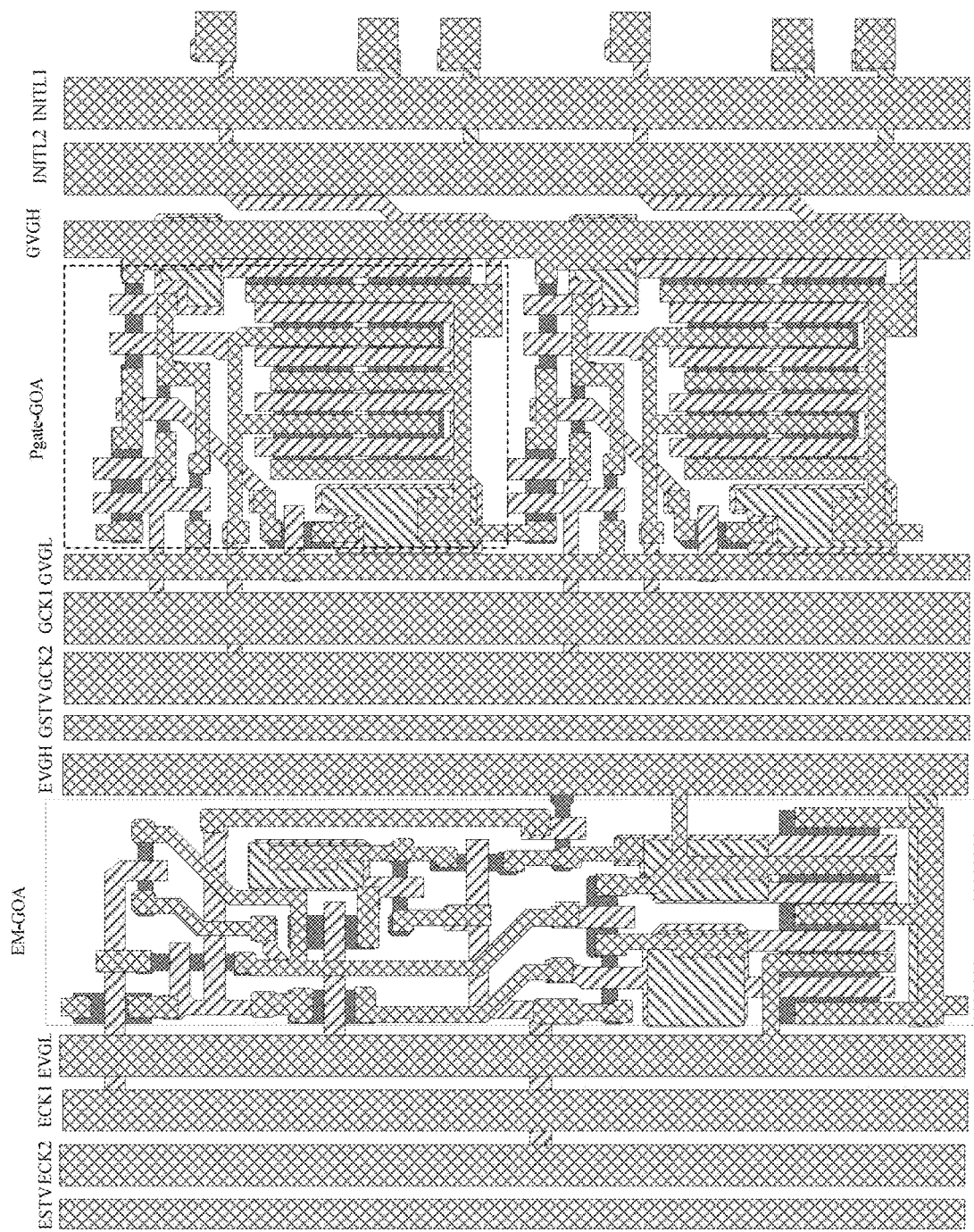
FIG. 9 is a schematic diagram of a structure of a first region of the display substrate provided in FIG. 6A.
Figure 10:
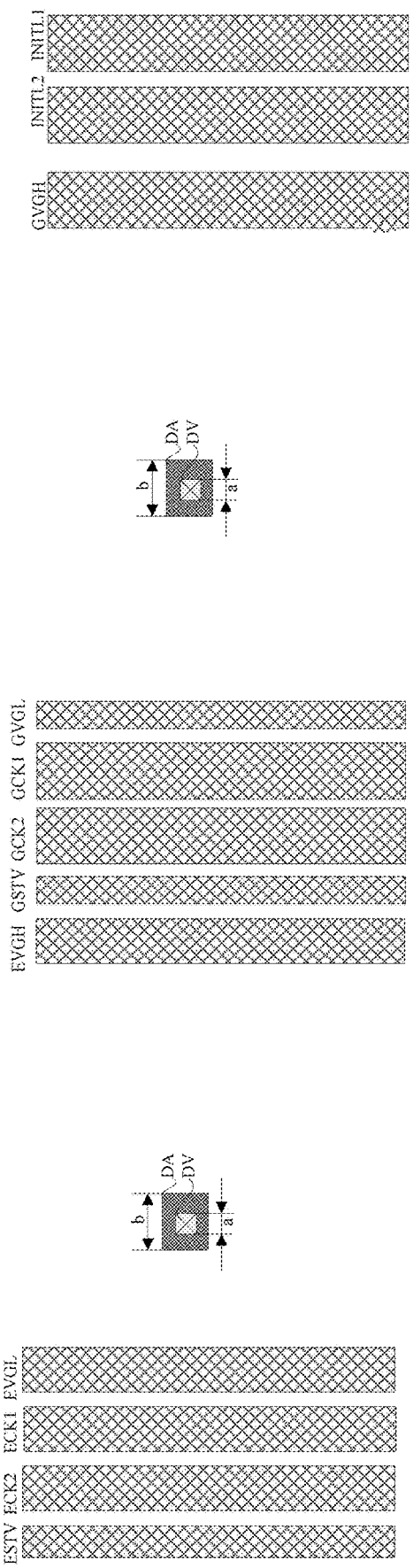
FIG. 10 is a schematic diagram I of a structure of a second region of the display substrate provided in FIG. 6A.
Figure 11:
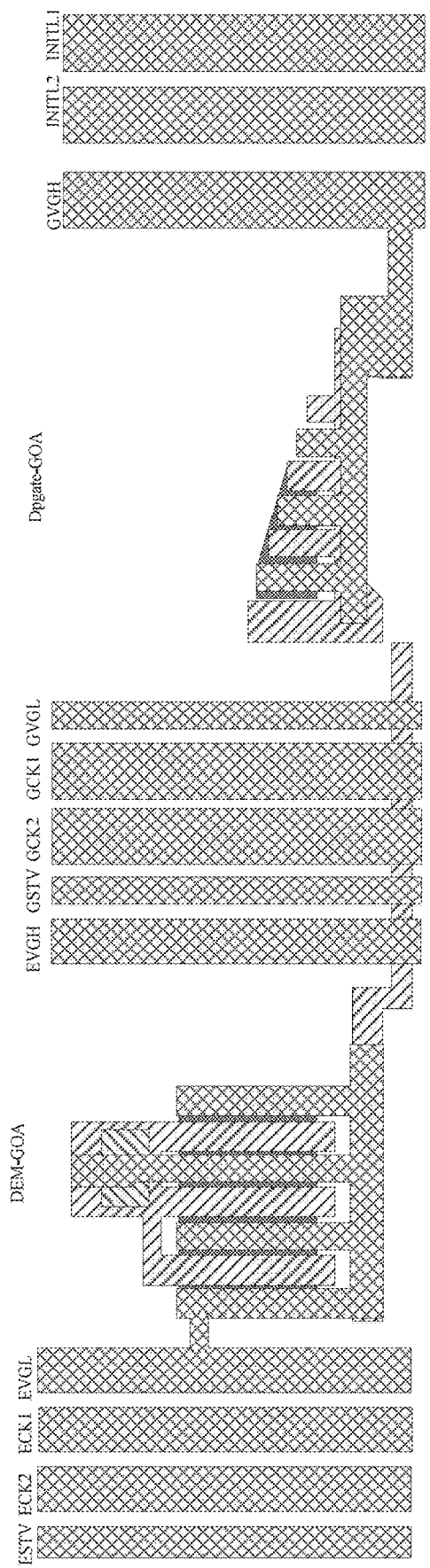
FIG. 11 is a schematic diagram II of a structure of a second region of the display substrate provided in FIG. 6A.
Figure 12:
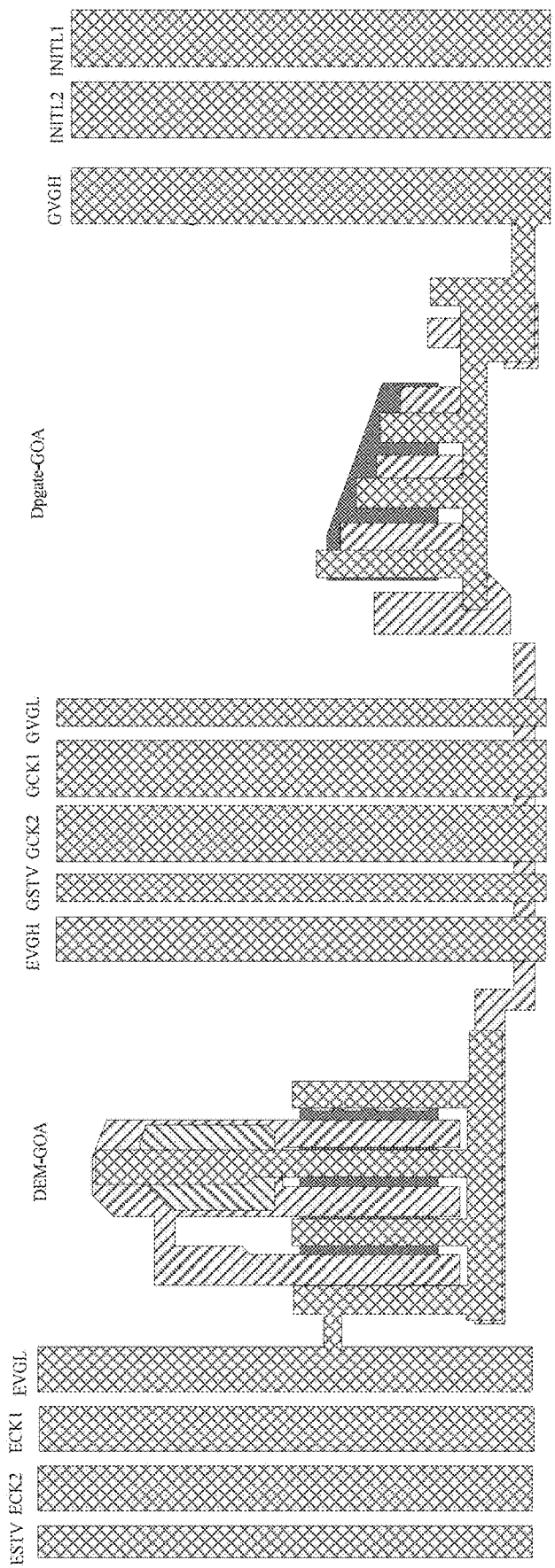
FIG. 12 is a schematic diagram III of a structure of a second region of the display substrate provided in FIG. 6A.
Figure 13:
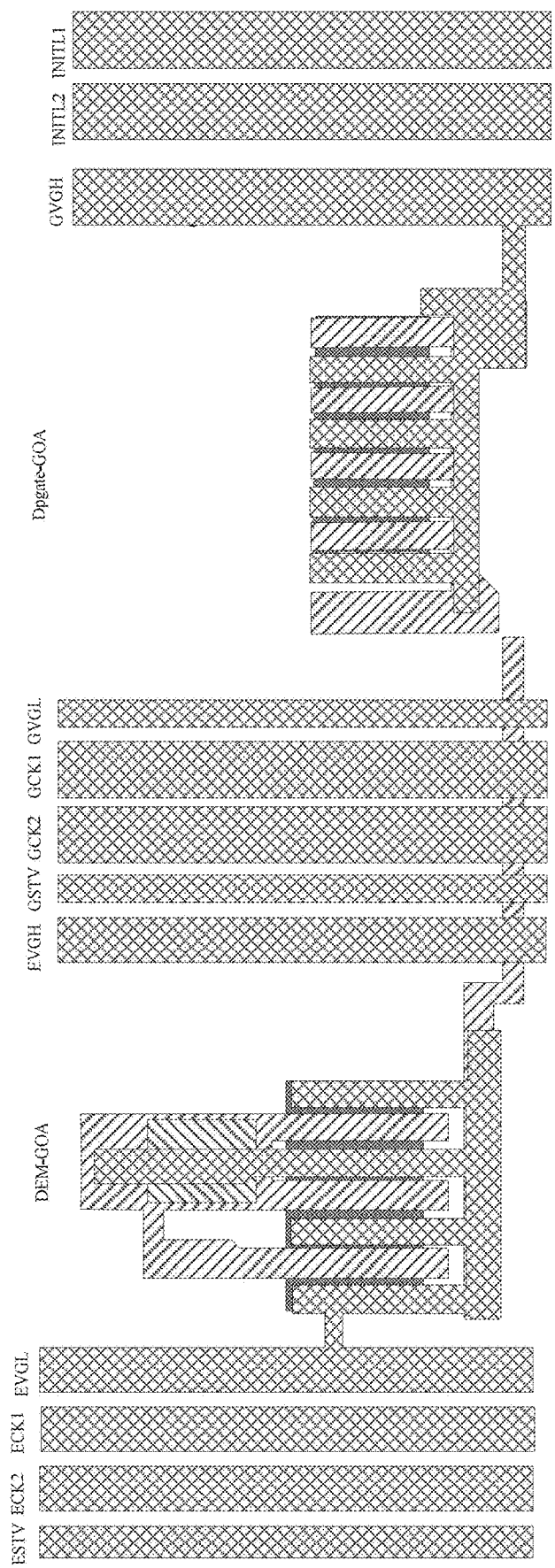
FIG. 13 is a schematic diagram IV of a structure of a second region of the display substrate provided in FIG. 6A.

In an exemplary implementation mode, FIG. 9 is a schematic diagram of a structure of a first region of the display substrate provided in FIG. 6A, FIG. 10 is a schematic diagram I of a structure of a second region of the display substrate provided in FIG. 6A, FIG. 11 is a schematic diagram II of a structure of a second region of the display substrate provided in FIG. 6A, FIG. 12 is a schematic diagram III of a structure of a second region of the display substrate provided in FIG. 6A, and FIG. 13 is a schematic diagram IV of a structure of a second region of the display substrate provided in FIG. 6A. FIG. 10 is illustrated by taking a case that a dummy via DV is provided in the second region as an example, and FIG. 11 to FIG. 13 are illustrated by taking a case that a dummy register is provided in the second region as an example. As shown in FIGS. 9 to 13, the drive circuit layer may further include a light emitting initial signal line ESTV, a first light emitting clock signal line ECK1, a second light emitting clock signal line ECK2, a first light emitting power supply line EVGH, a second light emitting power supply line EVGL, a scan initial signal line GSTV, a first scan clock signal line GCK1, a second scan clock signal line GCK2, a first scan power supply line GVGH, and a second scan power supply line GVGL located in the non-display region.

In an exemplary implementation mode, as shown in FIG. 9, the light emitting drive circuit is electrically connected with the light emitting initial signal line ESTV, the first light emitting clock signal line ECK1, the second light emitting clock signal line ECK2, the first light emitting power supply line EVGH, and the second light emitting power supply line EVGL, respectively, and is located between the first light emitting power supply line EVGH and the second light emitting power supply line EVGL. An input terminal of a light emitting shift register in a first stage is electrically connected with the light emitting initial signal line ESTV, a first power supply terminal of a light emitting shift register in any stage is electrically connected with the first light emitting power supply line EVGH, a second power supply terminal of the light emitting shift register in any stage is electrically connected with the second light emitting power supply line EVGL, an output terminal of a light emitting shift register in a present stage is electrically connected with an input terminal of a light emitting shift register in a next stage, a first clock signal terminal of the light emitting shift register in any stage is electrically connected with one of the first light emitting clock signal line ECK1 and the second light emitting clock signal line ECK2, a second clock signal terminal of the light emitting shift register in any stage is electrically connected with the other of the first light emitting clock signal line ECK1 and the second light emitting clock signal line ECK2, first clock signal terminals of light emitting shifters in two adjacent stages are connected with different light emitting clock signal lines, and second clock signal terminals of the light emitting shifters in two adjacent stages are connected with different light emitting clock signal lines.

In an exemplary implementation mode, as shown in FIG. 9, the scan drive circuit is electrically connected with the scan initial signal line GSTV, the second scan clock signal line GCK2, the first scan clock signal line GCK1, the first scan power supply line GVGH, and the second scan power supply line GVGL, respectively, and is located between the first scan power supply line GVGH and the second scan power supply line GVGL. An input terminal of a scan shift register in a first stage is electrically connected with the scan initial signal line GSTV, a first power supply terminal of a scan shift register in any stage is electrically connected with the first scan power supply line GVGH, a second power supply terminal of the scan shift register in any stage is electrically connected with the second scan power supply line GVGL, an output terminal of a scan shift register in a present stage is electrically connected with an input terminal of a scan shift register in a next stage, a first clock signal terminal of the scan shift register in any stage is electrically connected with one of the first scan clock signal line GCK1 and the second scan clock signal line GCK2, a second clock signal terminal of the scan shift register in any stage is electrically connected with the other of the first scan clock signal line GCK1 and the second scan clock signal line GCK2, first clock signal terminals of scan shifters in two adjacent stages are connected with different scan clock signal lines, and second clock signal terminals of the scan shifters in two adjacent stages are connected with different scan clock signal lines.

In an exemplary implementation mode, as shown in FIG. 6C and FIG. 9 to FIG. 13, the second light emitting clock signal line ECK2 is located on a side of the light emitting initial signal line ESTV close to the display region, the first light emitting clock signal line ECK1 is located on a side of the second light emitting clock signal line ECK2 close to the display region, the second light emitting power supply line EVGL is located on a side of the first light emitting clock signal line ECK1 close to the display region, the first light emitting power supply line EVGH is located on a side of the second light emitting power supply line EVGL close to the display region, the scan initial signal line GSTV is located on a side of the first light emitting power supply line EVGH close to the display region, the second scan clock signal line GCK2 is located on a side of the scan initial signal line GSTV close to the display region, the first scan clock signal line GCK1 is located on a side of the scan initial signal line GSTV close to the display region, the second scan power supply line GVGL is located on a side of the first scan clock signal line GCK1 close to the display region, and the first scan power supply line GVGH is located on a side of the second scan power supply line GVGL close to the display region.

In an exemplary implementation mode, as shown in FIG. 6C, a first signal line located in the straight line region is in a shape of a straight line and an extension direction is the same as an extension direction of the straight line boundary, and a first signal line located in the rounded corner region is in a shape of a bending line and is composed of a plurality of straight line segments, an extension direction of a straight line segment is the same as an extension direction of a boundary of a first region or the second region where the straight line segment is located away from the display region. Among them, a first signal line is any one of the light emitting initial signal line ESTV, the first light emitting clock signal line ECK1, the second light emitting clock signal line ECK2, the first light emitting power supply line EVGH, the second light emitting power supply line EVGL, the scan initial signal line GSTV, the first scan clock signal line GCK1, the second scan clock signal line GCK2, the first scan power supply line GVGH, and the second scan power supply line GVGL.

In an exemplary implementation mode, the light emitting shift register may include a plurality of light emitting transistors and a plurality of light emitting capacitors, the scan shift register may include a plurality of scan transistors and a plurality of scan capacitors, the light emitting capacitors and the scan capacitors each include a first electrode plate and a second electrode plate, and the drive circuit layer includes a semiconductor layer, a first conductive layer, a second conductive layer, and a third conductive layer stacked sequentially.

The semiconductor layer may at least include active layers of the plurality of light emitting transistors and active layers of the plurality of scan transistors.

The first conductive layer may at least include control electrodes of the plurality of light emitting transistors, first electrode plates of the plurality of light emitting capacitors, control electrodes of the plurality of scan transistors, and first electrode plates of the plurality of scan capacitors.

The second conductive layer may at least include second electrode plates of the plurality of light emitting capacitors and second electrode plates of the plurality of scan capacitors.

The third conductive layer may at least include the light emitting initial signal line ESTV, the first light emitting clock signal line ECK1, the second light emitting clock signal line ECK2, the first light emitting power supply line EVGH, the second light emitting power supply line EVGL, the scan initial signal line GSTV, the first scan clock signal line GCK1, the second scan clock signal line GCK2, the first scan power supply line GVGH, and the second scan power supply line GVGL, first electrodes and second electrodes of the plurality of light emitting transistors, and first electrodes and second electrodes of the plurality of scan transistors.

In an exemplary implementation mode, as shown in FIG. 11 to FIG. 13, when the second region includes a dummy register, the dummy register may include at least one of a dummy light emitting shift register DEM-GOA and a dummy scan shift register DPgate-GOA, FIG. 11 to FIG. 13 are illustrated by taking a case that the dummy register includes a dummy light emitting shift register DEM-GOA and a dummy scan shift register DPgate-GOA as an example.

In an exemplary implementation mode, as shown in FIG. 11 to FIG. 13, the dummy light emitting shift register DEM-GOA is electrically connected with at least one of the first light emitting power supply line EVGH and the second light emitting power supply line EVGL, and is located between the first light emitting power supply line EVGH and the second light emitting power supply line EVGL. FIG. 11 to FIG. 13 are illustrated by taking a case that the dummy light emitting shift register DEM-GOA is electrically connected with the second light emitting power supply line EVGL as an example.

In an exemplary implementation mode, as shown in FIG. 11 to FIG. 13, the dummy light emitting shift register is not connected with the light emitting initial signal line ESTV, the first light emitting clock signal line ECK1, and the second light emitting clock signal line ECK2. An orthographic projection of the dummy light emitting shift register on the base substrate is not overlapped with orthographic projections of the light emitting initial signal line ESTV, the first light emitting clock signal line ECK1, and the second light emitting clock signal line ECK2 on the base substrate.

In an exemplary implementation mode, as shown in FIG. 11 to FIG. 13, the dummy scan shift register DPgate-GOA is electrically connected with at least one of the first scan power supply line GVGH and the second scan power supply line GVGL, and is located between the first scan power supply line GVGH and the second scan power supply line GVGL. FIG. 11 to FIG. 13 are illustrated by taking a case that the dummy scan shift register DPgate-GOA is electrically connected the first scan power supply line GVGH as an example.

In an exemplary implementation mode, as shown in FIG. 11 to FIG. 13, the dummy scan shift register is not connected with the scan initial signal line GSTV, the first scan clock signal line GCK1, and the second scan clock signal line GCK2. An orthographic projection of the dummy scan shift register on the base substrate is not overlapped with orthographic projections of the scan initial signal line GSTV, the first scan clock signal line GCK1, and the second scan clock signal line GCK2 on the base substrate.

In an exemplary implementation mode, a quantity of transistors of the dummy light emitting shift register DEM-GOA is less than a quantity of transistors of the light emitting shift register.

Figure 14:
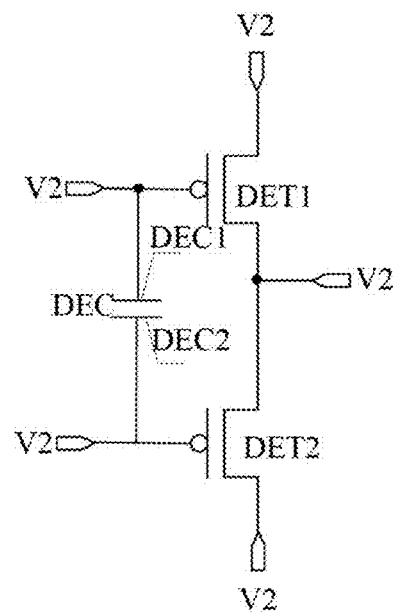
FIG. 14 is a circuit diagram of a dummy light emitting shift register of the display substrate provided in FIG. 6A.

FIG. 14 is a circuit diagram of a dummy light emitting shift register of the display substrate provided in FIG. 6A. As shown in FIG. 14, the dummy light emitting shift register of the display substrate provided in FIG. 6A may include a first dummy light emitting transistor DET1, a second dummy light emitting transistor DET2, and a dummy light emitting capacitor DEC, and the dummy light emitting capacitor DEC includes a first electrode plate DEC1 and a second electrode plate DEC2. Among them, a control electrode, a first electrode, and a second electrode of the first dummy light emitting transistor DET1 are respectively electrically connected with the second power supply terminal V2, a control electrode, a first electrode, and a second electrode of the second dummy light emitting transistor DET2 are respectively electrically connected with the second power supply terminal V2, and the first electrode plate DEC1 and the second electrode plate DEC2 of the dummy light emitting capacitor DEC are respectively electrically connected with the second power supply terminal V2.

In an exemplary implementation mode, a shape of the first dummy light emitting transistor DET1 is similar to a shape of at least part of the ninth light emitting transistor in the light emitting shift register, and a shape of the second dummy light emitting transistor DET2 is similar to a shape of at least part of the tenth light emitting transistor in the light emitting shift register.

In an exemplary implementation mode, as shown in FIG. 11 to FIG. 13, the second power supply terminal V2 is electrically connected with the second light emitting power supply line EVGL.

In an exemplary implementation mode, a quantity of transistors of the dummy scan shift register DPgate-GOA is less than or equal to a quantity of transistors of the scan shift register.

Figure 15:
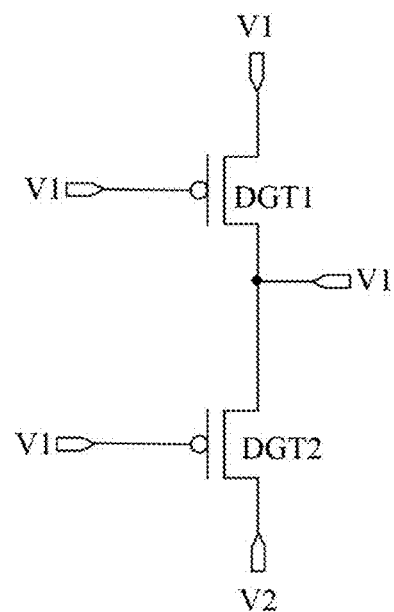
FIG. 15 is a circuit diagram of a dummy scan shift register of the display substrate provided in FIG. 6A.

FIG. 15 is a circuit diagram of a dummy scan shift register of the display substrate provided in FIG. 6A. As shown in FIG. 15, the dummy scan shift register may include a first dummy scan transistor DET1 and a second dummy scan transistor DET2. Among them, a control electrode, a first electrode, and a second electrode of the first dummy scan transistor DET1 are respectively electrically connected with the first power supply terminal V1, a control electrode and a first electrode of the second dummy scan transistor DET2 are respectively electrically connected with the second power supply terminal V2, and a second electrode of the second dummy scan transistor DET2 is electrically connected with the first power supply terminal V1.

In an exemplary implementation mode, a shape of the first dummy scan transistor DET1 is similar to a shape of at least part of the fourth scan transistor in the scan shift register, and a shape of the second dummy scan transistor DET2 is similar to a shape of at least part of the third scan transistor or the fifth scan transistor in the scan shift register.

In an exemplary implementation mode, as shown in FIG. 11 to FIG. 13, the first power supply terminal V1 is electrically connected with the first scan power supply line GVGH, and the second power supply terminal V2 is electrically connected with the second scan power supply line GVGL.

In an exemplary implementation mode, an area of the dummy light emitting shift register in FIG. 11 is less than an area of the dummy light emitting shift register in FIG. 12, the area of the dummy light emitting shift register in FIG. 12 is less than that of the dummy light emitting shift register in FIG. 13, an area of the dummy scan shift register in FIG. 11 is less than an area of the dummy scan shift register in FIG. 12, and the area of the dummy scan shift register in FIG. 12 is less than that of the dummy scan shift register in FIG. 13.

In an exemplary implementation mode, the dummy light emitting shift register DEM-GOA includes at least one dummy light emitting transistor, and the dummy scan shift register DPgate-GOA includes at least one dummy scan transistor.

The semiconductor layer further includes an active layer of at least one dummy light emitting transistor and an active layer of at least one dummy scan transistor.

The first conductive layer further includes a control electrode of at least one dummy light emitting transistor and a control electrode of at least one dummy scan transistor.

The second conductive layer further includes a first electrode and a second electrode of at least one dummy light emitting transistor, and a first electrode and a second electrode of at least one dummy scan transistor.

In an exemplary implementation mode, as shown in FIG. 10, when the second region includes a dummy via DV, the semiconductor layer further includes a dummy active layer DA.

In an exemplary implementation mode, the drive circuit layer may further include a first insulation layer, a second insulation layer, and a third insulation layer that are stacked sequentially, the first insulation layer is located between the semiconductor layer and the first conductive layer, the second insulation layer is located between the first conductive layer and the second conductive layer, the third insulation layer is located between the second conductive layer and the third conductive layer, and a dummy via DV is disposed on the first insulation layer, the second insulation layer, and the third insulation layer.

Figure 16A:
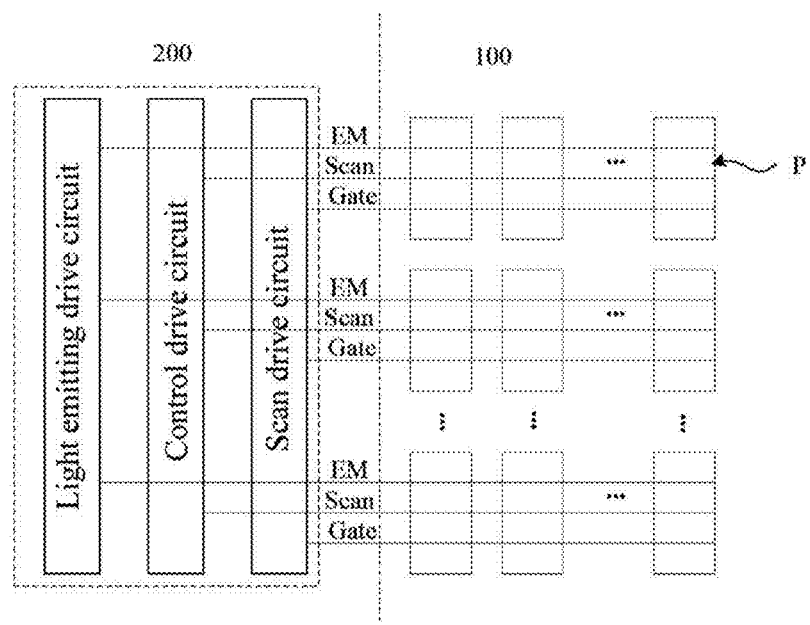
FIG. 16A is a schematic diagram of a structure of a display substrate.
Figure 16B:
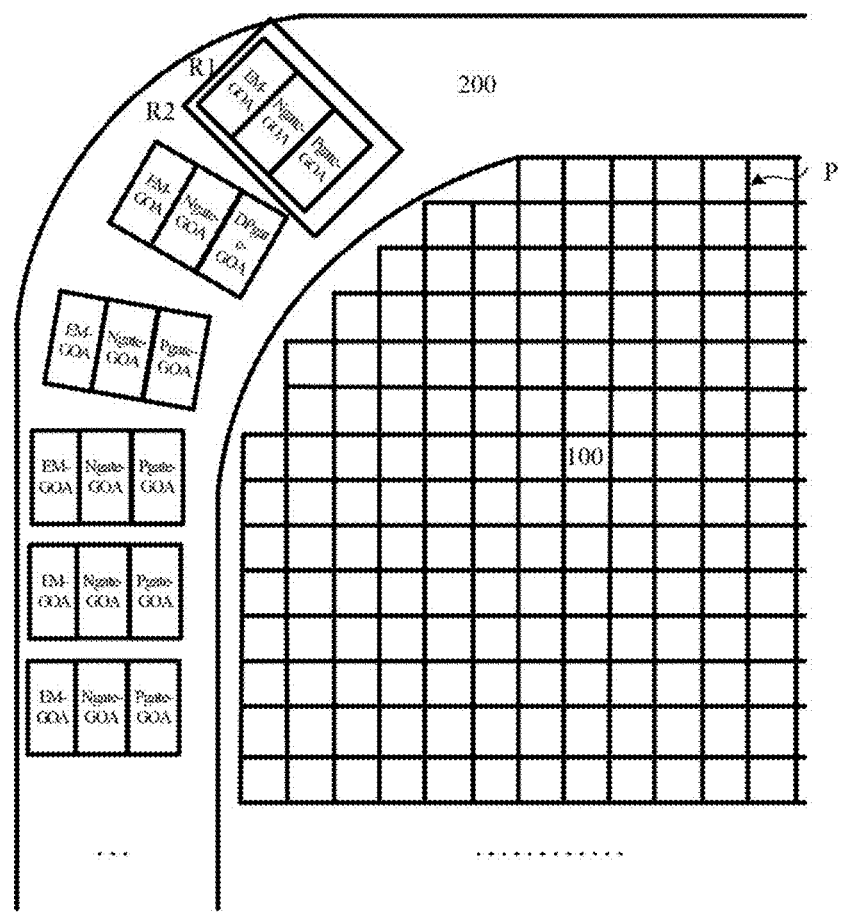
FIG. 16B is a partial schematic diagram of the display substrate provided in FIG. 16A.
Figure 16C:
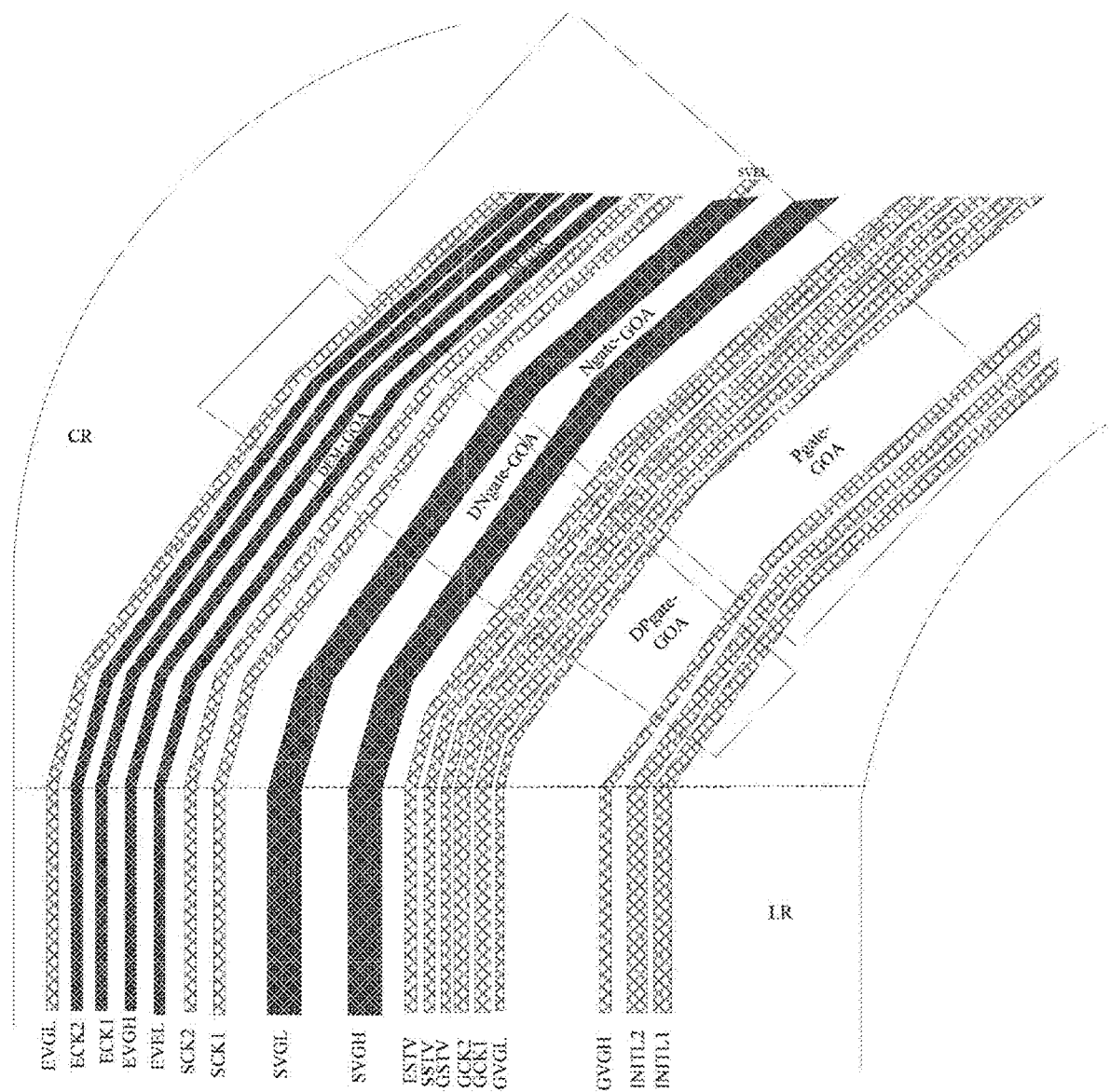
FIG. 16C is another schematic diagram of the display substrate provided in FIG. 16A.

FIG. 16A is a schematic diagram of a structure of a display substrate, FIG. 16B is a partial schematic diagram of the display substrate provided in FIG. 16A, and FIG. 16C is another schematic diagram of the display substrate provided in FIG. 16A. As shown in FIGS. 16A, 16B, and 16C, in an exemplary implementation mode, when the display substrate is an LTPO display substrate, a pixel drive circuit may include a light emitting transistor, a writing transistor, and a control transistor, a plurality of drive circuits include a light emitting drive circuit, a control drive circuit, and a scan drive circuit, the light emitting drive circuit is electrically connected with the light emitting transistor, the scan drive circuit is electrically connected with the writing transistor, the control drive circuit is electrically connected with the control transistor, transistor types of the writing transistor and the control transistor are opposite, the control drive circuit is located on a side of the light emitting drive circuit close to the display region 100 and the scan drive circuit is located on a side of the control drive circuit close to the display region 100.

In an exemplary implementation mode, as shown in FIG. 16A, the light emitting drive circuit is electrically connected with the pixel drive circuit through the light emitting signal line EM, the control drive circuit is electrically connected with the pixel drive circuit through the control signal line Scan, and the scan drive circuit is electrically connected with the pixel drive circuit through the scan signal line Gate.

In an exemplary implementation mode, as shown in FIGS. 16B and 16C, the light emitting drive circuit may include a plurality of cascaded light emitting shift registers EM-GOA, the control drive circuit includes a plurality of cascaded control shift registers Ngate-GOA, and the scan drive circuit includes a plurality of cascaded scan shift registers Pgate-GOA. A first region R1 is provided with one light emitting shift register EM-GOA, at least one control shift register Ngate-GOA, and at least one scan shift register Pgate-GOA. FIG. 16B is illustrated by taking a case that the first region R1 is provided with one light emitting shift register EM-GOA, one control shift register Ngate-GOA, and one scan shift register Pgate-GOA as an example.

In an exemplary implementation mode, the scan shift register may be of an 8T2C circuit structure, the light emitting shift register may be of a 13T3C circuit structure, and the control shift register may be of a 16T3C circuit structure, which is not limited in the present disclosure.

In an exemplary implementation mode, a circuit structure of the scan shift register in the LTPO display substrate may be a circuit structure shown in the scan shift register shown in FIG. 7A.

Figure 17A:
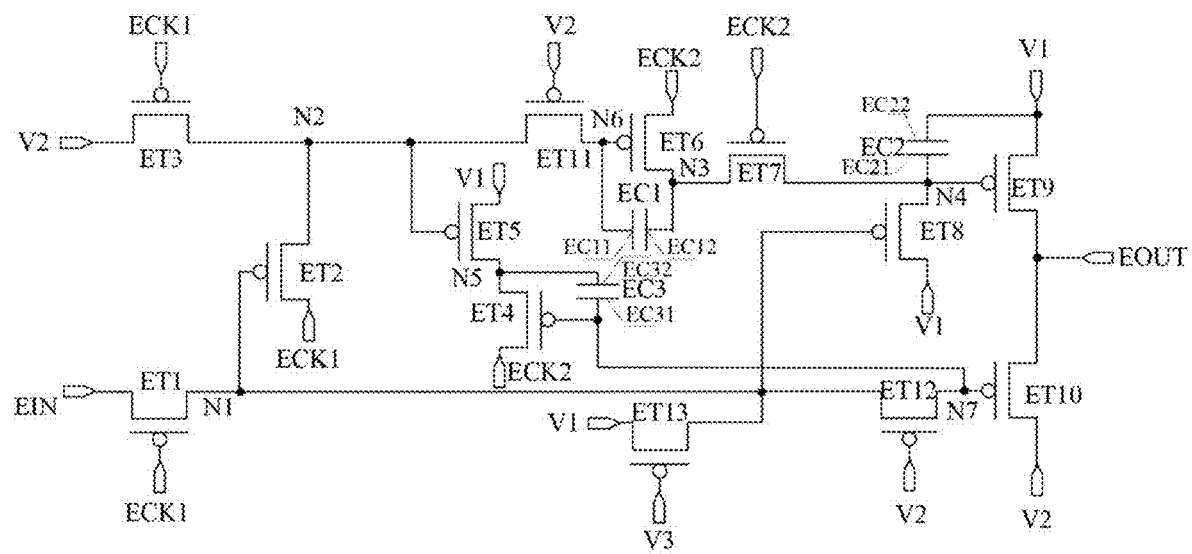
FIG. 17A is an equivalent circuit diagram of a light emitting shift register of the display substrate provided in FIG. 16A.

FIG. 17A is an equivalent circuit diagram of a light emitting shift register of the display substrate provided in FIG. 16A. As shown in FIG. 17A, in an exemplary implementation mode, the light emitting shift register includes a first light emitting transistor ET1 to a thirteenth light emitting transistor ET13 and a first light emitting capacitor EC1 to a third light emitting capacitor EC3.

In an exemplary implementation mode, as shown in FIG. 17A, a control electrode of the first light emitting transistor ET1 is electrically connected with a first clock signal terminal ECK1, a first electrode of the first light emitting transistor ET1 is electrically connected with the input terminal EIN, and a second electrode of the first light emitting transistor ET1 is electrically connected with the first node N1. A control electrode of the second light emitting transistor ET2 is electrically connected with the first node N1, a first electrode of the second light emitting transistor ET2 is electrically connected with the first clock signal line ECK1, and a second electrode of the second light emitting transistor ET2 is electrically connected with a second node N2. A control electrode of the third light emitting transistor ET3 is electrically connected with the first clock signal terminal ECK1, a first electrode of the third light emitting transistor ET3 is electrically connected with the second power supply terminal V2, and a second electrode of the third light emitting transistor ET3 is electrically connected with the second node N2. A control electrode of the fourth light emitting transistor ET4 is electrically connected with a seventh node N7, a first electrode of the fourth light emitting transistor ET4 is electrically connected with a second clock signal terminal ECK2, and a second electrode of the fourth light emitting transistor ET4 is electrically connected with a fifth node N5. A control electrode of the fifth light emitting transistor ET5 is electrically connected with the second node N2, a first electrode of the fifth light emitting transistor ET5 is electrically connected with the first power supply terminal V1, and a second electrode of the fifth light emitting transistor ET5 is electrically connected with the fifth node N5. A control electrode of the sixth light emitting transistor ET6 is electrically connected with a sixth node N6, a first electrode of the sixth light emitting transistor ET6 is electrically connected with the second clock signal terminal ECK2, and a second electrode of the sixth light emitting transistor ET6 is electrically connected with the third node N3. A control electrode of the seventh light emitting transistor ET7 is electrically connected with the second clock signal terminal ECK2, a first electrode of the seventh light emitting transistor ET7 is electrically connected with the third node N3, and a second electrode of the seventh light emitting transistor ET7 is electrically connected with the fourth node N4. A control electrode of the eighth light emitting transistor ET8 is electrically connected with the first node N1, a first electrode of the eighth light emitting transistor ET8 is electrically connected with the first power supply terminal V1, and a second electrode of the eighth light emitting transistor ET8 is electrically connected with the fourth node N4. A control electrode of the ninth light emitting transistor ET9 is electrically connected with the fourth node N4, a first electrode of the ninth light emitting transistor ET9 is electrically connected with the first power supply terminal V1, and a second electrode of the ninth light emitting transistor ET9 is electrically connected with the output terminal EOUT. A control electrode of the tenth light emitting transistor ET10 is electrically connected with the seventh node N7, a first electrode of the tenth light emitting transistor ET10 is electrically connected with the second power supply terminal V2, and a second electrode of the tenth light emitting transistor ET10 is electrically connected with the output terminal EOUT. A control electrode of the eleventh light emitting transistor ET11 is electrically connected with the second power supply terminal V2, a first electrode of the eleventh light emitting transistor ET11 is electrically connected with the second node N2, and a second electrode of the eleventh light emitting transistor ET11 is electrically connected with the sixth node N6. A control electrode of the twelfth light emitting transistor ET12 is electrically connected with the second power supply terminal V2, a first electrode of the twelfth light emitting transistor ET12 is electrically connected with the first node N1, and a second electrode of the twelfth light emitting transistor ET12 is electrically connected with the seventh node N7. A control electrode of the thirteenth light emitting transistor ET13 is electrically connected with a third power supply terminal V3, a first electrode of the thirteenth light emitting transistor ET13 is electrically connected with the first power supply terminal V1, and a second electrode of the thirteenth light emitting transistor ET13 is electrically connected with the first node N1. A first electrode plate EC11 of the first light emitting capacitor EC1 is electrically connected with the sixth node N6, and a second electrode plate EC12 of the first light emitting capacitor EC1 is electrically connected with the third node N3. A first electrode plate EC21 of the second light emitting capacitor EC2 is electrically connected with the fourth node N4, and a second electrode plate EC22 of the second light emitting capacitor EC2 is electrically connected with the first power supply terminal V1. A first electrode plate EC31 of the third light emitting capacitor EC3 is connected with the seventh node N7, and a second electrode plate EC32 of the third light emitting capacitor EC3 is connected with the fifth node N5.

In an exemplary implementation mode, the first light emitting transistor ET1 to the thirteenth light emitting transistor ET13 may be P-type transistors or may be N-type transistors.

In an exemplary implementation mode, the first power supply terminal V1 continuously provides a high-level signal, and the second power supply terminal V2 continuously provides a low-level signal. Since the second power supply terminal V2 continuously provides the low-level signal, the eleventh light emitting transistor ET11 and the twelfth light emitting transistor ET12 are continuously turned on.

In an exemplary implementation mode, a signal of the third power supply terminal V3 is a low-level signal in a startup initialization stage, which prevents a ninth light emitting transistor ET9 and a tenth light emitting transistor ET10 of a last light emitting shift register from simultaneously being turned on because of delay of an output signal, or is a low-level signal in an abnormal shutdown stage, which prevents the ninth light emitting transistor ET9 and the tenth light emitting transistor ET10 from simultaneously being turned on. The third power supply terminal V3 continuously provides a high-level signal in a normal display stage, i.e., the thirteenth light emitting transistor ET13 is continuously turned off in the normal display stage.

Figure 17B:
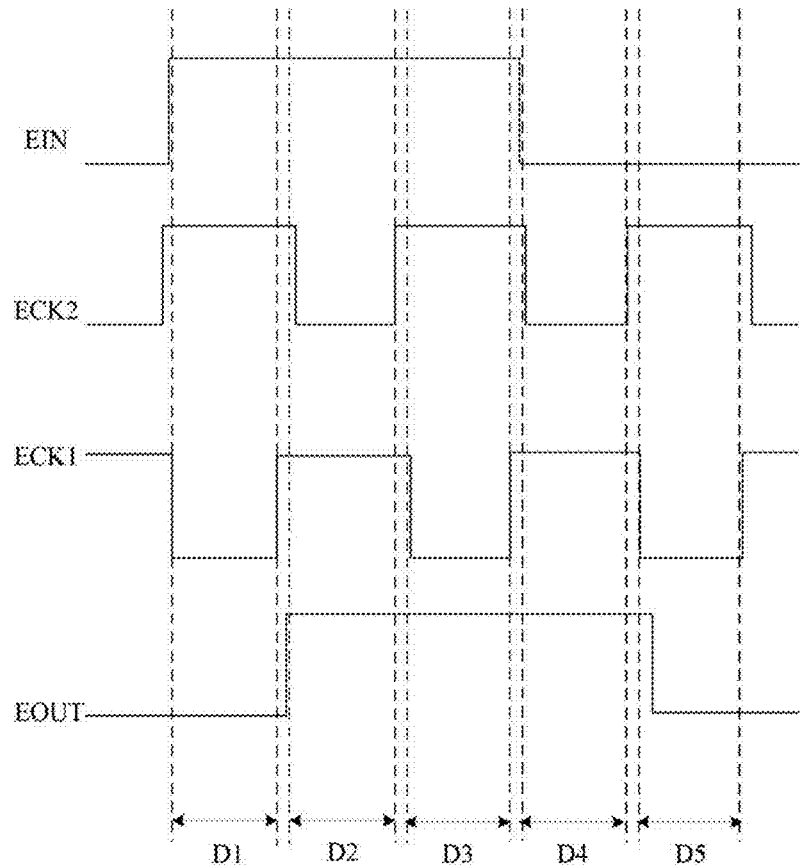
FIG. 17B is a timing diagram of the light emitting shift register provided in FIG. 17A.

FIG. 17B is a timing diagram of the light emitting shift register provided in FIG. 17A. FIG. 17B is an example in which the first light emitting transistor ET1 to the twelfth light emitting transistor ET12 are P-type transistors. As shown in FIG. 17B, a working process of a light emitting shift register provided by an exemplary embodiment includes following stages.

In a first stage D1, a signal of the second clock signal terminal ECK2 is a high-level signal, and a signal of the first clock signal terminal ECK1 is a low-level signal. The signal of the first clock signal terminal ECK1 is the low-level signal, and the first light emitting transistor ET1, the third light emitting transistor ET3, and the twelfth light emitting transistor ET12 are turned on. The turned-on first light emitting transistor ET1 transmits a high-level signal of the input terminal EIN to the first node N1, a signal of the first node N1 becomes a high-level signal, the turned-on twelfth light emitting transistor ET12 transmits the high-level signal of the first node N1 to the seventh node N7, and the second light emitting transistor ET2, the fourth light emitting transistor ET4, the eighth light emitting transistor ET8, and the tenth light emitting transistor ET10 are turned off. In addition, the turned-on third light emitting transistor ET3 transmits a low-level signal of the third power supply terminal V3 to the second node N2, and a signal of the second node N2 becomes a low-level signal. The turned-on eleventh light emitting transistor ET11 transmits the low-level signal of the second node N2 to the sixth node N6, and a signal of the sixth node N6 becomes a low-level signal, and the fifth light emitting transistor ET5 and the sixth light emitting transistor ET6 are turned on. The signal of the second clock signal terminal ECK2 is the high-level signal, and the seventh light emitting transistor ET7 is turned off. In addition, the ninth light emitting transistor ET9 is turned off under an action of the third light emitting capacitor EC3. In the first stage D1, since both the ninth light emitting transistor ET9 and the tenth light emitting transistor ET10 are turned off, a signal of the output terminal EOUT is kept at a previous low level.

In a second stage D2, a signal of the second clock signal terminal ECK2 is a low-level signal and a signal of the first clock signal terminal ECK1 is a high-level signal. The signal of the second clock signal terminal ECK2 is the low-level signal, and the seventh light emitting transistor ET7 is turned on. The signal of the first clock signal terminal ECK1 is the high-level signal, and the first light emitting transistor ET1 and the third light emitting transistor ET3 are turned off. Under an action of the third light emitting capacitor EC3, the first node N1 and the seventh node N7 may continue to maintain a high-level signal of a previous stage, and under an action of the first light emitting capacitor EC1, the sixth node N6 may continue to maintain a low level of the previous stage, so the fifth light emitting transistor ET5 and the sixth light emitting transistor ET6 are turned on. The second light emitting transistor ET2, the fourth light emitting transistor ET4, the eighth light emitting transistor ET8, and the tenth light emitting transistor ET10 are turned off. In addition, the low-level signal of the second clock signal terminal ECK2 is transmitted to the fourth node N4 through the turned-on sixth light emitting transistor ET6 and the seventh light emitting transistor ET7, the ninth light emitting transistor ET9 is turned on, the turned-on ninth light emitting transistor ET9 outputs a high-level signal of the first power supply terminal V1, and a signal of the output terminal EOUT is a high-level signal.

In a third stage D3, a signal of the first clock signal terminal ECK1 is a low-level signal, and a signal of the second clock signal terminal ECK2 is a high-level signal. The signal of the second clock signal terminal ECK2 is the high-level signal, and the seventh light emitting transistor ET7 is turned off. The second light emitting transistor ET2, the fourth light emitting transistor ET4, the eighth light emitting transistor ET8, and the tenth light emitting transistor ET10 are turned off. The signal of the first clock signal terminal ECK1 is the low-level signal, and the first light emitting transistor ET1 and the third light emitting transistor ET3 are turned on. Under an action of the second light emitting capacitor EC3, the ninth light emitting transistor ET9 remains in a turned-on state, the turned-on ninth light emitting transistor ET9 outputs a high-level signal of the first power supply terminal V1, and a signal of the output terminal EOUT is still a high-level signal.

In a fourth stage D4, a signal of the second clock signal terminal ECK2 is a low-level signal and a signal of the first clock signal terminal ECK1 is a high-level signal. The signal of the first clock signal terminal ECK1 is the high-level signal, and the first light emitting transistor ET1 and the third light emitting transistor ET3 are turned off. The signal of the second clock signal terminal ECK2 is the low-level signal, and the seventh light emitting transistor ET7 is turned on. Due to a storage function of the third light emitting capacitor EC3, the first node N1 and the seventh node N7 maintain high-level signals of a previous stage, the second light emitting transistor ET2, the fourth light emitting transistor ET4, the eighth light emitting transistor ET8, and the tenth light emitting transistor ET10 are turned off. Due to a storage function of the first light emitting capacitor EC1, the sixth node N6 continues to maintain a low level of the previous stage, the fifth light emitting transistor ET5 and the sixth light emitting transistor ET6 are turned on. In addition, the low-level signal of the second clock signal terminal ECK2 is transmitted to the fourth node N4 through the turned-on sixth light emitting transistor ET6 and the seventh light emitting transistor ET7, the turned-on ninth light emitting transistor ET9 outputs a high-level signal of the first power supply terminal V1, and a signal of the output terminal EOUT is still a high-level signal.

In a fifth stage D5, a signal of the second clock signal terminal ECK2 is a high-level signal and a signal of the first clock signal terminal ECK1 is a low-level signal. The signal of the first clock signal terminal ECK1 is the low-level signal, and the first light emitting transistor ET1 and the third light emitting transistor ET3 are turned on. The signal of the second clock signal terminal ECK2 is the high-level signal, and the seventh light emitting transistor ET7 is turned off. The turned-on first light emitting transistor ET1 transmits a low-level signal of the input terminal EIN to the first node N1, and a signal of the first node N1 becomes a low-level signal. The turned-on twelfth light emitting transistor ET12 transmits the low-level signal of the first node N1 to the seventh node N7, and a signal of the seventh node N7 becomes a low-level signal. The second light emitting transistor ET2, the fourth light emitting transistor ET4, the eighth light emitting transistor ET8, and the tenth light emitting transistor ET10 are turned on. The turned-on second light emitting transistor ET2 transmits the signal of the first clock signal terminal ECK1 which is at a low level to the second node N2, a level of the second node N2 may be pulled down, so the second node N2 and the sixth node N6 continue to maintain a low level of a previous stage, and the fifth light emitting transistor ET5 and the sixth light emitting transistor ET6 are turned on. The signal of the second clock signal terminal ECK2 is the high-level signal, and the seventh light emitting transistor ET7 is turned off. In addition, the turned-on eighth light emitting transistor ET8 transmits a high-level signal of the first power supply terminal V1 to the fourth node N4, and the ninth light emitting transistor ET9 is turned off. The turned-on tenth light emitting transistor ET10 outputs a low-level signal of the second power supply terminal V2, and a signal of the output terminal EOUT turns to be at a low level.

Figure 18A:
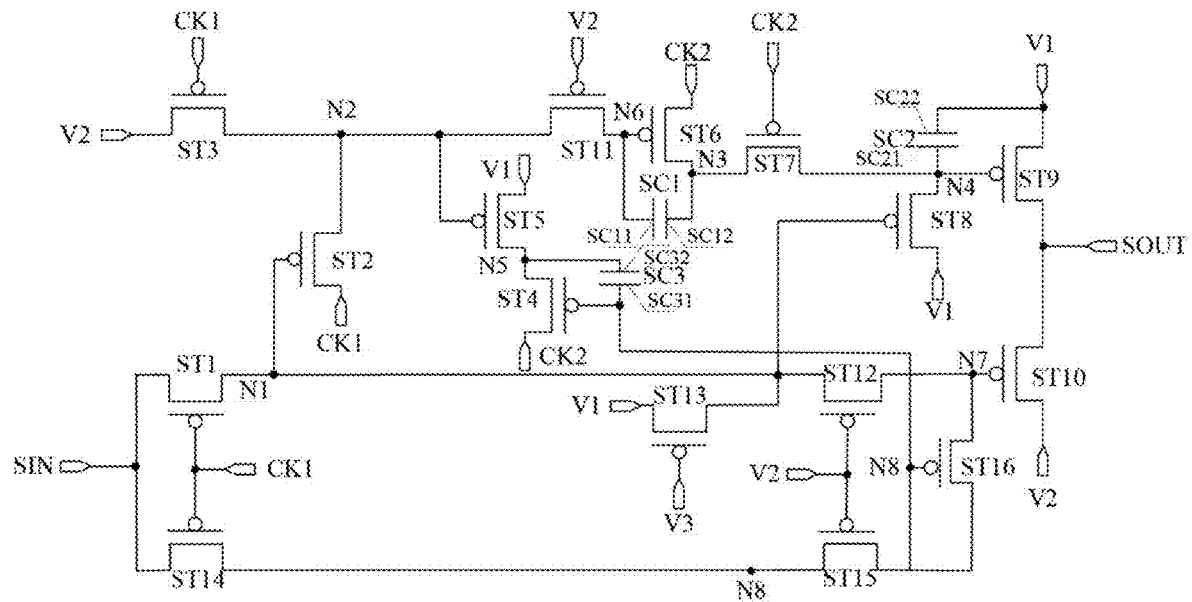
FIG. 18A is an equivalent circuit diagram of a control shift register of the display substrate provided in FIG. 16A.

FIG. 18A is an equivalent circuit diagram of a control shift register of the display substrate provided in FIG. 16A. As shown in FIG. 18A, in an exemplary implementation mode, the control shift register may include a first control transistor ST1 to a sixteenth control transistor ST16 and a first control capacitor SC1 to a third control capacitor SC3.

In an exemplary implementation mode, as shown in FIG. 18A, a control electrode of the first control transistor ST1 is electrically connected with a first clock signal terminal CK1, a first electrode of the first control transistor ST1 is electrically connected with an input terminal SIN, and a second electrode of the first control transistor ST1 is electrically connected with a first node N1. A control electrode of the second control transistor ST2 is electrically connected with the first node N1, a first electrode of the second control transistor ST2 is electrically connected with the first clock signal terminal CK1, and a second electrode of the second control transistor ST2 is electrically connected with a second node N2. A control electrode of the third control transistor ST3 is electrically connected with the first clock signal terminal CK1, a first electrode of the third control transistor ST3 is electrically connected with a second power supply terminal V2, and a second electrode of the third control transistor ST3 is electrically connected with the second node N2. A control electrode of the fourth control transistor ST4 is electrically connected with a ninth node N9, a first electrode of the fourth control transistor ST4 is electrically connected with a second clock signal terminal CK2, and a second electrode of the fourth control transistor ST4 is electrically connected with a fifth node N5. A control electrode of the fifth control transistor ST5 is electrically connected with the second node N2, a first electrode of the fifth control transistor ST5 is electrically connected with a first power supply terminal V1, and a second electrode of the fifth control transistor ST5 is electrically connected with the fifth node N5. A control electrode of the sixth control transistor ST6 is electrically connected with a sixth node N6, a first electrode of the sixth control transistor ST6 is electrically connected with the second clock signal terminal CK2, and a second electrode of the sixth control transistor ST6 is electrically connected with a third node N3. A control electrode of the seventh control transistor ST7 is electrically connected with the second clock signal terminal CK2, a first electrode of the seventh control transistor ST7 is electrically connected with the third node N3, and a second electrode of the seventh control transistor ST7 is electrically connected with a fourth node N4. A control electrode of the eighth control transistor ST8 is electrically connected with the first node N1, a first electrode of the eighth control transistor ST8 is electrically connected with the first power supply terminal V1, and a second electrode of the eighth control transistor ST8 is electrically connected with the fourth node N4. A control electrode of the ninth control transistor ST9 is electrically connected with the fourth node N4, a first electrode of the ninth control transistor ST9 is electrically connected with the first power supply terminal V1, and a second electrode of the ninth control transistor ST9 is electrically connected with an output terminal SOUT. A control electrode of the tenth control transistor ST10 is electrically connected with a seventh node N7, a first electrode of the tenth control transistor ST10 is electrically connected with the second power supply terminal V2, and a second electrode of the tenth control transistor ST10 is electrically connected with the output terminal SOUT. A control electrode of the eleventh control transistor ST11 is electrically connected with the second power supply terminal V2, a first electrode of the eleventh control transistor ST11 is electrically connected with the second node N2, and a second electrode of the eleventh control transistor ST11 is electrically connected with the sixth node N6. A control electrode of the twelfth control transistor ST12 is electrically connected with the second power supply terminal V2, a first electrode of the twelfth control transistor ST12 is electrically connected with the first node N1, and a second electrode of the twelfth control transistor ST12 is electrically connected with the seventh node N7. A control electrode of the thirteenth control transistor ST13 is electrically connected with a third power supply terminal V3, a first electrode of the thirteenth control transistor ST13 is electrically connected with the first power supply terminal V1, and a second electrode of the thirteenth control transistor ST13 is electrically connected with the first node N1. A control electrode of the fourteenth control transistor ST14 is electrically connected with the first clock signal terminal CK1, a first electrode of the fourteenth control transistor ST14 is electrically connected with the input terminal SIN, and a second electrode of the fourteenth control transistor ST14 is electrically connected with an eighth node N8. A control electrode of the fifteenth control transistor ST15 is electrically connected with the second power supply terminal V2, a first electrode of the fifteenth control transistor ST15 is electrically connected with the eighth node N8, and a second electrode of the fifteenth control transistor ST15 is electrically connected with a ninth node N9. A control electrode of the sixteenth control transistor ST16 is electrically connected with the ninth node N9, a first electrode of the sixteenth control transistor ST16 is electrically connected with the seventh node N7, and a second electrode of the sixteenth control transistor ST16 is electrically connected with the ninth node N9. A first electrode plate EC11 of the first control capacitor SC1 is electrically connected with the sixth node N6, and a second electrode plate EC12 of the first control capacitor SC1 is electrically connected with the third node N3. A first electrode plate EC21 of the second control capacitor SC2 is electrically connected with the fourth node N4, and a second electrode plate EC22 of the second control capacitor SC2 is electrically connected with the first power supply terminal V1. A first electrode plate EC31 of the third control capacitor SC3 is electrically connected with the seventh node N7, and a second electrode plate EC32 of the third control capacitor SC3 is electrically connected with the fifth node N5.

In an exemplary implementation mode, the first control transistor ST1 to the sixteenth control transistor ST16 may be P-type transistors or may be N-type transistors.

In an exemplary implementation mode, the first power supply terminal V1 continuously provides a high-level signal, and the second power supply terminal V2 continuously provides a low-level signal. The eleventh control transistor ST11, the twelfth control transistor ST12, and the fifteenth control transistor ST15 are continuously turned on since the second power supply terminal V2 continuously provides a low-level signal.

In an exemplary implementation mode, a signal of the third power supply terminal V3 is a low-level signal in a startup initialization stage, which prevents a ninth control transistor ST9 and a tenth control transistor ST10 of a control shift register in a last stage from simultaneously being turned on because of delay of an output signal, or is a low-level signal in an abnormal shutdown stage, which prevents the ninth control transistor ST9 and the tenth control transistor ST10 from simultaneously being turned on. The third power supply terminal V3 continuously provides a high-level signal in a normal display stage, i.e., the thirteenth control transistor ST13 is continuously turned off in the normal display stage.

Figure 18B:
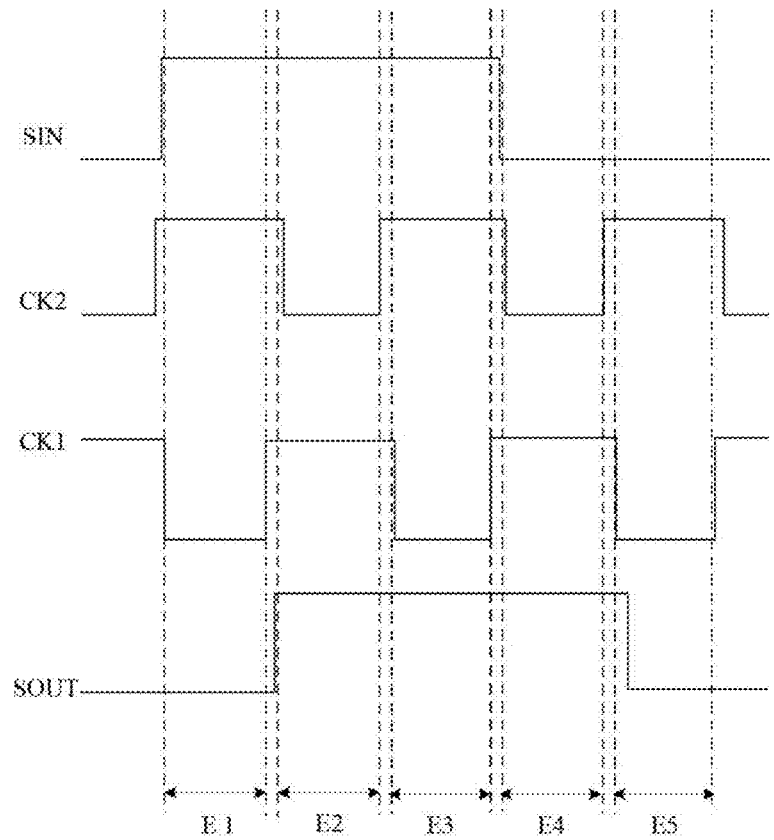
FIG. 18B is a timing diagram of the control shift register provided in FIG. 18A.

FIG. 18B is a timing diagram of the control shift register provided in FIG. 18A. FIG. 18B is an example in which the first control transistor ST1 to the sixteenth light emitting transistor ST16 are P-type transistors. As shown in FIG. 18B, a working process of a control shift register provided by an exemplary embodiment may include following stages.

In a first stage E1, a signal of the second clock signal terminal CK2 is a high-level signal, and a signal of the first clock signal terminal CK1 is a low-level signal. The signal of the first clock signal terminal CK1 is the low-level signal, the first control transistor ST1, the third control transistor ST3, the twelfth control transistor ST12, and the fourteenth control transistor ST14 are turned on, the turned-on first control transistor ST1 transmits a high-level signal of the input terminal SIN to the first node N1, a signal of the first node N1 becomes a high-level signal, the turned-on twelfth control transistor ST12 transmits the high-level signal of the first node N1 to the seventh node N7, the turned-on fourteenth control transistor ST14 transmits the high-level signal of the input terminal SIN to the eighth node N8, a signal of the eighth node N8 becomes a high-level signal, the turned-on fifteenth control transistor ST15 transmits the high-level signal of the eighth node N8 to the ninth node N9, and the second control transistor ST2, the fourth control transistor ST4, the eighth control transistor ST8, and the tenth control transistor ST10 are turned off. In addition, the turned-on third control transistor ST3 transmits a low-level signal of the third power supply terminal V3 to the second node N2, and a signal of the second node N2 becomes a low-level signal, the turned-on eleventh control transistor ST11 transmits the low-level signal of the second node N2 to the sixth node N6, and a signal of the sixth node N6 becomes a low-level signal, and the fifth control transistor ST5 and the sixth control transistor ST6 are turned on. The signal of the second clock signal terminal CK2 is the high-level signal, and the seventh control transistor ST7 is turned off. In addition, the ninth control transistor ST9 is turned off under an action of the third control capacitor SC3. In the first phase E1, since both the ninth control transistor ST9 and the tenth control transistor ST10 are turned off, a signal of the output terminal SOUT is maintained at a previous low level.

In a second stage E2, a signal of the second clock signal terminal CK2 is a low-level signal, and a signal of the first clock signal terminal CK1 is a high-level signal. The signal of the second clock signal terminal CK2 is the low-level signal, and the seventh control transistor ST7 is turned on. The signal of the first clock signal terminal CK1 is the high-level signal, and the first control transistor ST1 and the third control transistor ST3 are turned off. The first node N1, the seventh node N7, the eighth node N8, and the ninth node N9 may continue to maintain a high-level signal of a previous stage under the action of the third control capacitor SC3, and the sixth node N6 may continue to maintain a low level of the previous stage under an action of the first control capacitor SC1, so the fifth control transistor ST5 and the sixth control transistor ST6 are turned on. The second control transistor ST2, the fourth control transistor ST4, the eighth control transistor ST8, and the tenth control transistor ST10 are turned off. In addition, the low-level signal of the second clock signal terminal CK2 is transmitted to the fourth node N4 through the turned-on sixth control transistor ST6 and the seventh control transistor ST7, the ninth control transistor ST9 is turned on, the turned-on ninth control transistor ST9 outputs a high-level signal of the first power supply terminal V1, and a signal of the output terminal SOUT is a high-level signal.

In a third stage E3, a signal of the first clock signal terminal CK1 is a low-level signal, and a signal of the second clock signal terminal CK2 is a high-level signal. The signal of the second clock signal terminal CK2 is the high-level signal, and the seventh control transistor ST7 is turned off. The second control transistor ST2, the fourth control transistor ST4, the eighth control transistor ST8, and the tenth control transistor ST10 are turned off. The signal of the first clock signal terminal CK1 is the low-level signal, and the first control transistor ST1 and the third control transistor ST3 are turned on. Under an action of the second control capacitor SC2, the ninth control transistor ST9 is kept in a turned-on state, the turned-on ninth control transistor ST9 outputs a high-level signal of the first power supply terminal V1, and a signal of the output terminal SOUT is still a high-level signal.

In a fourth stage E4, a signal of the second clock signal terminal CK2 is a low-level signal and a signal of the first clock signal terminal CK1 is a high-level signal. The signal of the first clock signal terminal CK1 is the high-level signal, and the first control transistor ST1 and the third control transistor ST3 are turned off. The signal of the second clock signal terminal CK2 is the low-level signal, and the seventh control transistor ST7 is turned on. Due to a storage function of the third control capacitor SC3, signals of the first node N1, the seventh node N7, the eighth node N8, and the ninth node N9 maintain high-level signals of a previous stage, and the second control transistor ST2, the fourth control transistor ST4, the eighth control transistor ST8, and the tenth control transistor ST10 are turned off. Due to a storage function of the first control capacitor SC1, the sixth node N6 is continuously kept at a low level of the previous stage, and the fifth control transistor ST5 and the sixth control transistor ST6 are turned on. In addition, the low-level signal of the second clock signal terminal CK2 is transmitted to the fourth node N4 through the turned-on sixth control transistor ST6 and the seventh control transistor ST7, the turned-on ninth control transistor ST9 outputs a high-level signal of the first power supply terminal V1, and a signal of the output terminal SOUT is still a high-level signal.

In a fifth stage E5, a signal of the second clock signal terminal CK2 is a high-level signal and a signal of the first clock signal terminal CK1 is a low-level signal. The signal of the first clock signal terminal CK1 is the low-level signal, and the first control transistor ST1, the third control transistor ST3, and the fourteenth control transistor ST14 are turned on. The signal of the second clock signal terminal CK2 is the high-level signal, and the seventh control transistor ST7 is turned off. The turned-on first control transistor ST1 transmits a low-level signal of the input terminal SIN to the first node N1 and a signal of the first node N1 becomes a low-level signal, the turned-on twelfth control transistor ST12 transmits the low-level signal of the first node N1 to the seventh node N7 and a signal of the seventh node N7 becomes a low-level signal, the turned-on fourteenth control transistor ST14 transmits the low-level signal of the input terminal SIN to the eighth node N8 and a signal of the eighth node N8 becomes a low-level signal, the turned-on fifteenth control transistor ST15 transmits the low-level signal of the eighth node N8 to the ninth node N9 and a signal of the ninth node N9 becomes a low-level signal, and the second control transistor ST2, the fourth control transistor ST4, the eighth control transistor ST8, and the tenth control transistor ST10 are turned on. The turned-on second control transistor ST2 transmits the signal of the first clock signal terminal CK1 which is at a low level to the second node N2, a level of the second node N2 may be pulled down, so the second node N2 and the sixth node N6 continue to maintain a low level of a previous stage, and the fifth control transistor ST5 and the sixth control transistor ST6 are turned on. The signal of the second clock signal terminal CK2 is the high-level signal, and the seventh control transistor ST7 is turned off. In addition, the turned-on eighth control transistor ST8 transmits a high-level signal of the first power supply terminal V1 to the fourth node N4, and the ninth control transistor ST9 is turned off. The turned-on tenth control transistor ST10 outputs a low-level signal of the second power supply terminal V2, and a signal of the output terminal SOUT turns to be at a low level.

Figure 19:
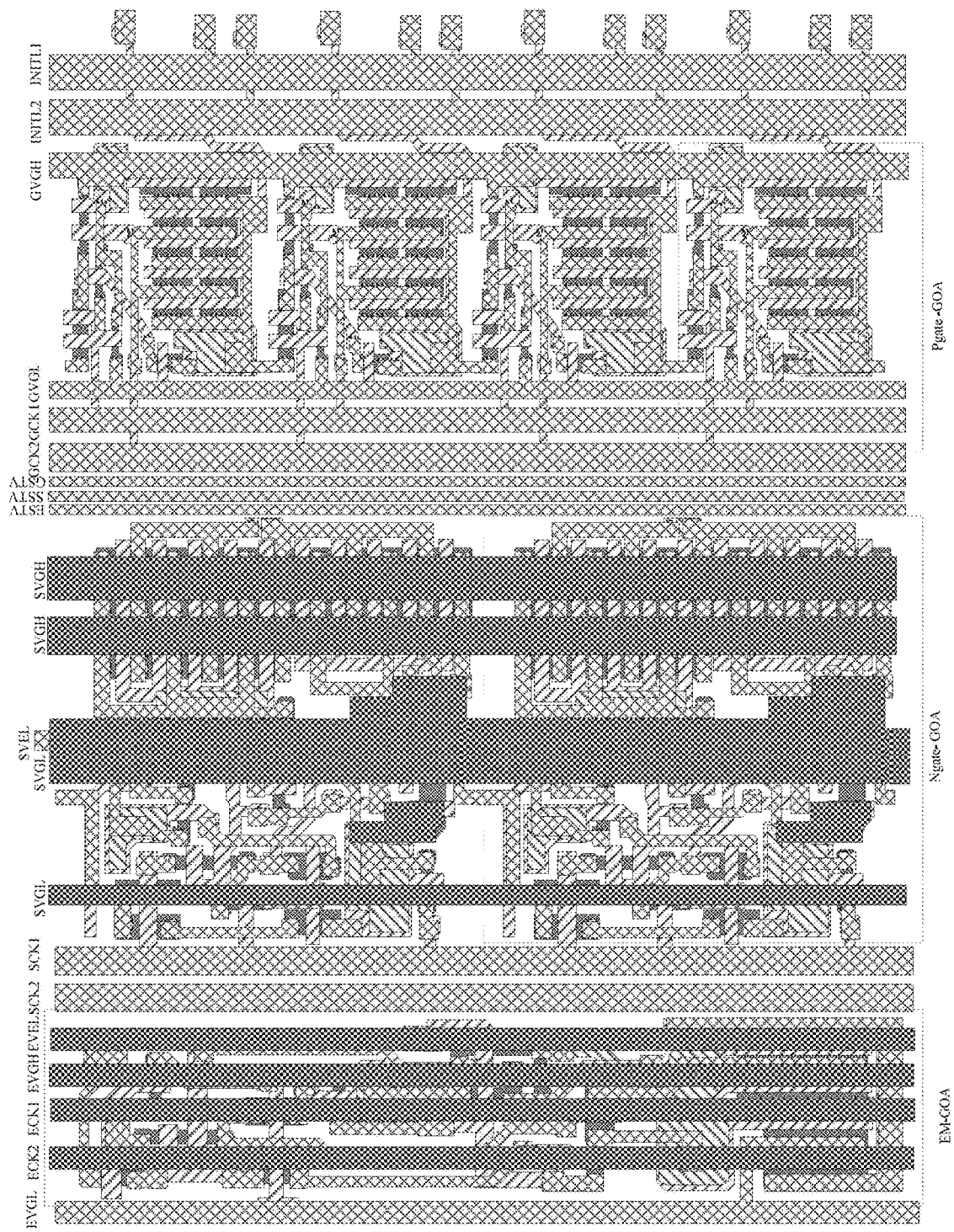
FIG. 19 is a schematic diagram of a structure of a first region of the display substrate provided in FIG. 16A.
Figure 20:
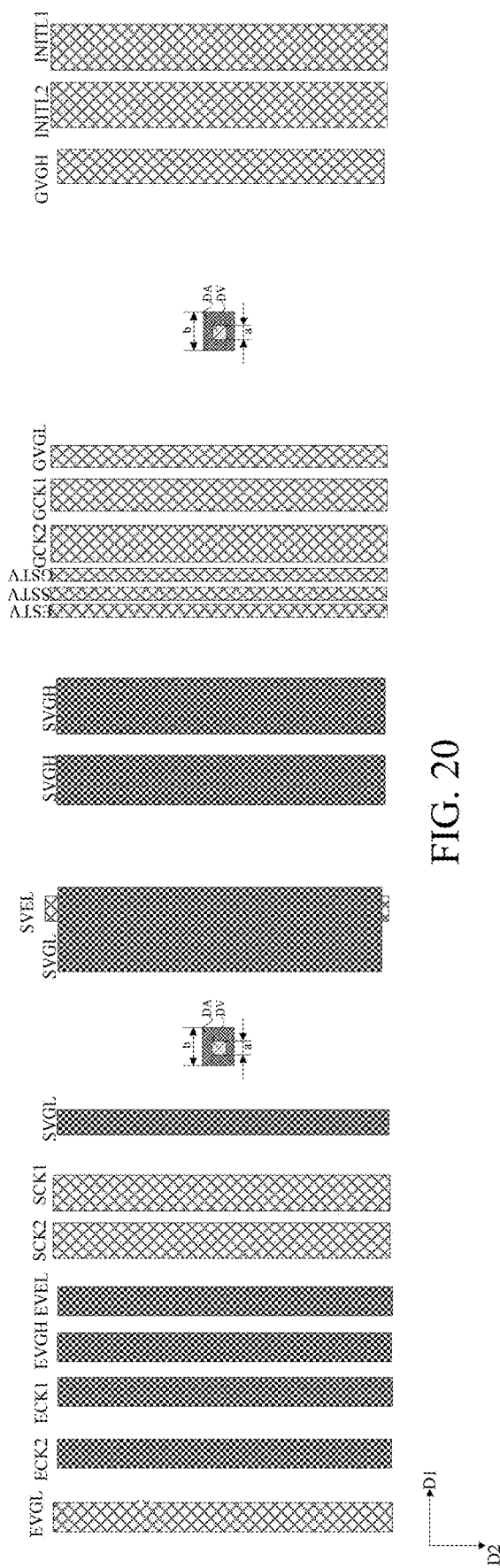
FIG. 20 is a schematic diagram I of a structure of a second region of the display substrate provided in FIG. 16A.
Figure 21:
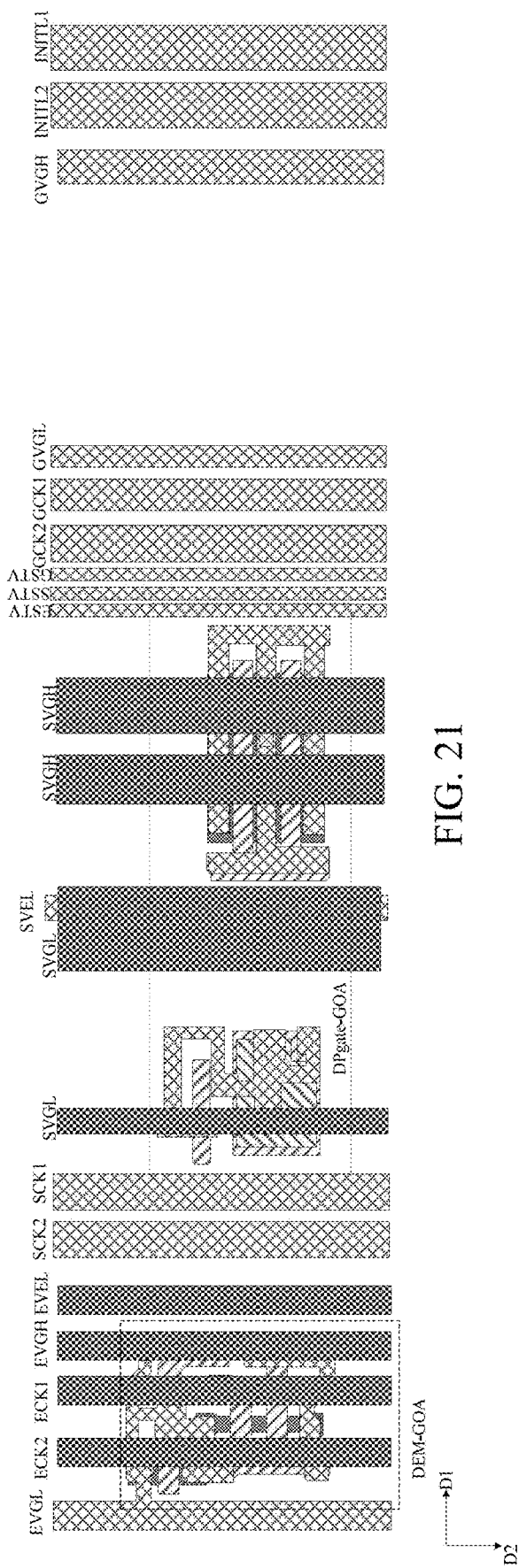
FIG. 21 is a schematic diagram II of a structure of a second region of the display substrate provided in FIG. 16A.
Figure 22:
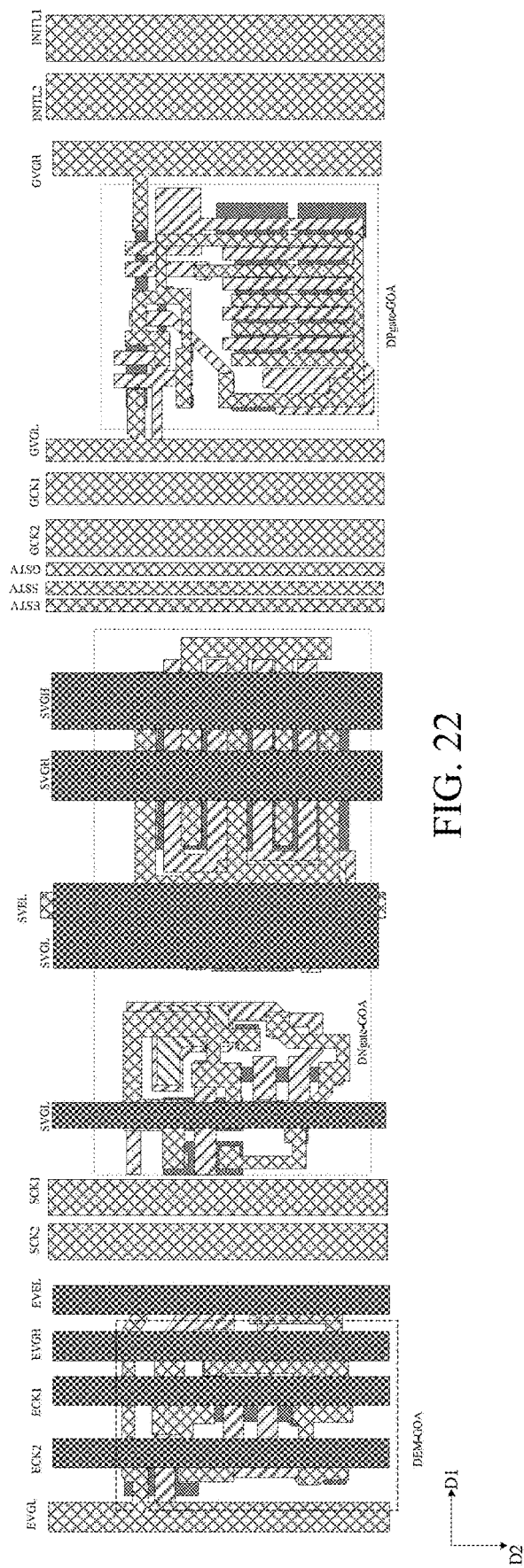
FIG. 22 is a schematic diagram III of a structure of a second region of the display substrate provided in FIG. 16A.

In an exemplary implementation mode, FIG. 19 is a schematic diagram of a structure of a first region of the display substrate provided in FIG. 16A, FIG. 20 is a schematic diagram I of a structure of a second region of the display substrate provided in FIG. 16A, FIG. 21 is a schematic diagram II of a structure of a second region of the display substrate provided in FIG. 16A, and FIG. 22 is a schematic diagram III of a structure of a second region of the display substrate provided in FIG. 16A. FIG. 19 is illustrated by taking a case that the first region includes a light emitting shift register of one stage, control shift registers of two stages, and scan shift registers of four stages as an example, FIG. 20 is illustrated by taking a case that the second region includes a dummy via as an example, and FIGS. 21 and 22 are illustrated by taking a case that the second region includes a dummy register as an example. As shown in FIGS. 19 to 22, the drive circuit layer may further include a light emitting initial signal line ESTV, a first light emitting clock signal line ECK1, a second light emitting clock signal line ECK2, a first light emitting power supply line EVGH, a second light emitting power supply line EVGL, a third light emitting power supply line EVEL, a control initial signal line SSTV, a first control clock signal line SCK1, a second control clock signal line SCK2, a first control power supply line SVGH, a second control power supply line SVGL, a third control power supply line SVEL, a scan initial signal line GSTV, a first scan clock signal line GCK1, a second scan clock signal line GCK2, a first scan power supply line GVGH, and a second scan power supply line GVGL located in the non-display region and at least partially extending along a second direction D2. Herein, a first direction intersects with the second direction D2.

In an exemplary implementation mode, as shown in FIG. 19, a light emitting drive circuit may be electrically connected with the light emitting initial signal line ESTV, the first light emitting clock signal line ECK1, the second light emitting clock signal line ECK2, the first light emitting power supply line EVGH, the second light emitting power supply line EVGL, and the third light emitting power supply line EVEL, respectively, and an orthographic projection of the light emitting drive circuit on a base substrate is partially overlapped with orthographic projections of the first light emitting clock signal line ECK1, the second light emitting clock signal line ECK2, the first light emitting power supply line EVGH, and the third light emitting power supply line EVEL on the base substrate. An input terminal of a light emitting shift register in a first stage is electrically connected with the light emitting initial signal line ESTV, a first power supply terminal of a light emitting shift register in any stage is electrically connected with the first light emitting power supply line EVGH, a second power supply terminal of the light emitting shift register in any stage is electrically connected with the second light emitting power supply line EVGL, a third power supply terminal of the light emitting shift register in any stage is electrically connected with the third light emitting power supply line EVEL, an output terminal of a light emitting shift register in a present stage is electrically connected with an input terminal of a light emitting shift register in a next stage, a first clock signal terminal of the light emitting shift register in any stage is electrically connected with one of the first light emitting clock signal line ECK1 and the second light emitting clock signal line ECK2, a second clock signal terminal of the light emitting shift register in any stage is electrically connected with the other of the first light emitting clock signal line ECK1 and the second light emitting clock signal line ECK2, first clock signal terminals of light emitting shifters in two adjacent stages are connected with different light emitting clock signal lines, and second clock signal terminals of the light emitting shifters in two adjacent stages are connected with different light emitting clock signal lines.

In an exemplary implementation mode, as shown in FIG. 19, a control drive circuit may be electrically connected with the control initial signal line SSTV, the first control clock signal line SCK1, the second control clock signal line SCK2, the first control power supply line SVGH, the second control power supply line SVGL, and the third control power supply line SVEL, respectively, the control drive circuit is located between the second control clock signal line SCK2 and the control initial signal line SSTV, and an orthographic projection of the control drive circuit on the base substrate is partially overlapped with orthographic projections of the first control power supply line SVGH, the second control power supply line SVGL, and the third control power supply line SVEL on the base substrate. An input terminal of a control shift register in a first stage is electrically connected with the control initial signal line SSTV, a first power supply terminal of a control shift register in any stage is electrically connected with the first control power supply line SVGH, a second power supply terminal of the control shift register in any stage is electrically connected with the second control power supply line SVGL, a third power supply terminal of the control shift register in any stage is electrically connected with the third control power supply line SVEL, an output terminal of a control shift register in a present stage is electrically connected with an input terminal of a control shift register in a next stage, a first clock signal terminal of the control shift register in any stage is electrically connected with one of the first control clock signal line SCK1 and the second control clock signal line SCK2, a second clock signal terminal of the control shift register in any stage is electrically connected with the other of the first control clock signal line SCK1 and the second control clock signal line SCK2, first clock signal terminals of control shifters in two adjacent stages are connected with different control clock signal lines, and second clock signal terminals of the control shifters in two adjacent stages are connected with different control clock signal lines.

In an exemplary implementation mode, as shown in FIG. 19, a scan drive circuit may be electrically connected with the scan initial signal line GSTV, the first scan clock signal line GCK1, the second scan clock signal line GCK2, the first scan power supply line GVGH, and the second scan power supply line GVGL, respectively, and is located between the first scan power supply line GVGH and the second scan power supply line GVGL. An input terminal of a scan shift register in a first stage is electrically connected with the scan initial signal line GSTV, a first power supply terminal of a scan shift register in any stage is electrically connected with the first scan power supply line GVGH, a second power supply terminal of the scan shift register in any stage is electrically connected with the second scan power supply line GVGL, an output terminal of a scan shift register in a present stage is electrically connected with an input terminal of a scan shift register in a next stage, a first clock signal terminal of the scan shift register in any stage is electrically connected with one of the first scan clock signal line GCK1 and the second scan clock signal line GCK2, a second clock signal terminal of the scan shift register in any stage is electrically connected with the other of the first scan clock signal line GCK1 and the second scan clock signal line GCK2, first clock signal terminals of scan shifters in two adjacent stages are connected with different scan clock signal lines, and second clock signal terminals of the scan shifters in two adjacent stages are connected with different scan clock signal lines.

In an exemplary implementation mode, as shown in FIGS. 19 to 22, the second light emitting clock signal line ECK2 is located on a side of the second light emitting power supply line EVGL close to the display region, the first light emitting clock signal line ECK1 is located on a side of the second light emitting clock signal line ECK2 close to the display region, the first light emitting power supply line EVGH is located on a side of the first light emitting clock signal line ECK1 close to the display region, the third light emitting power supply line EVEL is located on a side of the first light emitting power supply line EVGH close to the display region, the second control clock signal line SCK2 is located on a side of the third light emitting power supply line EVEL close to the display region, the first control clock signal line SCK1 is located on a side of the second light emitting power supply line EVGL close to the display region, the second control power supply line SVGL is located on a side of the first control clock signal line SCK1 close to the display region, the first control power supply line SVGH is located on a side of the second control power supply line SVGL close to the display region, the light emitting initial signal line ESTV is located on a side of the first control power supply line SVGH close to the display region, the control initial signal line SSTV is located on a side of the light emitting initial signal line ESTV close to the display region, the scan initial signal line GSTV is located on a side of the control initial signal line SSTV close to the display region, the second scan clock signal line GCK2 is located on a side of the scan initial signal line GSTV close to the display region, the first scan clock signal line GCK1 is located on a side of the scan initial signal line GSTV close to the display region, the second scan power supply line GVGL is located on a side of the first scan clock signal line GCK1 close to the display region, the first scan power supply line GVGH is located on a side of the second scan power supply line GVGL close to the display region, and an orthographic projection of the second control power supply line SVGL on the base substrate is at least partially overlapped with an orthographic projection of the third control power supply line SVEL on the base substrate.

In an exemplary implementation mode, as shown in FIGS. 19 to 22, the second control power supply line SVGL includes two, and an orthographic projection of a second control power supply line SVGL close to the display region on the base substrate is at least partially overlapped with an orthographic projection of the third control power supply line SVEL on the base substrate. A width of the second control power supply line SVGL close to the display region is larger than a width of a second control power supply line SVGL away from the display region.

In an exemplary implementation mode, as shown in FIGS. 19 to 22, the first control power supply line SVGH may include two.

In an exemplary implementation mode, as shown in FIG. 16C, a second signal line located in a straight line region LR is in a shape of a straight line and an extension direction is the same as that of a straight line boundary; a second signal line located in a rounded corner region CR has a shape of a bending line and is composed of a plurality of straight line segments, and an extension direction of a straight line segment is the same as an extension direction of a boundary of a first region or a second region where the straight line segment is located away from the display region. A second signal line is any one of the light emitting initial signal line ESTV, the first light emitting clock signal line ECK1, the second light emitting clock signal line ECK2, the first light emitting power supply line EVGH, the second light emitting power supply line EVGL, the third light emitting power supply line EVEL, the control initial signal line SSTV, the first control clock signal line SCK1, the second control clock signal line SCK2, the first control power supply line SVGH, the second control power supply line SVGL, the third control power supply line SVEL, the scan initial signal line GSTV, the first scan clock signal line GCK1, the second scan clock signal line GCK2, the first scan power supply line GVGH, and the second scan power supply line GVGL.

In an exemplary implementation mode, a light emitting shift register EM-GOA may include a plurality of light emitting transistors and a plurality of light emitting capacitors, a control shift register Ngate-GOA may include a plurality of control transistors and a plurality of control capacitors, a scan shift register Pgate-GOA may include a plurality of scan transistors and a plurality of scan capacitors, the light emitting capacitors, the control capacitors, and the scan capacitors each include a first electrode plate and a second electrode plate, and a drive circuit layer may include a semiconductor layer, a first conductive layer, a second conductive layer, a third conductive layer, and a fourth conductive layer stacked sequentially.

The semiconductor layer may at least include active layers of the plurality of light emitting transistors, active layers of the plurality of control transistors, and active layers of the plurality of scan transistors.

The first conductive layer may at least include: control electrodes of the plurality of light emitting transistors, first electrode plates of the plurality of light emitting capacitors, control electrodes of the plurality of control transistors, first electrode plates of the plurality of control capacitors, control electrodes of the plurality of scan transistors, and first electrode plates of the plurality of scan capacitors.

The second conductive layer at least includes second electrode plates of the plurality of light emitting capacitors, second electrode plates of the plurality of control capacitors, and second electrode plates of the plurality of scan capacitors.

The third conductive layer at least includes the second light emitting power supply line EVGL, the first control clock signal line SCK1, the second control clock signal line SCK2, the third control power supply line SVEL, the light emitting initial signal line ESTV, the control initial signal line SSTV, the scan initial signal line GSTV, the first scan clock signal line GCK1, the second scan clock signal line GCK2, the first scan power supply line GVGH, the second scan power supply line GVGL, first electrodes and second electrodes of the plurality of light emitting transistors, first electrodes and second electrodes of the plurality of control transistors, and first electrodes and second electrodes of the plurality of scan transistors.

The fourth conductive layer at least includes the first light emitting clock signal line ECK1, the second light emitting clock signal line ECK2, the first light emitting power supply line EVGH, the third light emitting power supply line EVEL, the first control power supply line SVGH, and the second control power supply line SVGL.

In an exemplary implementation mode, as shown in FIGS. 21 and 22, when a second region includes a dummy register, the dummy register may include at least one of a dummy light emitting shift register DEM-GOA, a dummy control shift register DNgate-GOA, and a dummy scan shift register DPgate-GOA. FIG. 21 is illustrated by taking a case that the dummy register includes a dummy light emitting shift register DEM-GOA and a dummy control shift register DNgate-GOA as an example, and FIG. 22 is illustrated by taking a case that the dummy register includes a dummy light emitting shift register DEM-GOA, a dummy control shift register DNgate-GOA, and a dummy scan shift register DPgate-GOA as an example.

In an exemplary implementation mode, as shown in FIGS. 21 and 22, the dummy light emitting shift register DEM-GOA is electrically connected with at least one of the first light emitting power supply line EVGH and the second light emitting power supply line EVGL, and is located between the first light emitting power supply line EVGH and the second light emitting power supply line EVGL. FIG. 21 and FIG. 22 are illustrated by taking the dummy light emitting shift register DEM-GOA and the second light emitting power supply line EVGL as an example.

In an exemplary implementation mode, as shown in FIGS. 21 and 22, the dummy light emitting shift register is not connected with the light emitting initial signal line, the third light emitting power supply line, the first light emitting clock signal line, or the second light emitting clock signal line. An orthographic projection of the dummy light emitting shift register on the base substrate is not overlapped with an orthographic projection of the light emitting initial signal line on the base substrate.

In an exemplary implementation mode, as shown in FIGS. 21 and 22, the dummy control shift register DNgate-GOA is electrically connected with at least one of the first control power supply line SVGH and the second control power supply line SVGL, and is located between the first control clock signal line SCK1 and the control initial signal line SSTV. FIG. 21 and FIG. 22 are illustrated by taking a case that the dummy control shift register DNgate-GOA is electrically connected with the first control power supply line SVGH and the second control power supply line SVGL as an example.

In an exemplary implementation mode, as shown in FIGS. 21 and 22, the dummy control shift register is not connected with the control initial signal line, the third control power supply line, the first control clock signal line, or the second control clock signal line. An orthographic projection of the dummy control shift register on the base substrate is not overlapped with orthographic projections of the control initial signal line, the first control clock signal line, and the second control clock signal line on the base substrate.

In an exemplary implementation mode, as shown in FIG. 22, the dummy scan shift register DPgate-GOA is electrically connected with at least one of the first scan power supply line GVGH and the second scan power supply line GVGL, and is located between the first scan power supply line GVGH and the second scan power supply line GVGL. FIG. 22 is illustrated by taking a case that the dummy scan shift register DPgate-GOA is electrically connected with the second scan power supply line GVGL as an example.

In an exemplary implementation mode, as shown in FIGS. 21 and 22, the dummy scan shift register is not connected with the scan initial signal line, the first scan clock signal line, or the second scan clock signal line. An orthographic projection of the dummy scan shift register on the base substrate is not overlapped with orthographic projections of the scan initial signal line, the first scan clock signal line, and the second scan clock signal line on the base substrate.

In an exemplary implementation mode, a quantity of transistors of the dummy light emitting shift register DEM-GOA may be less than a quantity of transistors of the light emitting shift register EM-GOA.

Figure 23:
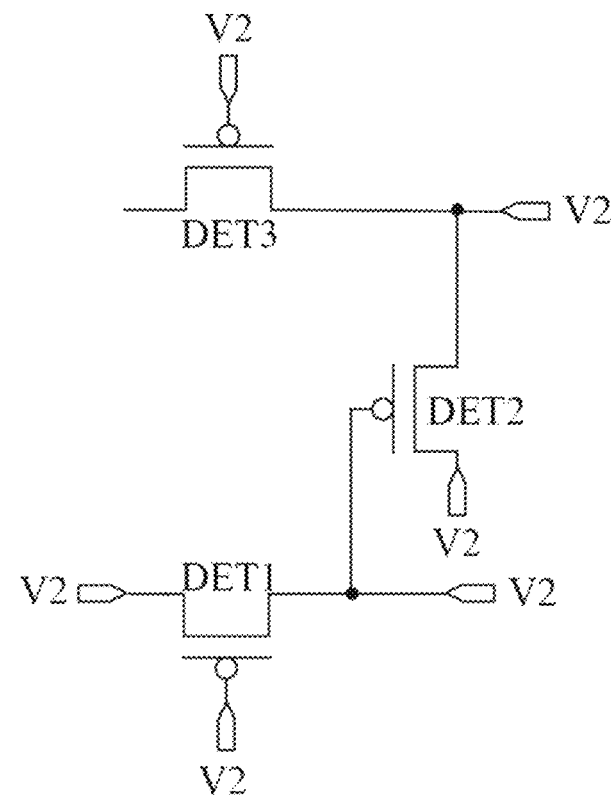
FIG. 23 is a circuit diagram of a dummy light emitting shift register of the display substrate provided in FIG. 16A.

FIG. 23 is a circuit diagram of a dummy light emitting shift register of the display substrate provided in FIG. 16A. FIG. 21 and FIG. 22 are illustrated by taking the dummy light emitting shift register provided in FIG. 23 as an example. As shown in FIG. 23, the dummy light emitting shift register of the display substrate provided in FIG. 16A may include a first dummy light emitting transistor DET1, a second dummy light emitting transistor DET2, and a third dummy light emitting transistor DET3. A control electrode, a first electrode, and a second electrode of the first dummy light emitting transistor DET1 are respectively electrically connected with the second power supply terminal V2, a control electrode, a first electrode, and a second electrode of the second dummy light emitting transistor DET2 are respectively electrically connected with the second power supply terminal V2, a control electrode and a first electrode of the third dummy light emitting transistor DET3 are respectively electrically connected with the second power supply terminal V2, and a second electrode of the third dummy light emitting transistor DET3 is floated.

In an exemplary implementation mode, a shape of the first dummy light emitting transistor DET1 is similar to a shape of at least part of a first light emitting transistor in a light emitting shift register, a shape of the second dummy light emitting transistor DET2 is similar to a shape of at least part of a second light emitting transistor in the light emitting shift register, and a shape of the third dummy light emitting transistor DET3 is similar to a shape of at least part of the second light emitting transistor in the light emitting shift register.

In an exemplary implementation mode, as shown in FIGS. 21 and 22, the second power supply terminal V2 is electrically connected with the second light emitting power supply line EVGL.

In an exemplary implementation mode, a quantity of transistors of the dummy control shift register DNgate-GOA is less than a quantity of transistors of the control shift register NGate-GOA.

Figure 24:
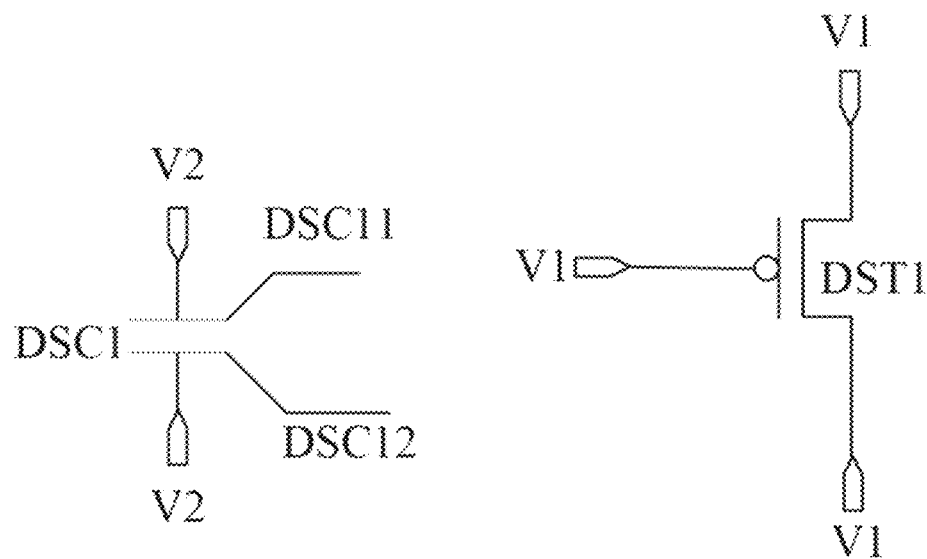
FIG. 24 is a circuit diagram of a dummy control shift register of the display substrate provided in FIG. 16A.

FIG. 24 is a circuit diagram of a dummy control shift register of the display substrate provided in FIG. 16A. FIG. 21 is illustrated by taking the dummy control shift register provided in FIG. 24 as an example. As shown in FIG. 24, the dummy control shift register of the display substrate provided in FIG. 16A may include a first dummy control transistor DST1 and a first dummy control capacitor DSC1, the first dummy control capacitor DSC1 includes a first electrode plate DSC11 and a second electrode plate DSC12. Among them, a control electrode, a first electrode, and a second electrode of the first dummy control transistor DST1 are electrically connected with the first power supply terminal V1, respectively, and the first electrode plate DSC11 and the second electrode plate DSC12 of the first dummy control capacitor DSC1 are electrically connected with the second power supply terminal V2, respectively.

In an exemplary implementation mode, a shape of the first dummy control transistor DST1 is similar to a shape of at least part of a ninth control transistor in a control shift register, and a shape of the first dummy control capacitor DSC1 is similar to a shape of at least part of a third control capacitor in the control shift register.

In an exemplary implementation mode, as shown in FIG. 21, the first power supply terminal V1 is electrically connected with the first control power supply line SVGH and the second power supply terminal V2 is electrically connected with the second control power supply line SVGL.

Figure 25:
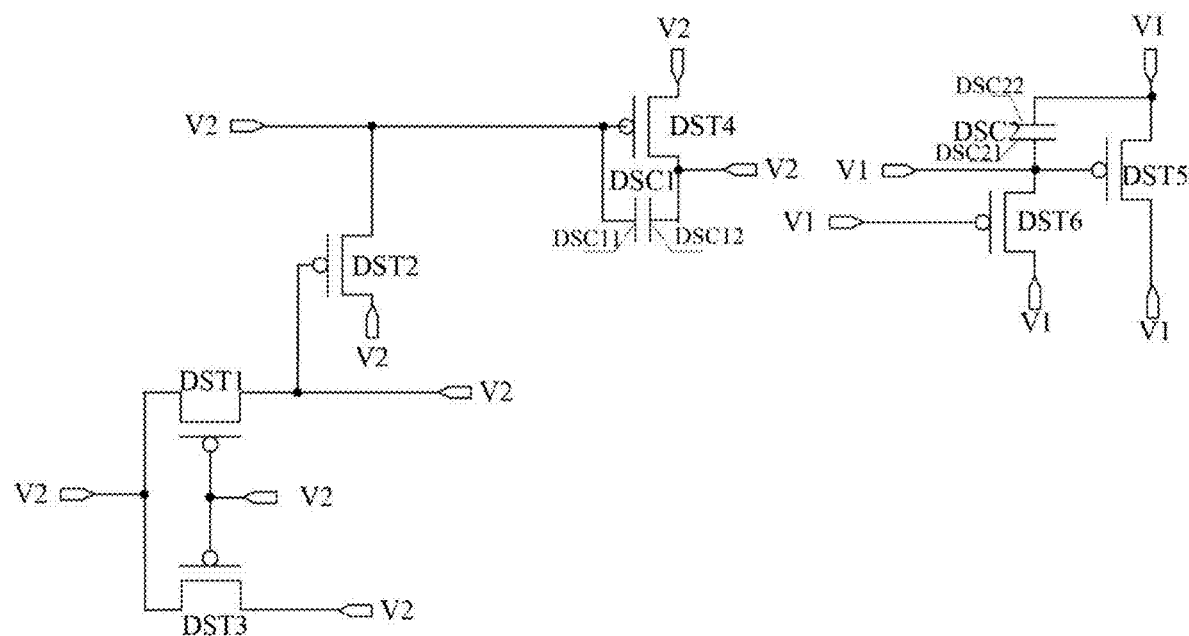
FIG. 25 is another circuit diagram of a dummy control shift register of the display substrate provided in FIG. 16A.

FIG. 25 is another circuit diagram of a dummy control shift register of the display substrate provided in FIG. 16A. FIG. 22 is illustrated by taking the dummy control shift register provided in FIG. 25 as an example. As shown in FIG. 25, the dummy control shift register of the display substrate provided in FIG. 16A may include a first dummy control transistor DST1 to a sixth dummy control capacitor DST6, and a first dummy control capacitor DSC1 and a second dummy control capacitor DSC2, the first dummy control capacitor DSC1 includes a first electrode plate DSC11 and a second electrode plate DSC12, and the second dummy control capacitor DSC2 includes a first electrode plate DSC21 and a second electrode plate DSC22. Among them, a control electrode, a first electrode, and a second electrode of the first dummy control transistor DST1 are respectively electrically connected with the second power supply terminal V2, a control electrode, a first electrode, and a second electrode of the second dummy control transistor DST2 are respectively electrically connected with the second power supply terminal V2, a control electrode, a first electrode, and a second electrode of the third dummy control transistor DST3 are respectively electrically connected with the second power supply terminal V2, a control electrode, a first electrode, and a second electrode of the fourth dummy control transistor DST4 are respectively electrically connected with the second power supply terminal V2, a control electrode, a first electrode, and a second electrode of the fifth dummy control transistor DST5 are respectively electrically connected with the first power supply terminal V1, a control electrode, a first electrode, and a second electrode of the sixth dummy control transistor DST6 are respectively electrically connected with the first power supply terminal V1, the first electrode plate DSC11 and the second electrode plate DSC12 of the first dummy control capacitor DSC1 are electrically connected with the second power supply terminal V2, respectively, and the first electrode plate DSC21 and the second electrode plate DSC22 of the second dummy control capacitor DSC2 are electrically connected with the second power supply terminal V2, respectively.

In an exemplary implementation mode, a shape of the first dummy control transistor DST1 is similar to a shape of at least part of a first control transistor in a control shift register, a shape of the second dummy control transistor DST2 is similar to a shape of at least part of a second control transistor in the control shift register, a shape of the third dummy control transistor DST3 is similar to a shape of at least part of a fourteenth control transistor in the control shift register, a shape of the fourth dummy control transistor DST4 is similar to a shape of at least part of a sixth control transistor in the control shift register, a shape of the fifth dummy control transistor DST5 is similar to a shape of at least part of a ninth control transistor in the control shift register, a shape of the sixth dummy control transistor DST6 is similar to a shape of at least part of an eighth control transistor in the control shift register, a shape of the first dummy control capacitor DSC1 is similar to a shape of at least part of a first control capacitor in the control shift register, and a shape of the second dummy control capacitor DSC2 is similar to a shape of at least part of a second control capacitor in the control shift register.

In an exemplary implementation mode, as shown in FIG. 22, the first power supply terminal V1 is electrically connected with the first control power supply line SVGH, and the second power supply terminal V2 is electrically connected with the second control power supply line SVGL.

In an exemplary implementation mode, a quantity of transistors of the dummy scan shift register DPgate-GOA is less than or equal to a quantity of transistors of the scan shift register PGate-GOA.

Figure 26:
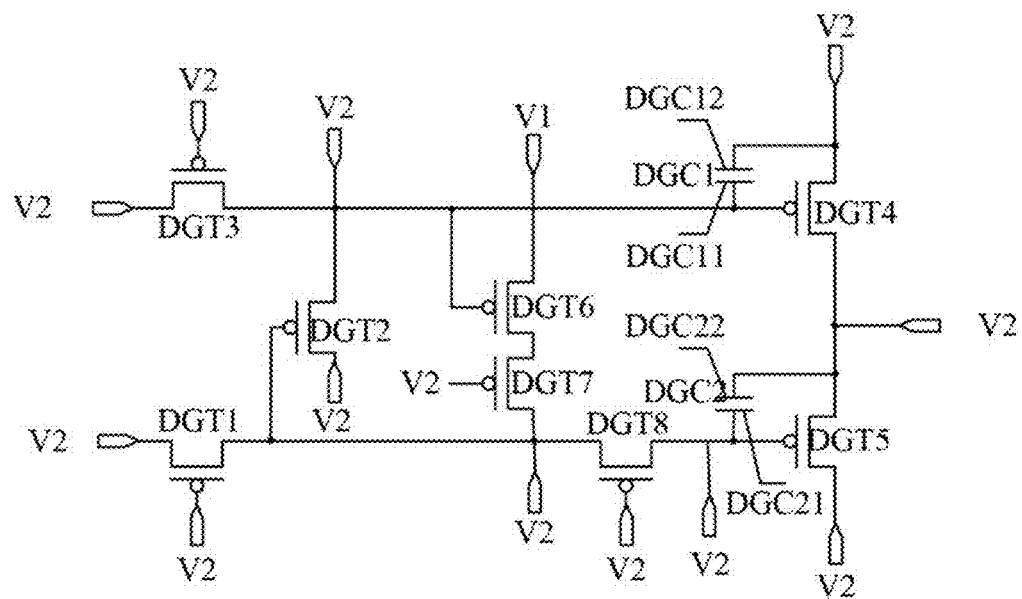
FIG. 26 is a circuit diagram of a dummy scan shift register of the display substrate provided in FIG. 16A.

FIG. 26 is a circuit diagram of a dummy scan shift register of the display substrate provided in FIG. 16A. FIG. 22 is illustrated by taking the dummy scan shift register provided in FIG. 26 as an example. As shown in FIG. 26, the dummy scan shift register of the display substrate provided in FIG. 16A may include a first dummy scan transistor DGT1 to an eighth dummy scan transistor DGT8, and a first dummy scan capacitor DGC1 and a second dummy scan capacitor DGC2, the first dummy scan capacitor DGC1 includes a first electrode plate DGC11 and a second electrode plate DGC12, and the second dummy scan capacitor DGC2 includes a first electrode plate DGC21 and a second electrode plate DGC22. Among them, a control electrode, a first electrode, and a second electrode of the first dummy scan transistor DGT1 are respectively electrically connected with the second power supply terminal V2, a control electrode, a first electrode, and a second electrode of the second dummy scan transistor DGT2 are respectively electrically connected with the second power supply terminal V2, a control electrode, a first electrode, and a second electrode of the third dummy scan transistor DGT3 are respectively electrically connected with the second power supply terminal V2, a control electrode, a first electrode, and a second electrode of the fourth dummy scan transistor DGT4 are respectively electrically connected with the second power supply terminal V2, a control electrode, a first electrode, and a second electrode of the fifth dummy scan transistor DGT5 are respectively electrically connected with the second power supply terminal V2, a control electrode of the sixth dummy scan transistor DGT6 is electrically connected with the second power supply terminal V2, a first electrode of the sixth dummy scan transistor DGT6 is electrically connected with the first power supply terminal V1, a second electrode of the sixth dummy scan transistor DGT6 is electrically connected with a second electrode of the seventh dummy scan transistor DGT7, a control electrode and a first electrode of the seventh dummy scan transistor DGT7 are electrically connected with the second power supply terminal V2 respectively, a control electrode, a first electrode, and a second electrode of the eighth dummy scan transistor DGT8 are electrically connected with the second power supply terminal V2 respectively, the first electrode plate DGC11 and the second electrode plate DGC12 of the first dummy scan capacitor DGC1 are electrically connected with the second power supply terminal V2 respectively, the first electrode plate DGC21 and the second electrode plate DGC22 of the second dummy scan capacitor DGC2 are electrically connected with the second power supply terminal V2, respectively.

In an exemplary implementation mode, a shape of the first dummy scan transistor DST1 is similar to a shape of at least part of a first scan transistor in a scan shift register, a shape of the second dummy scan transistor DST2 is similar to a shape of at least part of a second scan transistor in the scan shift register, a shape of the third dummy scan transistor DST3 is similar to a shape of at least part of a third scan transistor in the scan shift register, a shape of the fourth dummy scan transistor DST4 is similar to a shape of at least part of a fourth scan transistor in the scan shift register, a shape of the fifth dummy scan transistor DST5 is similar to a shape of at least part of a fifth scan transistor in the scan shift register, a shape of the sixth dummy scan transistor DST6 is similar to a shape of at least part of a sixth scan transistor in the scan shift register, a shape of the seventh dummy scan transistor DST7 is similar to a shape of at least part of a seventh scan transistor in the scan shift register, a shape of the eighth dummy scan capacitor DSC8 is similar to a shape of at least part of an eighth scan capacitor in the scan shift register, a shape of the first dummy scan capacitor DSC1 is similar to a shape of at least part of a first scan capacitor in the scan shift register, and a shape of the second dummy scan capacitor DSC2 is similar to a shape of at least part of a second scan capacitor in the scan shift register.

In an exemplary implementation mode, as shown in FIG. 22, the first power supply terminal V1 is electrically connected with the first scan power supply line GVGH, and the second power supply terminal V2 is electrically connected with the second scan power supply line GVGL.

In an exemplary implementation mode, the dummy light emitting shift register includes at least one dummy light emitting transistor, the dummy control shift register includes at least one dummy control transistor, and the dummy scan shift register includes at least one dummy scan transistor.

The semiconductor layer further includes an active layer of the at least one dummy light emitting transistor, an active layer of the at least one dummy control transistor, and an active layer of the at least one dummy scan transistor.

The first conductive layer further includes: a control electrode of the at least one dummy light emitting transistor, a control electrode of the at least one dummy control transistor, and a control electrode of the at least one dummy scan transistor.

The second conductive layer further includes a first electrode and a second electrode of the at least one dummy light emitting transistor, a first electrode and a second electrode of the at least one dummy control transistor, and a first electrode and a second electrode of the at least one dummy scan transistor.

In an exemplary implementation mode, as shown in FIG. 20, when the second region includes a dummy via DV, the semiconductor layer further includes a dummy active layer DA.

In an exemplary implementation mode, the drive circuit layer may further include a first insulation layer, a second insulation layer, a third insulation layer, a fourth insulation layer, and a planarization layer which are sequentially stacked, the first insulation layer is located between the semiconductor layer and the first conductive layer, the second insulation layer is located between the first conductive layer and the second conductive layer, the third insulation layer is located between the second conductive layer and the third conductive layer, the fourth insulation layer and the planarization layer are located between the third conductive layer and the fourth conductive layer, and the dummy via DV is disposed on the first insulation layer, the second insulation layer, and the third insulation layer.

In an exemplary implementation mode, as shown in FIG. 20, a shape of the dummy via may be a circle, a square, or another shape. FIG. 20 is illustrated by taking a case that the shape of the dummy via is a square as an example. When the dummy via is in a shape of a square, a bezel a of the dummy via may be 2.5 microns.

In an exemplary implementation mode, as shown in FIG. 20, a shape of the dummy active layer may be a circle, a square, or another shape. FIG. 20 is illustrated by taking a case that the shape of the dummy active layer is a square as an example. When the dummy via is in a shape of a square, a bezel b of the dummy active layer may be 4 microns to 4.5 microns.

In an exemplary implementation mode, the drive circuit layer further includes a plurality of vias disposed on the first insulation layer, the second insulation layer, and the third insulation layer and exposing active layers of a plurality of transistors in a sub-pixel.

In an exemplary implementation mode, a shape of a via may be a circle, a square, or another shape. When the via is in a shape of a square, a bezel of the via may be 2 microns to 3 microns, and exemplarily, the bezel of the via is 2.5 microns.

In an exemplary implementation mode, an area of the dummy via DV is approximately equal to an area of the via. The area of dummy via DV is approximately equal to the area of the via, which may ensure etching uniformity of the display region and non-display region, and improve a display effect of the display substrate.

In an exemplary implementation mode, a distance between a boundary of the dummy via DV and a boundary of the dummy active layer DA is a first distance, and a distance between a boundary of the via and a boundary of an active layer of a transistor exposed by the via is a second distance. The first distance is approximately equal to the second distance, which may ensure etching uniformity of the display region and the non-display region, and improve a display effect of the display substrate.

In an exemplary implementation mode, a ratio between an area of all dummy vias DV located in the second region and an area of the second region and a ratio between a sum of areas of all vias located in one sub-pixel located in the display region and an area of the sub-pixel are approximately equal. The ratio between the area of all dummy vias DV located in the second region and the area of the second region and the ratio between the sum of the areas of all vias in the sub-pixel located in the display region and the area of the sub-pixel are approximately equal, which may likewise ensure etching uniformity of a first region and the second region and improve a display effect of the display substrate.

In an exemplary implementation mode, as shown in FIG. 9 to FIG. 13 and FIG. 19 to FIG. 22, the drive circuit layer may further include at least one initial power supply line located in the non-display region. FIG. 9 to FIG. 13 and FIG. 19 to FIG. 22 are illustrated by taking a case that two initial power supply lines are included and the two initial power supply lines are a first initial power supply line INITL1 and a second initial power supply line INITL2 respectively as an example.

In an exemplary implementation mode, an initial power supply line may be configured to provide an initial signal to a pixel drive circuit, and the initial power supply line is located on a side of the first scan power supply line GVGH close to the display region and is located on the third conductive layer.

A "patterning process" mentioned in the present disclosure includes photoresist coating, mask exposure, development, etching, photoresist stripping, etc., for a metal material, an inorganic material, or a transparent conductive material, and includes organic material coating, mask exposure, development, etc., for an organic material. Deposition may be any one or more of sputtering, evaporation, and chemical vapor deposition, coating may be any one or more of spray coating, spin coating, and inkjet printing, and etching may be any one or more of dry etching and wet etching, the present disclosure is not limited thereto. A "thin film" refers to a layer of thin film made of a certain material on a base substrate using deposition, coating, or other processes. If the "thin film" does not need a patterning process in an entire manufacturing process, the "thin film" may also be called a "layer". If the "thin film" needs the patterning process in the entire manufacturing process, the "thin film" is called a "thin film" before the patterning process and is called a "layer" after the patterning process. At least one "pattern" is contained in the "layer" after the patterning process. "A and B are disposed in a same layer" in the present disclosure means that A and B are formed simultaneously through a same patterning process, and a "thickness" of a film layer is a size of the film layer in a direction perpendicular to a display substrate. In an exemplary embodiment of the present disclosure, "an orthographic projection of B being within a range of an orthographic projection of A" or "an orthographic projection of A containing an orthographic projection of B" means that a boundary of the orthographic projection of B falls within a range of a boundary of the orthographic projection of A, or the boundary of the orthographic projection of A is overlapped with the boundary of the orthographic projection of B.

Exemplary description is made below through a preparation process of the display substrate provided in FIG. 6A.

Figure 27:
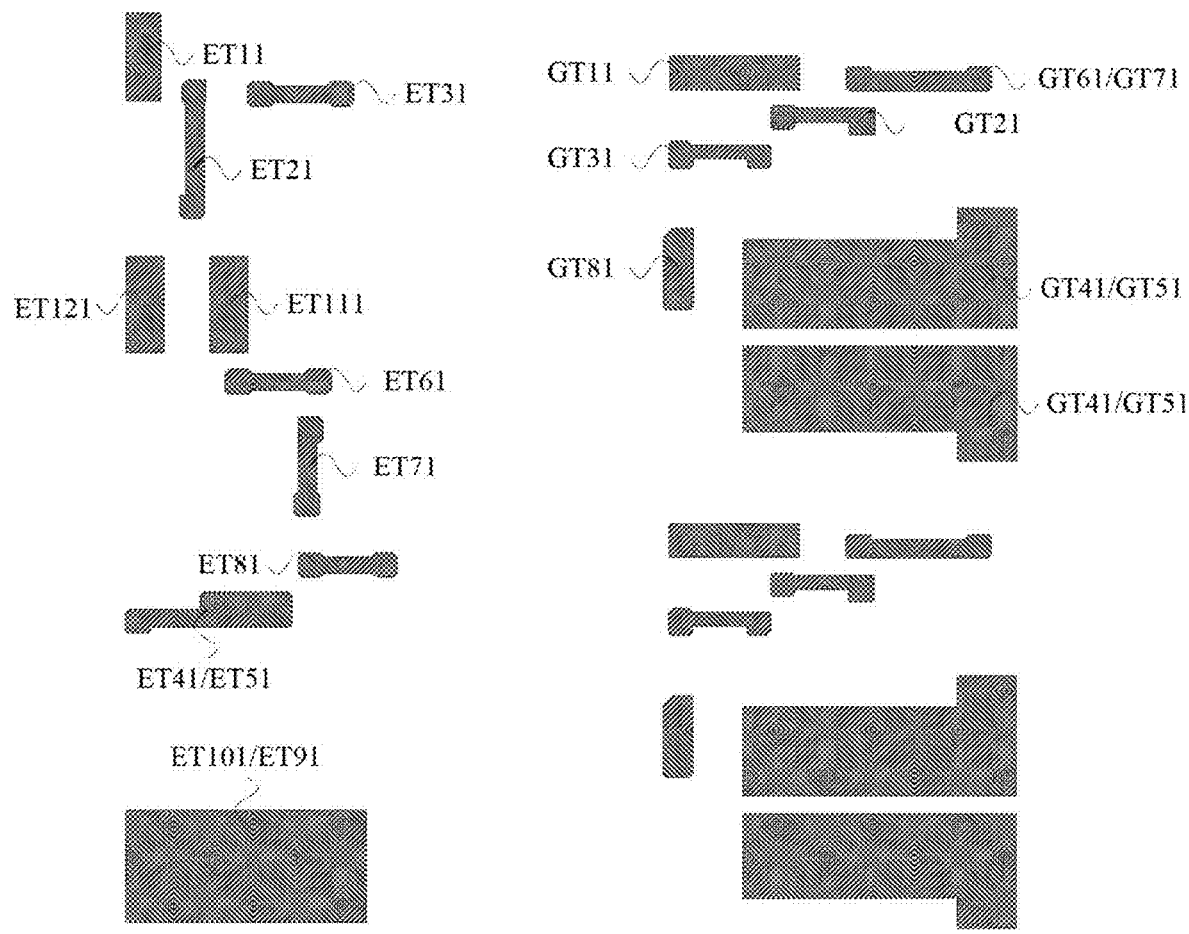
FIG. 27 is a schematic diagram after a pattern of a semiconductor layer is formed in FIG. 9.
Figure 28:
FIG. 28 is a schematic diagram after a pattern of a semiconductor layer is formed in FIG. 11.

(1) A pattern of a semiconductor layer is formed on a base substrate. In an exemplary implementation mode, forming a pattern of a semiconductor layer may include: depositing a semiconductor thin film on a base substrate, patterning the semiconductor thin film through a patterning process to form the pattern of the semiconductor layer, as shown in FIGS. 27 and 28, FIG. 27 is a schematic diagram after a pattern of a semiconductor layer is formed in FIG. 9, and FIG. 28 is a schematic diagram after a pattern of a semiconductor layer is formed in FIG. 11. FIG. 27 shows only a first region of FIG. 6A, and FIG. 28 shows only a second region and is illustrated by taking a case that that the second region includes a dummy light emitting register and a dummy scan register as an example.

In an exemplary implementation mode, as shown in FIGS. 27 and 28, the pattern of the semiconductor layer may include an active layer ET11 of a first light emitting transistor to an active layer ET121 of a twelfth light emitting transistor and an active layer GT11 of a first scan transistor to an active layer GT81 of an eighth scan transistor, that are located in the first region, and an active layer DET11 of a first dummy light emitting transistor to an active layer DET21 of a second dummy light emitting transistor and an active layer DGT11 of a first dummy scan transistor to an active layer DGT21 of a second dummy scan transistor, that are located in the second region.

In an exemplary implementation mode, as shown in FIG. 27, the active layer ET91 of the ninth light emitting transistor and the active layer ET101 of the tenth light emitting transistor are of an integral structure. The active layer GT41 of the fourth scan transistor and the active layer GT51 of the fifth scan transistor are of an integral structure. The active layer GT61 of the sixth scan transistor and the active layer GT71 of the seventh scan transistor are of an integral structure.

In an exemplary implementation mode, as shown in FIG. 28, the active layer DET11 of the first dummy light emitting transistor and the active layer DET21 of the second dummy light emitting transistor are of an integral structure. The active layer DGT11 of the first dummy scan transistor and the active layer DGT21 of the second dummy scan transistor are of an integral structure.

In an exemplary implementation mode, when the second region of the display substrate includes a dummy via, the pattern of the semiconductor layer may further include a dummy active layer.

In an exemplary implementation mode, a flexible base substrate may include a first flexible material layer, a first inorganic material layer, a semiconductor layer, a second flexible material layer, and a second inorganic material layer which are stacked. Materials of the first flexible material layer and the second flexible material layer may be Polyimide (PI), Polyethylene Terephthalate (PET), or surface treated polymer soft film, etc., and materials of the first inorganic material layer and the second inorganic material layer may be Silicon Nitride (SiNx), Silicon Oxide (SiOx), or the like, for improving water and oxygen resistance of the base substrate. The first inorganic material layer and the second inorganic material layer may also be referred to as barrier layers. A material of the semiconductor layer may be amorphous silicon (a-si). In an exemplary implementation mode, taking a laminated structure of PI1/Barrier1/a-si/PI2/Barrier2 as an example, its preparation process may include: firstly, coating a layer of polyimide on a glass carrier plate, curing it into a film to form a first flexible (PI1) layer; then, depositing a layer of barrier thin film on the first flexible layer to form a first barrier (Barrier1) layer covering the first flexible layer; then depositing a layer of amorphous silicon thin film on the first barrier layer to form an amorphous silicon (a-si) layer covering the first barrier layer; then coating a layer of polyimide on the amorphous silicon layer, curing it into a film to form a second flexible (PI2) layer; then depositing a layer of barrier thin film on the second flexible layer to form a second barrier (Barrier2) layer covering the second flexible layer, thereby completing preparation of the base substrate.

Figure 29:
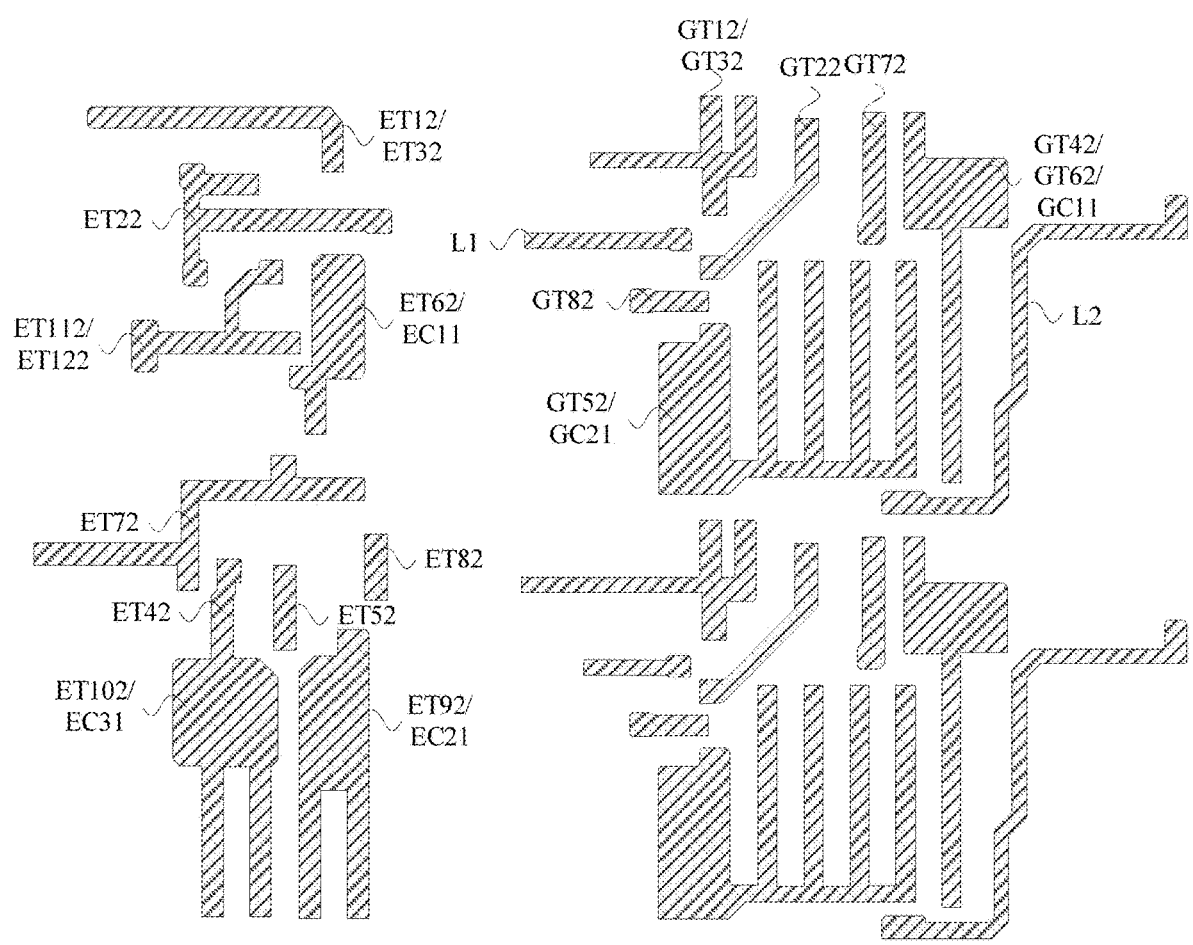
FIG. 29 is a schematic diagram of a pattern of a first conductive layer in FIG. 9.
Figure 30:
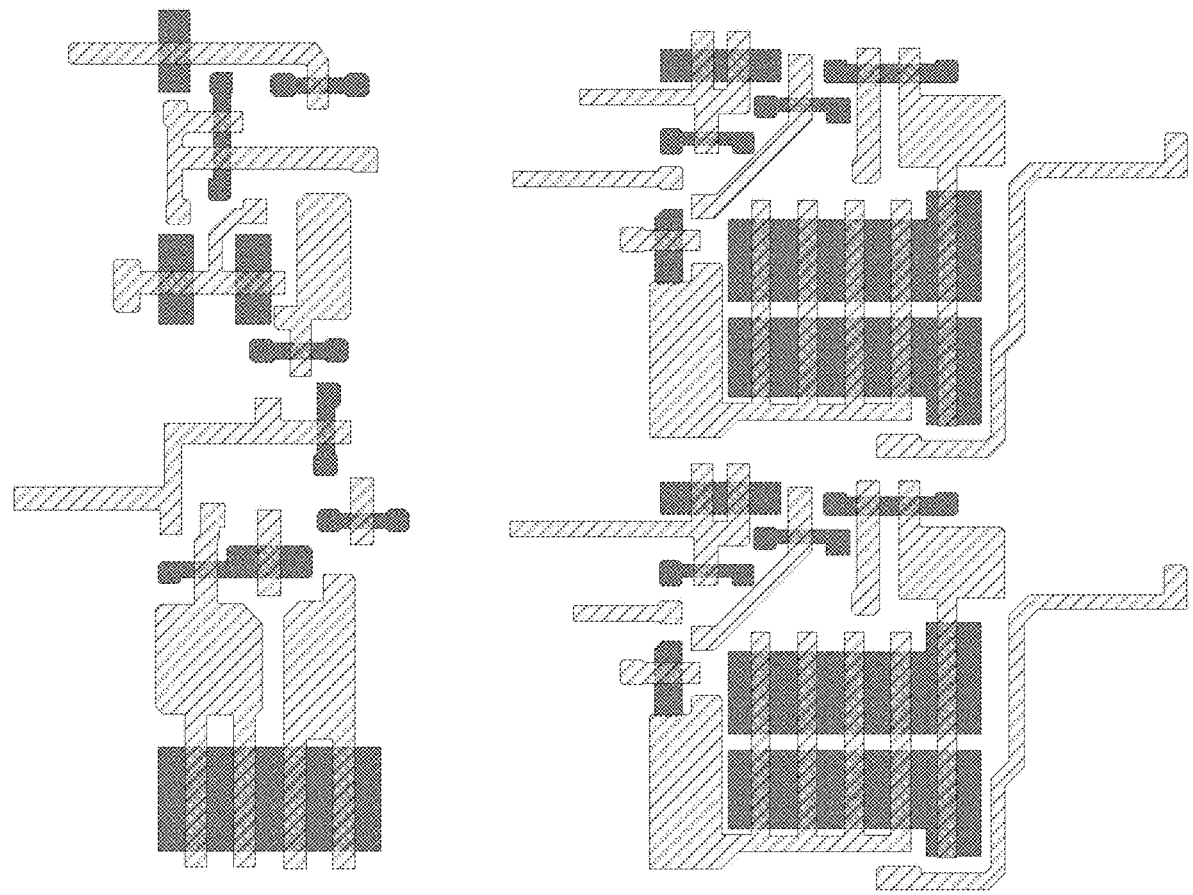
FIG. 30 is a schematic diagram after a pattern of a first conductive layer is formed in FIG. 9.
Figure 31:
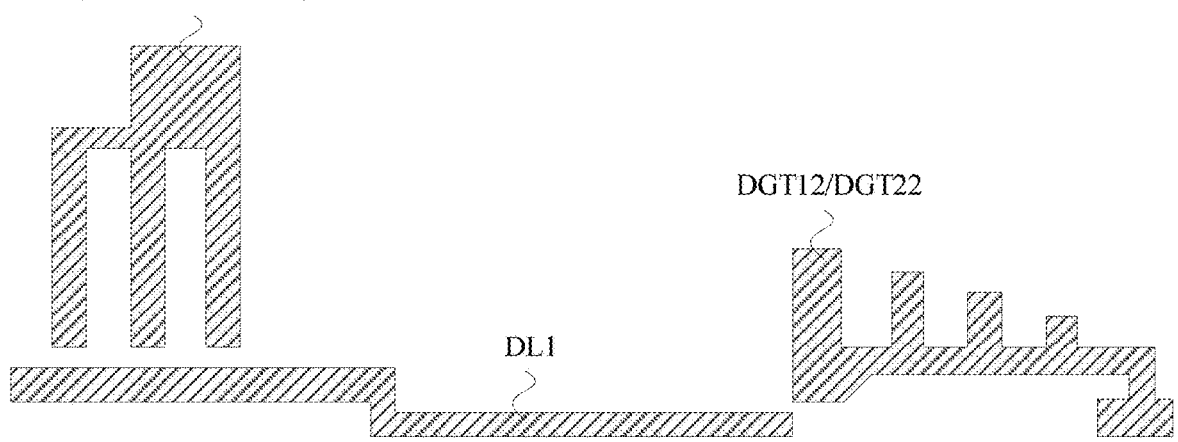
FIG. 31 is a schematic diagram of a pattern of a first conductive layer in FIG. 11.
Figure 32:
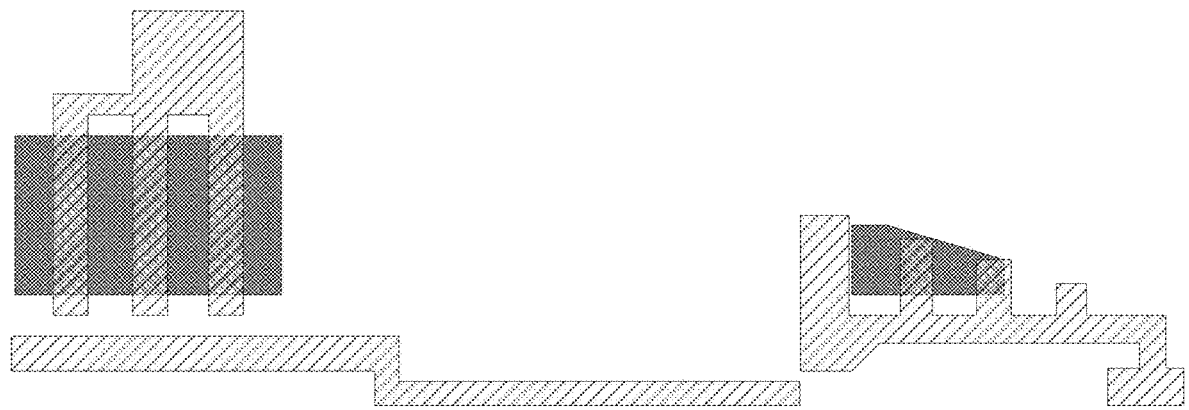
FIG. 32 is a schematic diagram after a pattern of a first conductive layer is formed in FIG. 11.

(2) A pattern of a first conductive layer is formed. In an exemplary implementation mode, forming a pattern of a first conductive layer may include: sequentially depositing a first insulation thin film and a first conductive thin film on the base substrate on which the above-mentioned pattern is formed, patterning the first conductive thin film through a patterning process to form a first insulation layer covering the pattern of the semiconductor layer and the pattern of the first conductive layer disposed on the first insulation layer, as shown in FIGS. 29 to 32, wherein FIG. 29 is a schematic diagram of a pattern of a first conductive layer in FIG. 9, FIG. 30 is a schematic diagram after a pattern of a first conductive layer is formed in FIG. 9, FIG. 31 is a schematic diagram of a pattern of a first conductive layer in FIG. 11, and FIG. 32 is a schematic diagram after a pattern of a first conductive layer is formed in FIG. 11. In an exemplary implementation mode, the first conductive layer may be referred to as a first gate metal (GATE1) layer.

In an exemplary implementation mode, as shown in FIGS. 29 to 32, the pattern of the first conductive layer may at least include a control electrode ET12 of the first light emitting transistor to a control electrode ET122 of the twelfth light emitting transistor, a first electrode EC11 of a first light emitting capacitor to a first electrode EC31 of a third light emitting capacitor, a control electrode GT12 of the first scan transistor to a control electrode GT82 of the eighth scan transistor, a first electrode GC11 of a first scan capacitor to a first electrode GC21 of a second scan capacitor, a first connection line L1, and a second connection line L2, that are located in the first region, and a control electrode DET12 of the first dummy light emitting transistor, a control electrode DET22 of the second dummy light emitting transistor, a first electrode plate DEC1 of a dummy light emitting capacitor, a control electrode DGT12 of the first dummy scan transistor, a control electrode DGT22 of the second dummy scan transistor, and a first dummy connection line DL1, that are located in the second region.

In an exemplary implementation mode, as shown in FIGS. 29 and 30, the control electrode ET12 of the first light emitting transistor and the control electrode ET32 of the third light emitting transistor are of an integral structure. The control electrode ET62 of the sixth light emitting transistor and the first electrode plate EC11 of the first light emitting capacitor are of an integral structure. The control electrode ET92 of the ninth light emitting transistor and the first electrode plate EC21 of the second light emitting capacitor are of an integral structure The control electrode ET42 of the fourth light emitting transistor, the control electrode ET102 of the tenth light emitting transistor, and the first electrode plate EC32 of the third light emitting capacitor are of an integral structure. The control electrode ET112 of the eleventh light emitting transistor and the control electrode ET122 of the twelfth light emitting transistor are of an integral structure. The control electrode GT42 of the fourth scan transistor, the control electrode GT62 of the sixth scan transistor, and the first electrode plate GC11 of the first scan capacitor are of an integral structure. The control electrode GT52 of the fifth scan transistor and the first electrode plate GC21 of the second scan capacitor are of an integral structure.

In an exemplary implementation mode, as shown in FIGS. 31 and 32, the control electrode DET12 of the first dummy light emitting transistor, the control electrode DET22 of the second dummy light emitting transistor, and the first electrode plate DEC1 of the dummy light emitting capacitor are of an integral structure. The control electrode DGT12 of the first dummy scan transistor and the control electrode DGT22 of the second dummy scan transistor are of an integral structure.

In an exemplary implementation mode, after the pattern of the first conductive layer is formed, the semiconductor layer may be subjected to a conductorization treatment by using the first conductive layer as a shield. The semiconductor layer in a region which is shielded by the first conductive layer forms a channel region of a transistor, and the semiconductor layer in a region which is not shielded by the first conductive layer is made to be conductorized.

Figure 33:
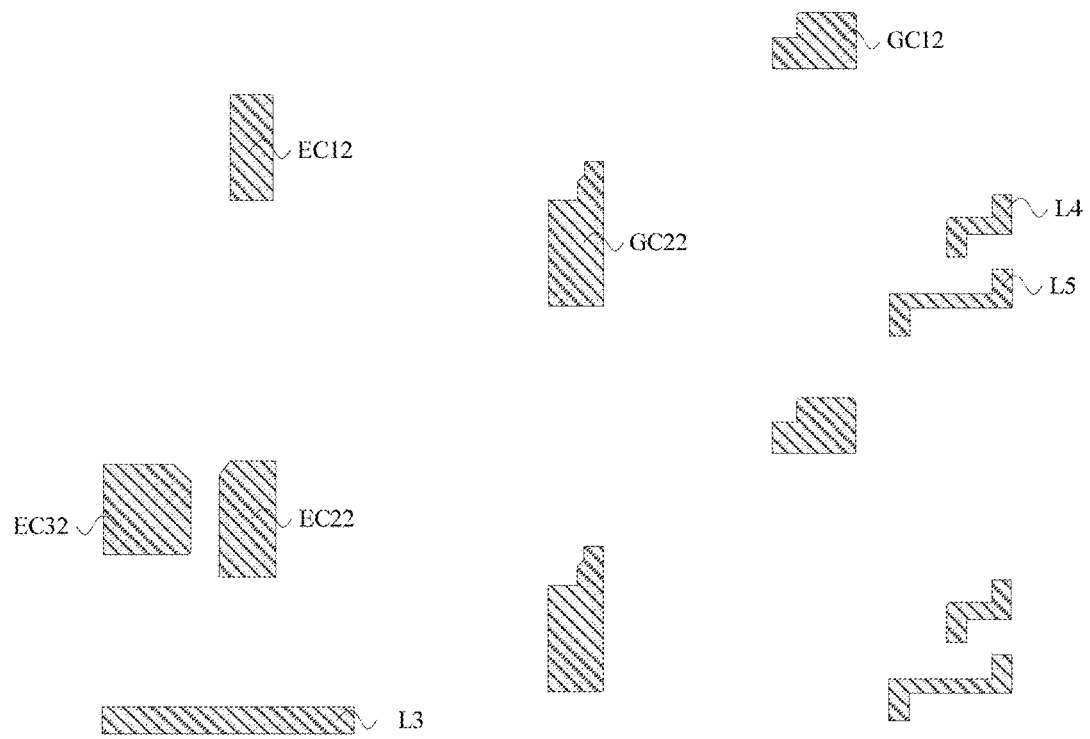
FIG. 33 is a schematic diagram of a pattern of a second conductive layer in FIG. 9.
Figure 34:
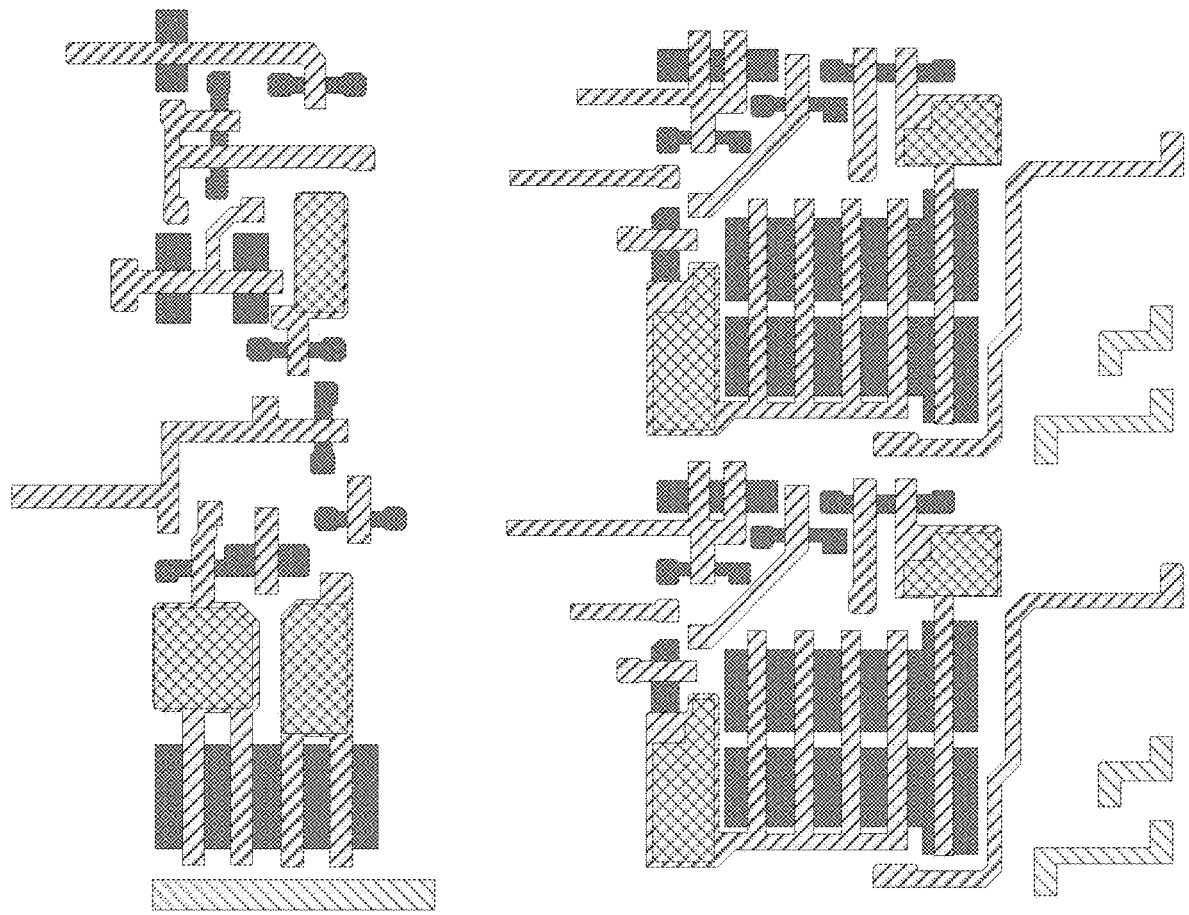
FIG. 34 is a schematic diagram after a pattern of a second conductive layer is formed in FIG. 9.
Figure 35:
FIG. 35 is a schematic diagram of a pattern of a second conductive layer in FIG. 11.
Figure 36:
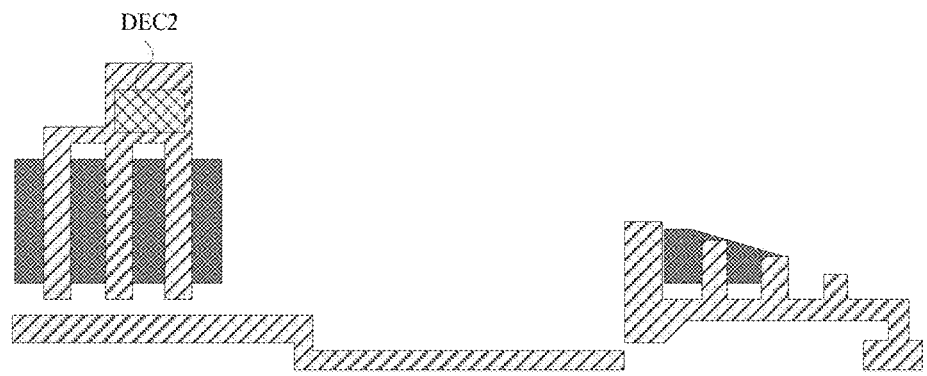
FIG. 36 is a schematic diagram after a pattern of a second conductive layer is formed in FIG. 11.

(3) A pattern of a second conductive layer is formed. In an exemplary implementation mode, forming a pattern of a second conductive layer may include: sequentially depositing a second insulation thin film and a second conductive thin film on the base substrate on which the above-mentioned patterns are formed, patterning the second conductive thin film through a patterning process to form a second insulation layer covering the pattern of the first conductive layer, and the pattern of the second conductive layer disposed on the second insulation layer, as shown in FIGS. 33 to 36, wherein FIG. 33 is a schematic diagram of a pattern of a second conductive layer in FIG. 9, FIG. 34 is a schematic diagram after a pattern of a second conductive layer is formed in FIG. 9, FIG. 35 is a schematic diagram of a pattern of a second conductive layer in FIG. 11, and FIG. 36 is a schematic diagram after a pattern of a second conductive layer is formed in FIG. 11. In an exemplary implementation mode, the second conductive layer may be referred to as a second gate metal (GATE2) layer.

In an exemplary implementation mode, as shown in FIGS. 33 to 36, the pattern of the second conductive layer may at least include a second electrode plate EC12 of the first light emitting capacitor to a second electrode plate EC32 of the third light emitting capacitor, a second electrode plate GC12 of the first scan capacitor, a second electrode plate GC32 of the second light emitting capacitor, a third connection line L3, a fourth connection line L4, and a fifth connection line L5, that are located in the first region, and a second electrode plate DEC2 of the dummy light emitting capacitor located in the second region.

(4) A pattern of a third insulation layer is formed. In an exemplary implementation mode, forming a pattern of a third insulation layer may include: depositing a third insulation thin film on the base substrate on which the above-mentioned patterns are formed, patterning the third insulation thin film using a patterning process to form a third insulation layer covering the second conductive layer, and patterns of a plurality of via are disposed on the third insulation layer, as shown in FIGS. 37 and 38, wherein FIG. 37 is a schematic diagram after a pattern of a third insulation layer is formed in FIG. 9, and FIG. 38 is a schematic diagram after a pattern of a third insulation layer is formed in FIG. 11.

Figure 37:
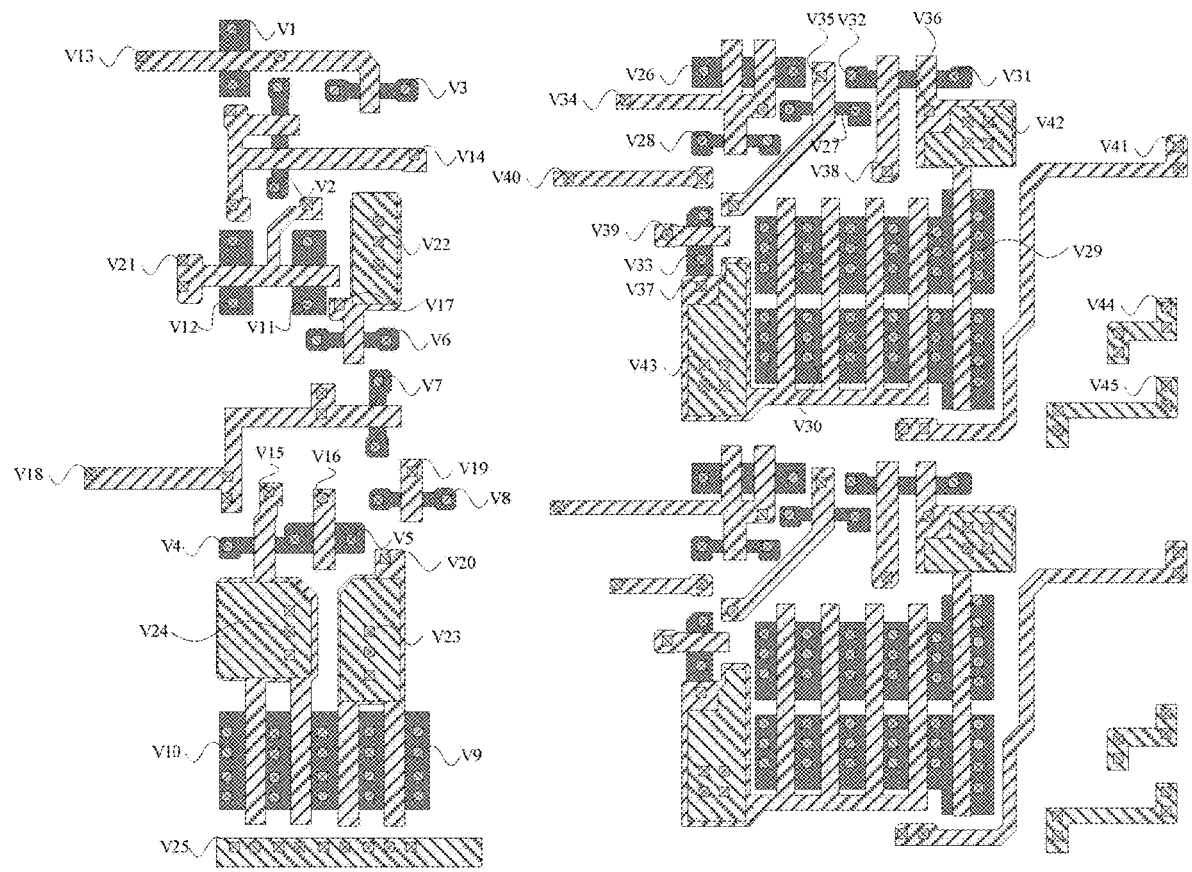
FIG. 37 is a schematic diagram after a pattern of a third insulation layer is formed in FIG. 9.
Figure 38:
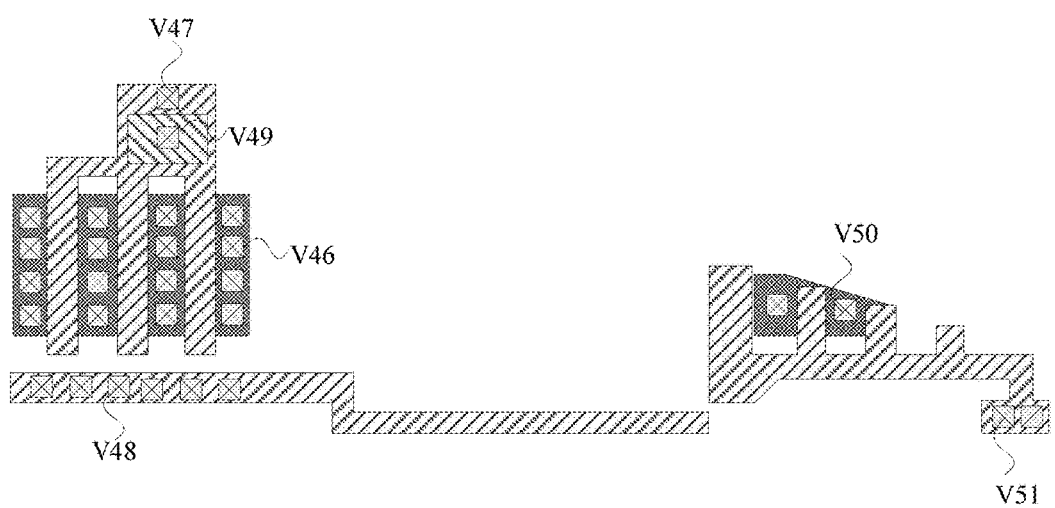
FIG. 38 is a schematic diagram after a pattern of a third insulation layer is formed in FIG. 11.

In an exemplary implementation mode, as shown in FIGS. 37 and 38, the patterns of the plurality of via may at least include a first via V1 to a forty-fifth via V45 located in the first region and a forty-sixth via V46 to a fifty-first via V51 located in the second region.

In an exemplary implementation mode, as shown in FIG. 37, the first via V1 exposes the active layer of the first light emitting transistor, the second via V2 exposes the active layer of the second light emitting transistor, the third via V3 exposes the active layer of the third light emitting transistor, the fourth via V4 exposes the active layer of the fourth light emitting transistor, the fifth via V5 exposes the active layer of the fifth light emitting transistor, the sixth via V6 exposes the active layer of the sixth light emitting transistor, the seventh via V7 exposes the active layer of the seventh light emitting transistor, the eighth via V8 exposes the active layer of the eighth light emitting transistor, the ninth via V9 exposes the active layer of the ninth light emitting transistor, the tenth via V10 exposes the active layer of the tenth light emitting transistor, the eleventh via V11 exposes the active layer of the eleventh light emitting transistor, the twelfth via V12 exposes the active layer of the twelfth light emitting transistor, the thirteenth via V13 exposes the control electrode of the first light emitting transistor (which is also the control electrode of the third light emitting transistor), the fourteenth via V14 exposes the control electrode of the second light emitting transistor, the fifteenth via V15 exposes the control electrode of the fourth light emitting transistor, the sixteenth via V16 exposes the control electrode of the fifth light emitting transistor, the seventeenth via V17 exposes the control electrode of the sixth light emitting transistor, the eighteenth via V18 exposes the control electrode of the seventh light emitting transistor, the nineteenth via V19 exposes the control electrode of the eighth light emitting transistor, the twentieth via V20 exposes the control electrode of the ninth light emitting transistor, the twenty-first via V21 exposes the control electrode of the eleventh light emitting transistor (which is also the control electrode of the twelfth light emitting transistor), the twenty-second via V22 exposes the second electrode plate of the first light emitting capacitor, the twenty-third via V23 exposes the second electrode plate of the second light emitting capacitor, the twenty-fourth via V24 exposes the second electrode plate of the third light emitting capacitor, the twenty-fifth via V25 exposes the first connection line, the twenty-sixth via V26 exposes the active layer of the first scan transistor, the twenty-seventh via V27 exposes the active layer of the second scan transistor, the twenty-eighth via V28 exposes the active layer of the third scan transistor, the twenty-ninth via V29 exposes the active layer of the fourth scan transistor, the thirtieth via V30 exposes the active layer of the fifth scan transistor, the thirty-first via V31 exposes the active layer of the sixth scan transistor, the thirty-second via V32 exposes the active layer of the seventh scan transistor, the thirty-third via V33 exposes the active layer of the eighth scan transistor, the thirty-fourth via V34 exposes the control electrode of the first scan transistor (which is also the control electrode of the third scan transistor), the thirty-fifth via V35 exposes the control electrode of the second scan transistor, the thirty-sixth via V36 exposes the control electrode of the fourth scan transistor (which is also the control electrode of the sixth scan transistor and the first electrode plate of the first scan capacitor), the thirty-seventh via V37 exposes the control electrode of the fifth scan transistor (which is also the first electrode plate of the second scan capacitor), the thirty-eighth via V38 exposes the control electrode of the seventh scan transistor, the thirty-ninth via V39 exposes the control electrode of the eighth scan transistor, the fortieth via V40 exposes the second connection line, the forty-first via V41 exposes the third connection line, the forty-first via V42 exposes the second electrode plate of the first scan capacitor, the forty-third via V43 exposes the second electrode plate of the second scan capacitor, the forty-fourth via V44 exposes the fourth connection line, the forty-fifth via V45 exposes the fifth connection line.

In an exemplary implementation mode, as shown in FIG. 38, the forty-sixth via V46 exposes the active layer of the first dummy light emitting transistor (which is also the active layer of the second dummy light emitting transistor), the forty-seventh via V47 exposes the control electrode of the first dummy light emitting transistor (which is also the control electrode of the second dummy light emitting transistor and the first electrode plate of the dummy light emitting capacitor), the forty-eighth via V48 exposes the first dummy connection line, the forty-ninth via V49 exposes the second electrode plate of the dummy light emitting capacitor, the fiftieth via V50 exposes the active layer of the first dummy scan transistor (which is also the active layer of the second dummy scan transistor), and the fifty-first via V51 exposes the control electrode of the first scan light emitting transistor (which is also the control electrode of the second dummy scan transistor).

Figure 39:
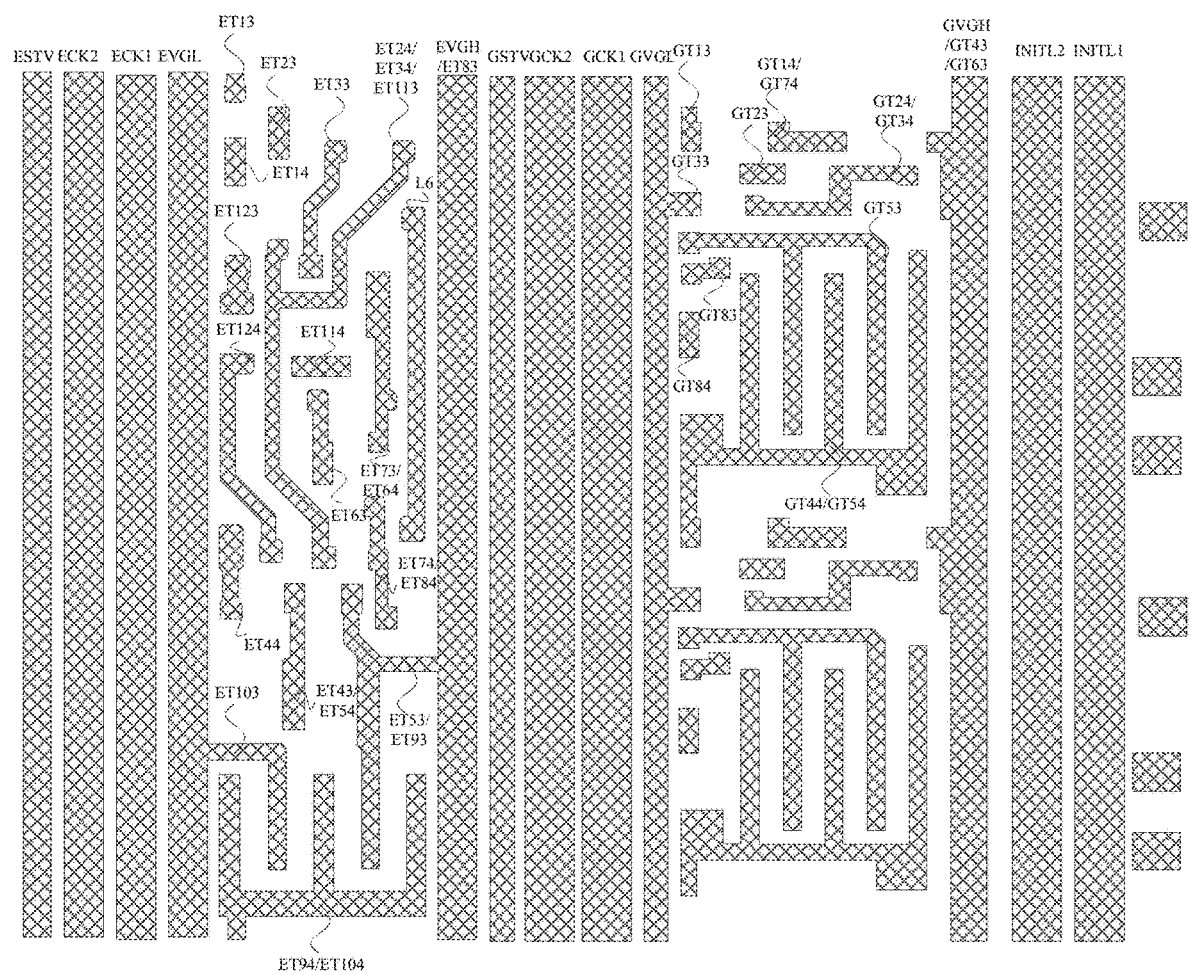
FIG. 39 is a schematic diagram of a pattern of a third conductive layer in FIG. 9.
Figure 40:
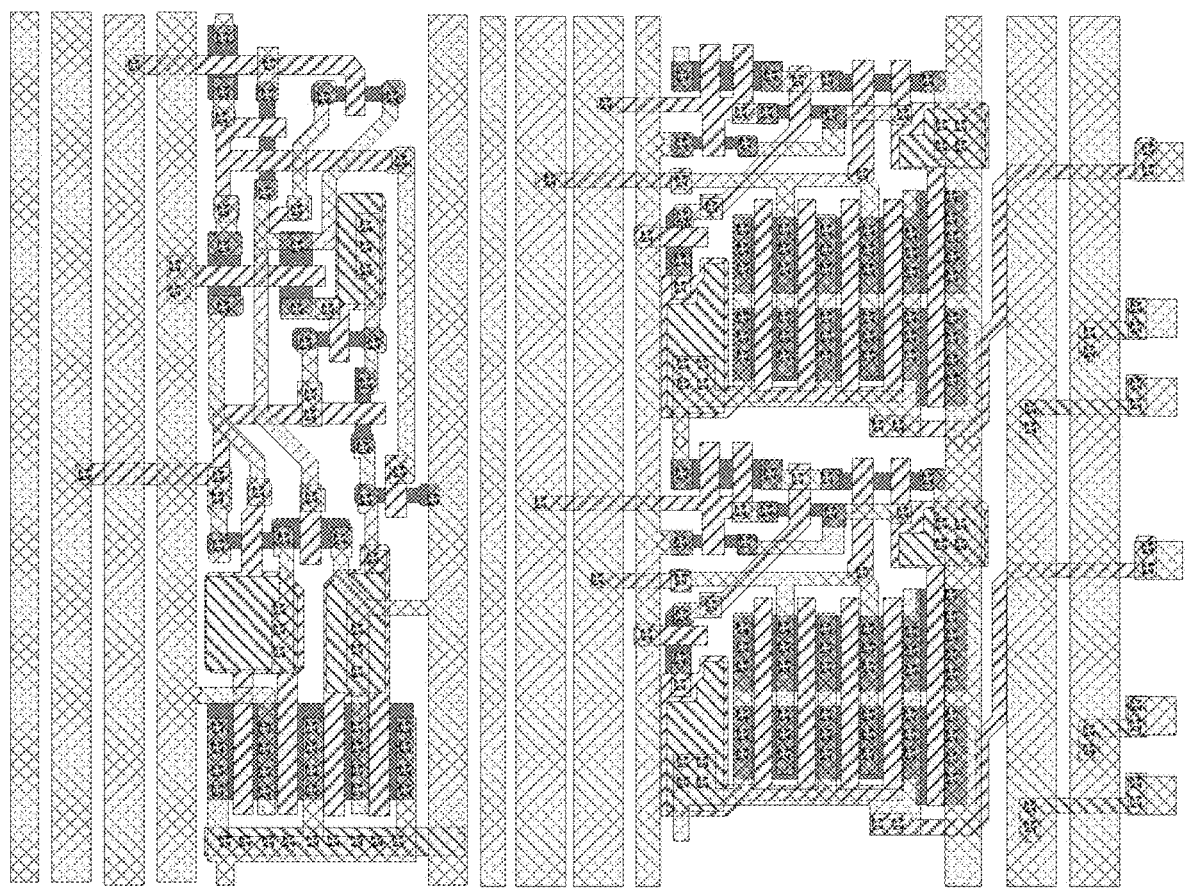
FIG. 40 is a schematic diagram after a pattern of a third conductive layer is formed in FIG. 9.
Figure 41:
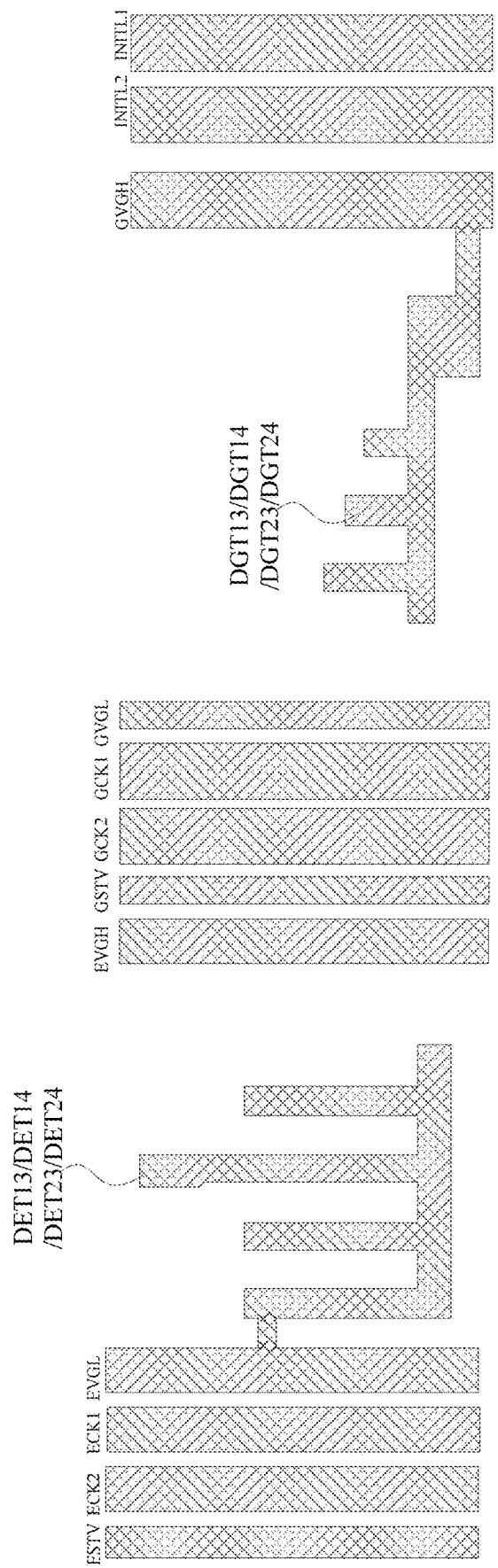
FIG. 41 is a schematic diagram of a pattern of a third conductive layer in FIG. 11.
Figure 42:
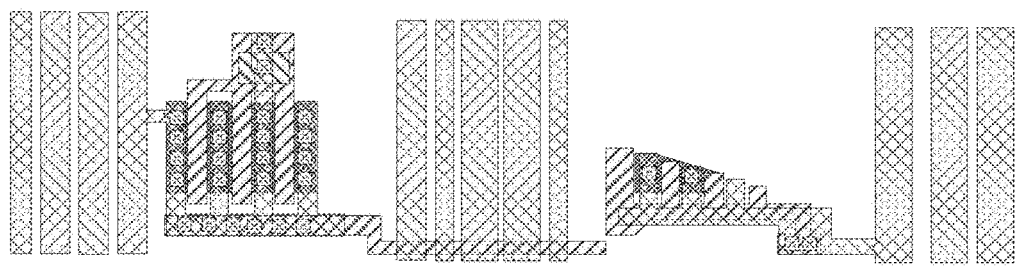
FIG. 42 is a schematic diagram after a pattern of a third conductive layer is formed in FIG. 11.

(5) A pattern of a third conductive layer is formed. In an exemplary implementation mode, forming a third conductive layer may include: depositing a third conductive thin film on the base substrate on which the above-mentioned patterns are formed, patterning the third conductive thin film using a patterning process to form the third conductive layer disposed on the third insulation layer, as shown in FIGS. 39 and 42, wherein FIG. 39 is a schematic diagram of a pattern of a third conductive layer in FIG. 9, FIG. 40 is a schematic diagram after a pattern of a third conductive layer is formed in FIG. 9, FIG. 41 is a schematic diagram of a pattern of a third conductive layer in FIG. 11, and FIG. 42 is a schematic diagram after a pattern of a third conductive layer is formed in FIG. 11. In an exemplary implementation mode, the third conductive layer may be referred to as a source-drain metal (SD) layer.

In an exemplary implementation mode, as shown in FIGS. 39 to 42, the pattern of the third conductive layer may at least include a light emitting initial signal line ESTV, a first light emitting clock signal line ECK1, a second light emitting clock signal line ECK2, a first light emitting power supply line EVGH, a second light emitting power supply line EVGL, a scan initial signal line GSTV, a first scan clock signal line GCK1, a second scan clock signal line GCK2, a first scan power supply line GVGH, a second scan power supply line GVGL, initial power supply lines INITL1 and INITL2, and a first electrode ET13 and a second electrode ET14 of the first light emitting transistor to a first electrode ET123 and a second electrode ET12 of the twelfth light emitting transistor, a first electrode GT13 and a second electrode GT14 of the first scan transistor to a first electrode GT83 and a second electrode GT84 of the eighth scan transistor, and a sixth connection line L6, that are located in the first region, and a first electrode DET13 and a second electrode DET14 of the first dummy light emitting transistor, a first electrode DET23 and a second electrode DET24 of the second dummy light emitting transistor, a first electrode DGT13 and a second electrode DGT14 of the first scan light emitting transistor, and a first electrode DGT23 and a second electrode DGT24 of the second dummy scan transistor, that are located in the second region.

In an exemplary implementation mode, as shown in FIGS. 39 and 40, the second electrode ET24 of the second light emitting transistor, the second electrode ET34 of the third light emitting transistor, and the first electrode ET113 of the eleventh light emitting transistor are of an integral structure. The first electrode ET43 of the fourth light emitting transistor and the second electrode ET54 of the fifth light emitting transistor are of an integral structure. The first electrode ET53 of the fifth light emitting transistor, the first electrode ET83 of the eighth light emitting transistor, and the first electrode ET93 of the ninth transistor are of an integral structure with the first light emitting power supply line EVGH. The second electrode ET64 of the sixth light emitting transistor and the first electrode ET73 of the seventh light emitting transistor are of an integral structure. The second electrode ET74 of the seventh light emitting transistor and the second electrode ET84 of the eighth light emitting transistor are of an integral structure. The second electrode ET94 of the ninth light emitting transistor and the second electrode ET104 of the tenth light emitting transistor are of an integral structure. The first electrode ET103 of the tenth light emitting transistor and the second light emitting power supply line EVGL are of an integral structure.

In an exemplary implementation mode, as shown in FIG. 40, the first electrode of the first light emitting transistor is electrically connected with the active layer of the first light emitting transistor through the first via, the second electrode of the first light emitting transistor is electrically connected with the active layer of the first light emitting transistor through the first via, and is electrically connected with the control electrode of the second light emitting transistor through the fourteenth via, the first electrode of the second light emitting transistor is electrically connected with the active layer of the second light emitting transistor through the second via, and is electrically connected with the control electrode of the first light emitting transistor (which is also the control electrode of the third light emitting transistor) through the thirteenth via, the second electrode of the second light emitting transistor (which is also the second electrode of the third light emitting transistor and the first electrode of the eleventh light emitting transistor) is electrically connected with the active layer of the second light emitting transistor through the second via, is electrically connected with the active layer of the third light emitting transistor through the third via, is electrically connected with the active layer of the eleventh light emitting transistor through the eleventh via, and is electrically connected with the control electrode of the fifth light emitting transistor through the sixteenth via. The first electrode of the third light emitting transistor is electrically connected with the active layer of the third light emitting transistor through the third via, and is electrically connected with the control electrode of the eleventh light emitting transistor (which is also the control electrode of the twelfth light emitting transistor) through the twenty-first via, the first electrode of the fourth light emitting transistor (which is also the second electrode of the fifth light emitting transistor) is electrically connected with the active layer of the fourth light emitting transistor through the fourth via, is electrically connected with the active layer of the fifth light emitting transistor through the fifth via, and is electrically connected with the second electrode plate of the third light emitting capacitor through the twenty-fourth via, the second electrode of the fourth light emitting transistor is electrically connected with the active layer of the fourth light emitting transistor through the fourth via, and is electrically connected with the control electrode of the seventh light emitting transistor through the eighteenth via, the first electrode of the fifth light emitting transistor (which is also the first electrode of the eighth light emitting transistor and the first electrode of the ninth transistor) is electrically connected with the active layer of the fifth light emitting transistor through the fifth via, is electrically connected with the active layer of the eighth light emitting transistor through the eighth via, is electrically connected with the active layer of the ninth light emitting transistor through the ninth via, and is electrically connected with the second electrode plate of the second light emitting capacitor through the twenty-third via. The first electrode of the sixth light emitting transistor is electrically connected with the active layer of the sixth light emitting transistor through the sixth via, and is electrically connected with the control electrode of the seventh light emitting transistor through the eighteenth via, the second electrode of the sixth light emitting transistor (which is also the first electrode of the seventh light emitting transistor) is electrically connected with the active layer of the sixth light emitting transistor through the sixth via, is electrically connected with the active layer of the seventh light emitting transistor through the seventh via, and is electrically connected with the second electrode plate of the first light emitting capacitor through the twenty-second via. The second electrode of the seventh light emitting transistor (which is also the second electrode of the eighth light emitting transistor) is electrically connected with the active layer of the seventh light emitting transistor through the seventh via, is electrically connected with the active layer of the eighth light emitting transistor through the eighth via, and is electrically connected with the control electrode of the ninth light emitting transistor (which is also the first electrode plate of the second light emitting capacitor) through the twentieth via. The second electrode of the ninth light emitting transistor (which is also the second electrode of the tenth light emitting transistor) is electrically connected with the active layer of the ninth light emitting transistor through the ninth via, is electrically connected with the active layer of the tenth light emitting transistor through the tenth via, and is electrically connected with the first connection line through the twenty-fifth via. The first electrode of the tenth light emitting transistor is electrically connected with the active layer of the tenth light emitting transistor through the tenth via, the second electrode of the eleventh light emitting transistor is electrically connected with the active layer of the eleventh light emitting transistor through the eleventh via, and is electrically connected with the control electrode of the sixth light emitting transistor (which is also the first electrode plate of the first light emitting capacitor) through the seventeenth via. The first electrode of the twelfth light emitting transistor is electrically connected with the active layer of the twelfth light emitting transistor through the twelfth via, and is electrically connected with the control electrode of the second light emitting transistor through the fourteenth via. The second electrode of the twelfth light emitting transistor is electrically connected with the active layer of the twelfth light emitting transistor through the twelfth via, and is electrically connected with the control electrode of the fourth light emitting transistor through the fifteenth via. The sixth connection line is electrically connected with the control electrode of the second light emitting transistor through the fourteenth via, and is electrically connected with the control electrode of the eighth light emitting transistor through the nineteenth via. The control electrode of the first light emitting transistor (which is also the control electrode of the first light emitting transistor) is electrically connected with one of the first light emitting clock signal line and the second light emitting clock signal line through the thirteenth via. The control electrode of the seventh light emitting transistor is electrically connected with the other signal line of the first light emitting clock signal line and the second light emitting clock signal line through the eighteenth via. FIG. 40 is illustrated by taking a case that the control electrode of the first light emitting transistor (which is also the control electrode of the first light emitting transistor) is electrically connected with the first light emitting clock signal line through the thirteenth via, and the control electrode of the seventh light emitting transistor is electrically connected with the second light emitting clock signal line through the eighteenth via as an example.

In an exemplary implementation mode, as shown in FIGS. 39 and 40, the second electrode GT14 of the first scan transistor and the second electrode GT74 of the seventh scan transistor are of an integral structure, the second electrode GT24 of the second scan transistor and the second electrode GT34 of the third scan transistor are of an integral structure, the first electrode GT33 of the third scan transistor and the second scan power supply line GVGL are of an integral structure, the second electrode GT44 of the fourth scan transistor and the second electrode GT54 of the fifth scan transistor are of an integral structure, and the first electrode GT43 of the fourth scan transistor, the first electrode GT63 of the sixth scan transistor, and the first scan power supply line GVGH are of an integral structure.

In an exemplary implementation mode, as shown in FIG. 40, the first electrode of the first scan transistor is electrically connected with the active layer of the first scan transistor through the twenty-sixth via, the second electrode of the first scan transistor (which is also the second electrode of the seventh scan transistor) is electrically connected with the active layer of the first scan transistor through the twenty-sixth via, is electrically connected with the active layer of the seventh scan transistor through the thirty-second via, and is electrically connected with the control electrode of the second scan transistor through the thirty-fifth via. The first electrode of the second scan transistor is electrically connected with the active layer of the second scan transistor through the twenty-seventh via, and is electrically connected with the control electrode of the first scan transistor (which is also the control electrode of the third scan transistor) through the thirty-fourth via. The first electrode of the second scan transistor (which is also the second electrode of the third scan transistor) is electrically connected with the active layer of the second scan transistor through the twenty-seventh via, is electrically connected with the active layer of the third scan transistor through the twenty-eighth via, and is electrically connected with the control electrode of the fourth scan transistor (which is also the control electrode of the sixth scan transistor and the first electrode plate of the first scan capacitor) through the thirty-sixth via. The first electrode of the third scan transistor is electrically connected with the active layer of the third scan transistor through the twenty-eighth via, the first electrode of the fourth scan transistor (which is also the first electrode of the sixth scan transistor) is electrically connected with the active layer of the fourth scan transistor through the twenty-ninth via, is electrically connected with the active layer of the sixth scan transistor through the thirty-first via, and is electrically connected with the second electrode plate of the first scan capacitor through the forty-first via. The second electrode of the fourth scan transistor (which is also the second electrode of the fifth scan transistor) is electrically connected with the active layer of the fourth scan transistor through the twenty-ninth via, is electrically connected with the active layer of the fifth scan transistor through the thirtieth via, is electrically connected with the second electrode plate of the second scan capacitor through the forty-third via, and is electrically connected with the third connection line through the forty-first via. The first electrode of the fifth scan transistor is electrically connected with the active layer of the fifth scan transistor through the thirtieth via, is electrically connected with the second electrode plate of the second scan capacitor through the forty-third via, is electrically connected with the second connection line through the fortieth via, is electrically connected with the third connection line through the forty-first via, and is electrically connected with the control electrode of the seventh scan transistor through the thirty-eighth via. The first electrode of the eighth scan transistor is electrically connected with the active layer of the eighth scan transistor through the thirty-third via, and is electrically connected with the control electrode of the second scan transistor through the thirty-fifth via. The second electrode of the eighth scan transistor is electrically connected with the n active layer of the eighth scan transistor through the thirty-third via and is electrically connected with the control electrode of the fifth scan transistor (which is also the first electrode plate of the second scan capacitor) through the thirty-seventh via. The control electrode of the eighth scan transistor is electrically connected with one of the first scan clock signal line and the second scan clock signal line through the thirty-ninth via, the control electrode of the first scan transistor (which is also the control electrode of the third scan transistor) is electrically connected with the other of the first scan clock signal line and the second scan clock signal line through the thirty-fourth via, the first initial power supply line is electrically connected with the fourth connection line through the forty-fourth via, and the second initial power supply line is electrically connected with the fifth connection line through the forty-fifth via.

In an exemplary implementation mode, as shown in FIGS. 41 and 42, the first electrode DET13 and the second electrode DET14 of the first dummy light emitting transistor, and the first electrode DET23 and the second electrode DET24 of the second dummy light emitting transistor are of an integral structure with the second light emitting power supply line EVGL. The first electrode DGT13 and the second electrode DGT14 of the first scan light emitting transistor, and the first electrode DGT23 and the second electrode DGT24 of the second dummy scan transistor are of an integral structure with the first scan power supply line GVGH.

In an exemplary implementation mode, as shown in FIG. 42, the first electrode of the first dummy light emitting transistor (which is also the second electrode of the first dummy light emitting transistor, and the first electrode and the second electrode of the second dummy light emitting transistor) is electrically connected with the active layer of the first dummy light emitting transistor (which is also the active layer of the second dummy light emitting transistor) through the forty-sixth via, is electrically connected with the control electrode of the first dummy light emitting transistor (which is also the control electrode of the second dummy light emitting transistor and the first electrode plate of the dummy light emitting capacitor) through the forty-seventh via, is electrically connected with the first dummy connection line through the forty-eighth via, and is electrically connected with the second electrode plate of the dummy light emitting capacitor through the forty-ninth via. The first electrode of the first scan light emitting transistor (which is also the second electrode of the first scan light emitting transistor, and the first electrode and the second electrode of the second dummy scan transistor) is electrically connected with the active layer of the first dummy scan transistor (which is also the active layer of the second dummy scan transistor) through the fiftieth via, and is electrically connected with the control electrode of the first scan light emitting transistor (which is also the control electrode of the second dummy scan transistor) through the fifty-first via.

So far, the drive circuit layer of the display substrate provided in FIG. 6A is prepared on the base substrate. The drive circuit layer may include the semiconductor layer, the first insulation layer, the first conductive layer, the second insulation layer, the second conductive layer, the third insulation layer, and the third conductive layer that are sequentially disposed on the base substrate.

Exemplary description is made below through a preparation process of the display substrate provided in FIG. 16A.

Figure 43:
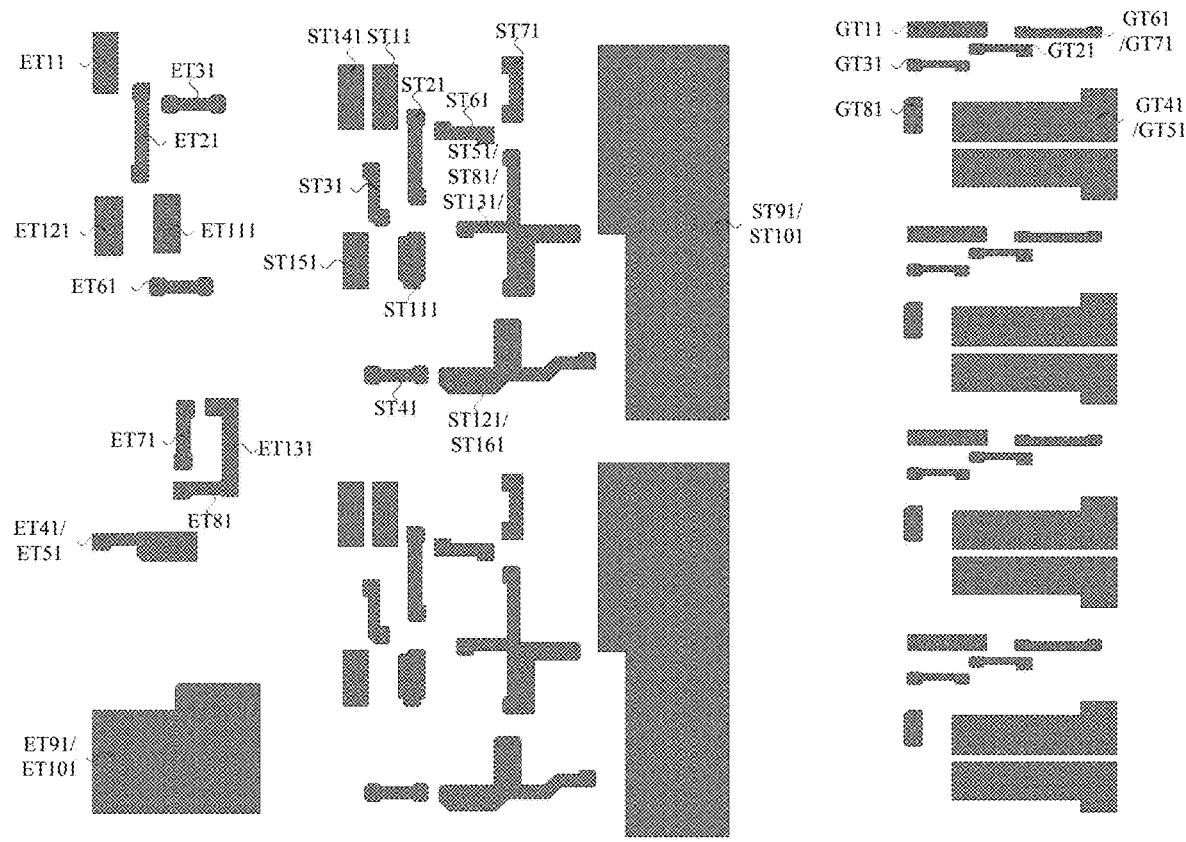
FIG. 43 is a schematic diagram after a pattern of a semiconductor layer is formed in FIG. 19.
Figure 44:
FIG. 44 is a schematic diagram after a pattern of a semiconductor layer is formed in FIG. 21.

(1) A pattern of a semiconductor layer is formed on a base substrate. In an exemplary implementation mode, forming a pattern of a semiconductor layer may include: depositing a semiconductor thin film on the base substrate, patterning the semiconductor thin film through a patterning process to form the pattern of the semiconductor layer, as shown in FIGS. 43 and 44, FIG. 43 is a schematic diagram after a pattern of a semiconductor layer is formed in FIG. 19, and FIG. 44 is a schematic diagram after a pattern of a semiconductor layer is formed in FIG. 21. FIG. 43 shows only a first region, and FIG. 44 shows only a second region, and is illustrated by taking a case in which the second region is the second region shown in FIG. 21 as an example.

In an exemplary implementation mode, as shown in FIGS. 43 and 44, the pattern of the semiconductor layer may include an active layer ET11 of a first light emitting transistor to an active layer ET131 of a thirteenth light emitting transistor, an active layer ST11 of a first control transistor to an active layer ST161 of a sixteenth control transistor, an active layer GT11 of a first scan transistor to an active layer GT81 of an eighth scan transistor, that are located in the first region, and an active layer DET11 of a first dummy light emitting transistor to an active layer DET31 of a third dummy light emitting transistor and an active layer DGT11 of a first dummy scan transistor, that are located in the second region.

In an exemplary implementation mode, as shown in FIG. 43, the active layer GT41 of the fourth scan transistor and the active layer GT51 of the fifth scan transistor are of an integral structure. The active layer ET81 of the eighth light emitting transistor and the active layer ET131 of the thirteenth light emitting transistor are of an integral structure. The active layer ET91 of the ninth light emitting transistor and the active layer ET101 of the tenth light emitting transistor are of an integral structure. The active layer ST51 of the fifth control transistor, the active layer ST81 of the eighth control transistor, and the active layer ET131 of the thirteenth control transistor are of an integral structure. The active layer ST91 of the ninth control transistor and the active layer ET101 of the tenth control transistor are of an integral structure. The active layer ST121 of the twelfth control transistor and the active layer ET161 of the sixteenth control transistor are of an integral structure. The active layer GT41 of the fourth scan transistor and the active layer GT51 of the fifth scan transistor are of an integral structure. The active layer GT61 of the sixth scan transistor and the active layer GT71 of the seventh scan transistor are of an integral structure.

In an exemplary implementation mode, when the second region of the display substrate includes a dummy via, the pattern of the semiconductor layer may further include a dummy active layer.

In an exemplary implementation mode, a flexible base substrate may include a first flexible material layer, a first inorganic material layer, a semiconductor layer, a second flexible material layer, and a second inorganic material layer which are stacked. Materials of the first flexible material layer and the second flexible material layer may be Polyimide (PI), Polyethylene Terephthalate (PET), or surface treated polymer soft film, etc., and materials of the first inorganic material layer and the second inorganic material layer may be Silicon Nitride (SiNx), Silicon Oxide (SiOx), or the like, for improving water and oxygen resistance of a base substrate. The first inorganic material layer and the second inorganic material layer may also be referred to as barrier layers. A material of the semiconductor layer may be amorphous silicon (a-si). In an exemplary implementation mode, taking a laminated structure of PI1/Barrier1/a-si/PI2/Barrier2 as an example, its preparation process may include:

firstly, coating a layer of polyimide on a glass carrier plate, curing it into a film to form a first flexible (PI1) layer; then, depositing a layer of barrier thin film on the first flexible layer to form a first barrier (Barrier1) layer covering the first flexible layer; then depositing a layer of amorphous silicon thin film on the first barrier layer to form an amorphous silicon (a-si) layer covering the first barrier layer; then coating a layer of polyimide on the amorphous silicon layer, curing it into a film to form a second flexible (PI2) layer; then depositing a layer of barrier thin film on the second flexible layer to form a second barrier (Barrier2) layer covering the second flexible layer, thereby completing preparation of the base substrate.

Figure 45:
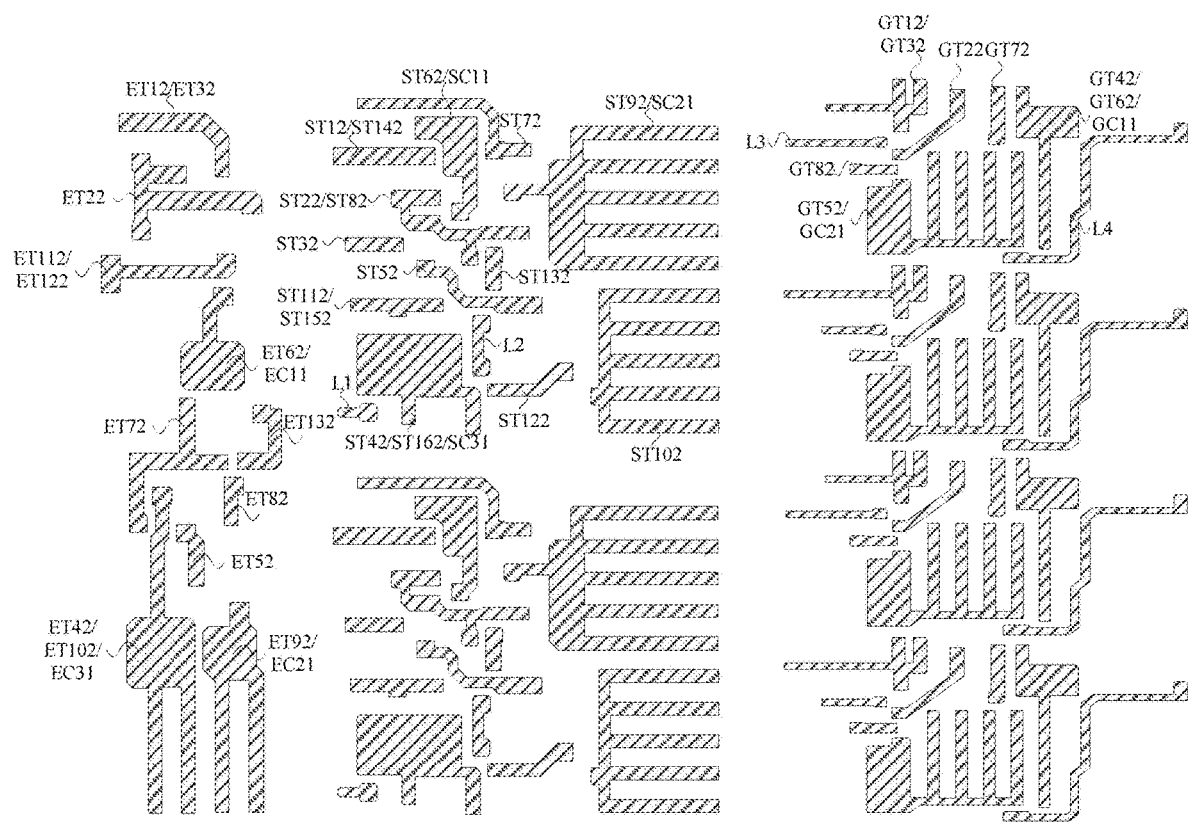
FIG. 45 is a schematic diagram of a pattern of a first conductive layer in FIG. 19.
Figure 46:
FIG. 46 is a schematic diagram after a pattern of a first conductive layer is formed in FIG. 19.
Figure 47:
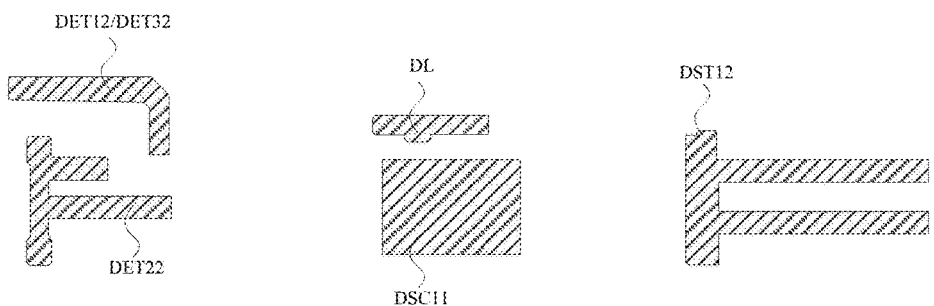
FIG. 47 is a schematic diagram of a pattern of a first conductive layer in FIG. 21.
Figure 48:
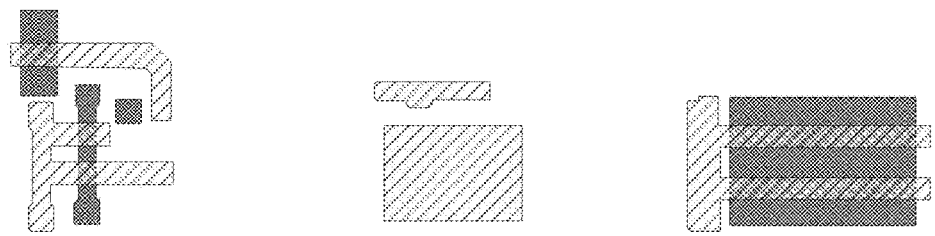
FIG. 48 is a schematic diagram after a pattern of a first conductive layer is formed in FIG. 21.

(2) A pattern of a first conductive layer is formed. In an exemplary implementation mode, forming a pattern of a first conductive layer may include: sequentially depositing a first insulation thin film and a first conductive thin film on the base substrate on which the above-mentioned pattern is formed, patterning the first conductive thin film through a patterning process to form a first insulation layer covering the pattern of the semiconductor layer and the pattern of the first conductive layer disposed on the first insulation layer, as shown in FIGS. 45 to 48, wherein FIG. 45 is a schematic diagram of a pattern of a first conductive layer in FIG. 19, FIG. 46 is a schematic diagram after a pattern of a first conductive layer is formed in FIG. 19, FIG. 47 is a schematic diagram of a pattern of a first conductive layer in FIG. 21, and FIG. 48 is a schematic diagram after a pattern of a first conductive layer is formed in FIG. 21. In an exemplary implementation mode, the first conductive layer may be referred to as a first gate metal (GATE1) layer.

In an exemplary implementation mode, as shown in FIGS. 45 to 48, the pattern of the first conductive layer may at least include a control electrode ET12 of the first light emitting transistor to a control electrode ET132 of the thirteenth light emitting transistor, a first electrode plate EC11 of the first light emitting capacitor to a first electrode plate EC31 of the third light emitting capacitor, a control electrode ST12 of the first control transistor to a control electrode ST122 of the sixteenth control transistor, a first electrode plate SC11 of the first control capacitor to a first electrode plate SC31 of the third control capacitor, a control electrode GT12 of the first scan transistor to a control electrode GT82 of the eighth scan transistor, a first electrode plate GC11 of the first scan capacitor to a first electrode plate GC21 of the second scan capacitor, the first connection line L1, the second connection line L2, and the third connection line L3, that are located in the first region, and a control electrode DET12 of the first dummy light emitting transistor, a control electrode DET22 of the second dummy light emitting transistor, a control electrode DET32 of the third dummy light emitting transistor, a first electrode plate DSC11 of the dummy control capacitor, a control electrode DST12 of the first dummy control transistor, and the dummy connection line DL, that are located in the second region.

In an exemplary implementation mode, as shown in FIGS. 45 and 46, the control electrode ET12 of the first light emitting transistor and the control electrode ET32 of the third light emitting transistor are of an integral structure. The control electrode ET62 of the sixth light emitting transistor and the first electrode plate EC11 of the first light emitting capacitor are of an integral structure. The control electrode ET92 of the ninth light emitting transistor and the first electrode plate EC21 of the second light emitting capacitor are of an integral structure. The control electrode ET42 of the fourth light emitting transistor, the control electrode ET102 of the tenth light emitting transistor, and the first electrode plate EC32 of the third light emitting capacitor are of an integral structure. The control electrode ET112 of the eleventh light emitting transistor and the control electrode ET122 of the twelfth light emitting transistor are of an integral structure. The control electrode ST12 of the first control transistor and the control electrode ST142 of the fourteenth control transistor are of an integral structure. The control electrode ST22 of the second control transistor and the control electrode ST82 of the eighth control transistor are of an integral structure. The control electrode ST62 of the sixth control transistor and the first electrode plate SC11 of the first control capacitor are of an integral structure. The control electrode ST92 of the ninth control transistor and the first electrode plate SC21 of the second control capacitor are of an integral structure. The control electrode ST112 of the eleventh control transistor and the control electrode ST152 of the fifteenth control transistor are of an integral structure. The control electrode ST142 of the fourteenth control transistor, the control electrode ST162 of the sixteenth control transistor, and the first electrode plate SC31 of the third control capacitor are of an integral structure. The control electrode GT42 of the fourth scan transistor, the control electrode GT62 of the sixth scan transistor, and the first electrode plate GC11 of the first scan capacitor are of an integral structure. The control electrode GT52 of the fifth scan transistor and the first electrode plate GC21 of the second scan capacitor are of an integral structure.

In an exemplary implementation mode, as shown in FIGS. 47 and 48, the control electrode DET12 of the first dummy light emitting transistor and the control electrode DET32 of the third dummy light emitting transistor are of an integral structure.

In an exemplary implementation mode, after the pattern of the first conductive layer is formed, the semiconductor layer may be subjected to a conductorization treatment by using the first conductive layer as a shield. The semiconductor layer in a region which is shielded by the first conductive layer forms a channel region of a transistor, and the semiconductor layer in a region which is not shielded by the first conductive layer is made to be conductorized.

Figure 49:
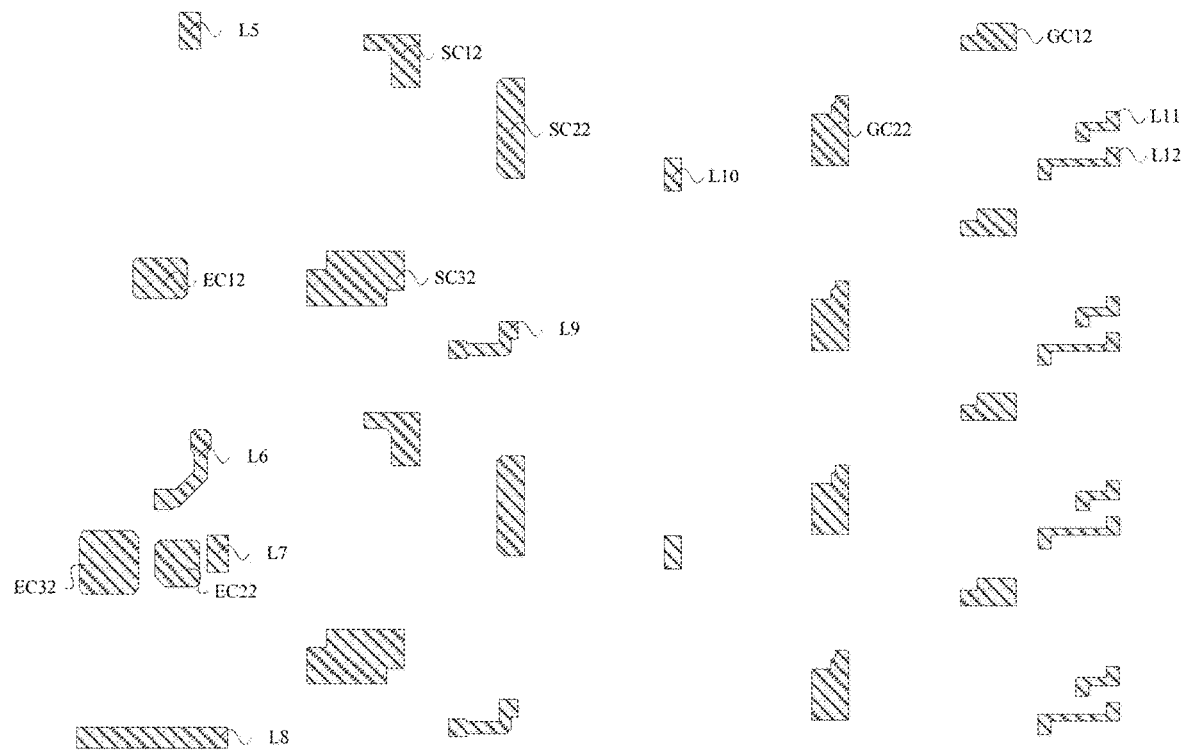
FIG. 49 is a schematic diagram of a pattern of a second conductive layer in FIG. 19.
Figure 50:
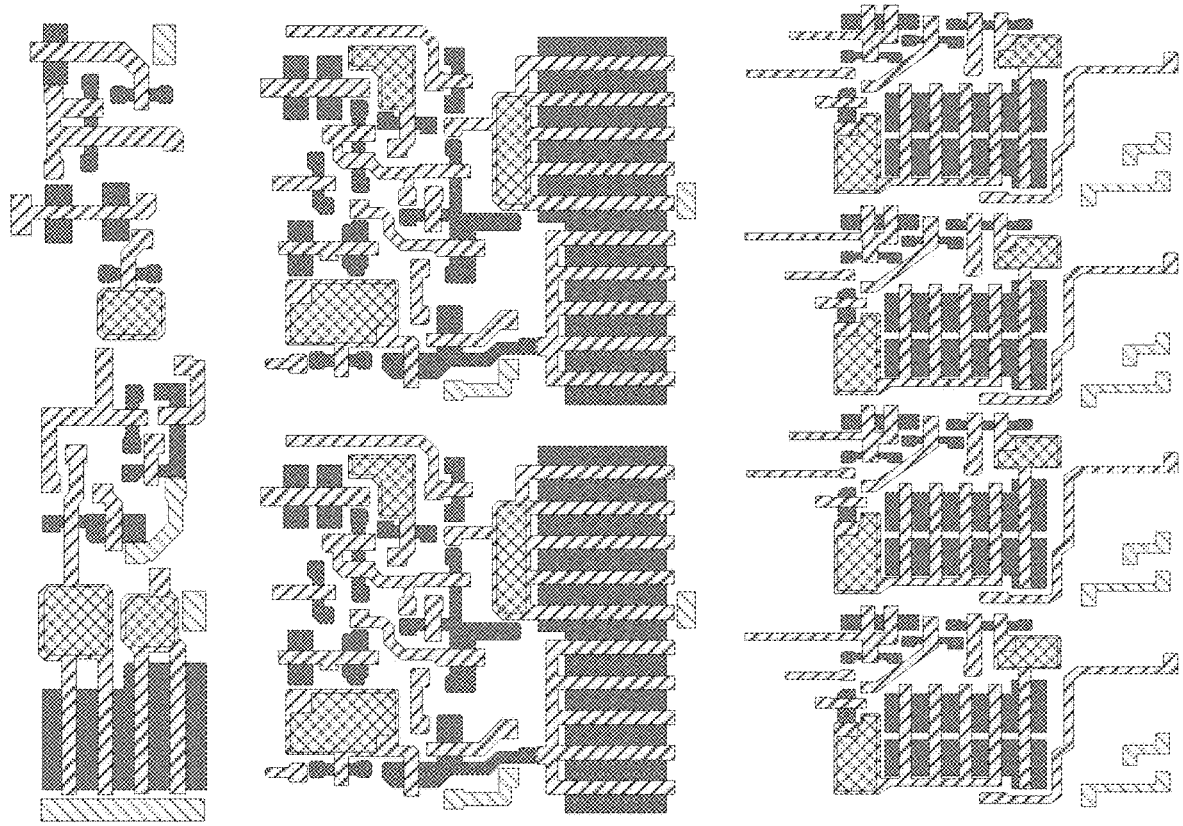
FIG. 50 is a schematic diagram after a pattern of a second conductive layer is formed in FIG. 19.
Figure 51:
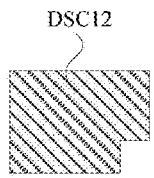
FIG. 51 is a schematic diagram of a pattern of a second conductive layer in FIG. 21.
Figure 52:
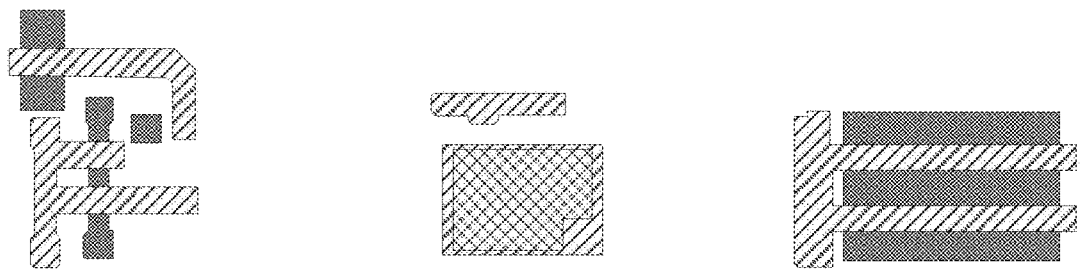
FIG. 52 is a schematic diagram after a pattern of a second conductive layer is formed in FIG. 21.

(3) A pattern of a second conductive layer is formed. In an exemplary implementation mode, forming a pattern of a second conductive layer may include: sequentially depositing a second insulation thin film and a second conductive thin film on the base substrate on which the above-mentioned patterns are formed, patterning the second conductive thin film through a patterning process to form a second insulation layer covering the pattern of the first conductive layer, and the pattern of the second conductive layer disposed on the second insulation layer, as shown in FIGS. 49 to 52, wherein FIG. 49 is a schematic diagram of a pattern of a second conductive layer in FIG. 19, FIG. 50 is a schematic diagram after a pattern of a second conductive layer is formed in FIG. 19, FIG. 51 is a schematic diagram of a pattern of a second conductive layer in FIG. 21, and FIG. 52 is a schematic diagram after a pattern of a second conductive layer is formed in FIG. 21. In an exemplary implementation mode, the second conductive layer may be referred to as a second gate metal (GATE2) layer.

In an exemplary implementation mode, as shown in FIGS. 49 to 52, the pattern of the second conductive layer may at least include a second electrode plate EC12 of the first light emitting capacitor to a second electrode plate EC32 of the third light emitting capacitor, a second electrode plate SC12 of the first control capacitor to a second electrode plate SC32 of the third control capacitor, a second electrode plate GC12 of the first scan capacitor, a second electrode plate GC32 of the second light emitting capacitor, the fourth connection line L4 to the twelfth connection line L12, that are located in the first region, and a second electrode plate DEC12 of the dummy control capacitor located in the second region.

(4) A pattern of a third insulation layer is formed. In an exemplary implementation mode, forming a pattern of a third insulation layer may include: depositing a third insulation thin film on the base substrate on which the above-mentioned patterns are formed, patterning the third insulation thin film using a patterning process to form a third insulation layer covering the second conductive layer, and patterns of a plurality of via are disposed on the third insulation layer, as shown in FIGS. 53 and 54, FIG. 53 is a schematic diagram after a pattern of a third insulation layer is formed in FIG. 19, and FIG. 54 is a schematic diagram after a pattern of a third insulation layer is formed in FIG. 21.

Figure 53:
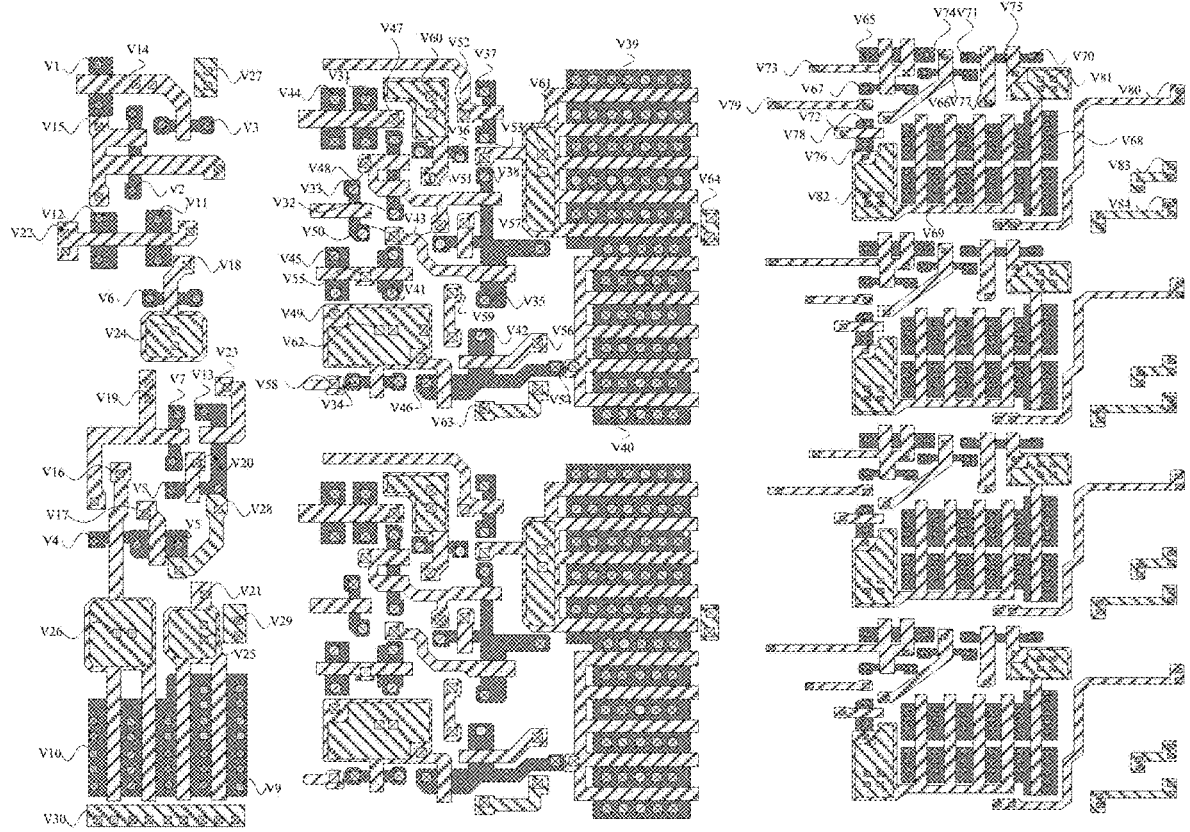
FIG. 53 is a schematic diagram after a pattern of a third insulation layer is formed in FIG. 19.
Figure 54:
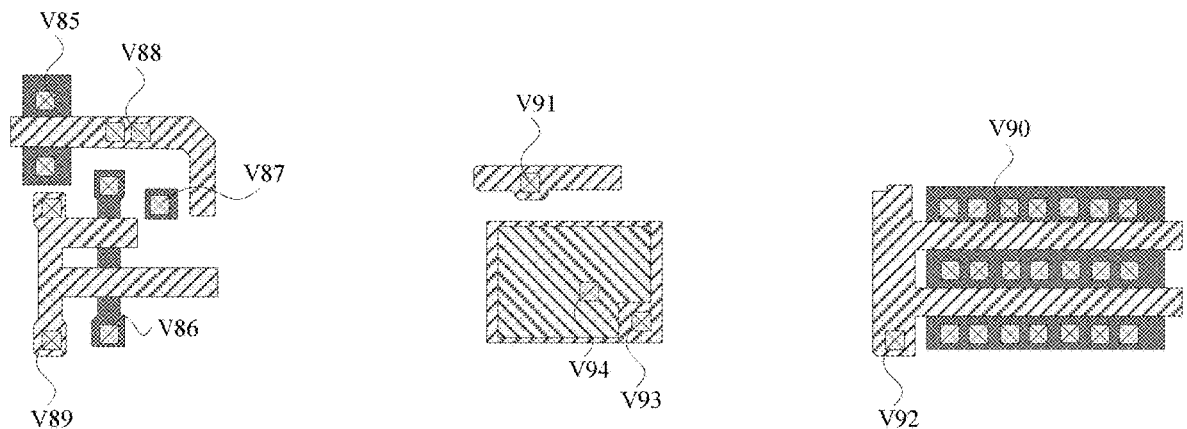
FIG. 54 is a schematic diagram after a pattern of a third insulation layer is formed in FIG. 21.

In an exemplary implementation mode, as shown in FIGS. 53 and 54, the patterns of the plurality of via may at least include a first via V1 to an eighty-fourth via V84 located in the first region and an eighty-fifth via V85 to a ninety-fourth via V94 located in the second region.

In an exemplary implementation mode, as shown in FIG. 53, the first via V1 exposes the active layer of the first light emitting transistor, the second via V2 exposes the active layer of the second light emitting transistor, the third via V3 exposes the active layer of the third light emitting transistor, the fourth via V4 exposes the active layer of the fourth light emitting transistor, the fifth via V5 exposes the active layer of the fifth light emitting transistor, the sixth via V6 exposes the active layer of the sixth light emitting transistor, the seventh via V7 exposes the active layer of the seventh light emitting transistor, the eighth via V8 exposes the active layer of the eighth light emitting transistor, the ninth via V9 exposes the active layer of the ninth light emitting transistor, the tenth via V10 exposes the active layer of the tenth light emitting transistor, the eleventh via V11 exposes the active layer of the eleventh light emitting transistor, the twelfth via V12 exposes the active layer of the twelfth light emitting transistor, the thirteenth via V13 exposes the active layer of the thirteenth light emitting transistor, the fourteenth via V14 exposes the control electrode of the first light emitting transistor (which is also the control electrode of the third light emitting transistor), the fifteenth via V15 exposes the control electrode of the second light emitting transistor, the sixteenth via V16 exposes the control electrode of the fourth light emitting transistor, the seventeenth via V17 exposes the control electrode of the fifth light emitting transistor, the eighteenth via V18 exposes the control electrode of the sixth light emitting transistor (which is also the first electrode plate of the first light emitting capacitor), the nineteenth via V19 exposes the control electrode of the seventh light emitting transistor, the twentieth via V20 exposes the control electrode of the eighth light emitting transistor, the twenty-first via V21 exposes the control electrode of the ninth light emitting transistor (which is also the second electrode plate of the second light emitting capacitor), the twenty-second via V22 exposes the control electrode of the eleventh light emitting transistor (which is also the control electrode of the twelfth light emitting transistor), the twenty-third via V23 exposes the control electrode of the thirteenth light emitting transistor, the twenty-fourth via V24 exposes the second electrode plate of the first light emitting capacitor, the twenty-fifth via V25 exposes the second electrode plate of the second light emitting capacitor, the twenty-sixth via V26 exposes the second electrode plate of the third light emitting capacitor, the twenty-seventh via V27 exposes the fifth connection line, the twenty-eighth via V28 exposes the sixth connection line, the twenty-ninth via V29 exposes a seventh connection line, and the thirtieth via V30 exposes the eighth connection line.

In an exemplary implementation mode, as shown in FIG. 53, the thirty-first via V31 exposes the active layer of the first control transistor, the thirty-second via V32 exposes the active layer of the second control transistor, the thirty-third via V33 exposes the active layer of the third control transistor, the thirty-fourth via V34 exposes the active layer of the fourth control transistor, the fifth via V35 exposes the active layer of the fifth control transistor, the thirty-sixth via V36 exposes the active layer of the sixth control transistor, the thirty-seventh via V37 exposes the active layer of the seventh control transistor, the thirty-eighth via V38 exposes the active layer of the eighth control transistor, the thirty-ninth via V39 exposes the active layer of the ninth control transistor, the fortieth via V40 exposes the active layer of the tenth control transistor, the forty-first via V41 exposes the active layer of the eleventh control transistor, the forty-second via V42 exposes the active layer of the twelfth control transistor, the forty-third via V43 exposes the active layer of the thirteenth control transistor, the forty-fourth via V44 exposes the active layer of the fourteenth control transistor, the forty-fifth via V45 exposes the active layer of the fifteenth control transistor, the forty-sixth via V46 exposes the active layer of the sixteenth control transistor, the forty-seventh via V47 exposes the control electrode of the first control transistor (which is also the control electrode of the fourteenth control transistor), the forty-eighth via V48 exposes the control electrode of the second control transistor (which is also the control electrode of the eighth control transistor), the forty-ninth via V49 exposes the control electrode of the fourth control transistor (which is also the control electrode of the sixteenth control transistor and the first electrode plate of the third control capacitor), the fiftieth via V50 exposes the control electrode of the fifth control transistor, the fifty-first via V51 exposes the control electrode of the sixth control transistor (which is also the first electrode plate of the first control capacitor), the fifty-second via V52 exposes the control electrode of the seventh control transistor, the fifty-third via V53 exposes the control electrode of the ninth control transistor (which is also the first electrode plate of the second control capacitor), the fifty-fourth via V54 exposes the control electrode of the tenth control transistor, the fifty-fifth via V55 exposes the control electrode of the eleventh control transistor (which is also the control electrode of the fifteenth control transistor), the fifty-sixth via V56 exposes the control electrode of the twelfth control transistor, the fifty-seventh via V57 exposes the control electrode of the thirteenth control transistor, the fifty-eighth via V58 exposes the first connection line, the fifty-ninth via V59 exposes the second connection line, the sixtieth via V60 exposes the second electrode plate of the first control capacitor, the sixty-first via V61 exposes the second electrode plate of the second control capacitor, the sixty-second via V62 exposes the second electrode plate of the third control capacitor, the sixty-third via V63 exposes the ninth connection line, and the sixty-fourth via V64 exposes the tenth connection line.

In an exemplary implementation mode, as shown in FIG. 53, the sixty-fifth via V65 exposes the active layer of the first scan transistor, the sixty-sixth via V66 exposes the active layer of the second scan transistor, the sixty-seventh via V67 exposes the active layer of the third scan transistor, the sixty-eighth via V68 exposes the active layer of the fourth scan transistor, the sixty-ninth via V69 exposes the active layer of the fifth scan transistor, the seventieth via V70 exposes the active layer of the sixth scan transistor, the seventy-first via V71 exposes the active layer of the seventh scan transistor, the seventy-second via V72 exposes the active layer of the eighth scan transistor, the seventy-third via V73 exposes the control electrode of the first scan transistor (which is also the control electrode of the third scan transistor), the seventy-fourth via V74 exposes the control electrode of the second scan transistor, the seventy-fifth via V75 exposes the control electrode of the fourth scan transistor (which is also the control electrode of the sixth scan transistor and the first electrode plate of the first scan capacitor), the seventy-sixth via V76 exposes the control electrode of the fifth scan transistor (which is also the first electrode plate of the second scan capacitor), the seventy-seventh via V77 exposes the control electrode of the seventh scan transistor, the seventy-eighth via V78 exposes the control electrode of the eighth scan transistor, the seventy-ninth via V79 exposes the third connection line, the eightieth via V80 exposes the fourth connection line, the eighty-first via V81 exposes the second electrode plate of the first scan capacitor, the eighty-second via V82 exposes the second electrode plate of the second scan capacitor, the eighty-third via V83 exposes the eleventh connection line, and the eighty-fourth via V84 exposes the twelfth connection line.

In an exemplary implementation mode, as shown in FIG. 54, the eighty-fifth via V85 exposes the active layer of the first dummy light emitting transistor, the eighty-sixth via V86 exposes the active layer of the second dummy light emitting transistor, the eighty-seventh via V87 exposes the active layer of the third dummy light emitting transistor, the eighty-eighth via V88 exposes the control electrode of the first dummy light emitting transistor (which is also the control electrode of the third dummy light emitting transistor), the eighty-ninth via V89 exposes the control electrode of the second dummy light emitting transistor, the ninetieth via V90 exposes the active layer of the first dummy control transistor, the ninety-first via V91 exposes the dummy connection line, the ninety-second via V92 exposes the control electrode of the first dummy control transistor, the ninety-third via V93 exposes the first electrode plate of the dummy control capacitor, and the ninety-fourth via V94 exposes the second electrode plate of the dummy control capacitor.

Figure 55:
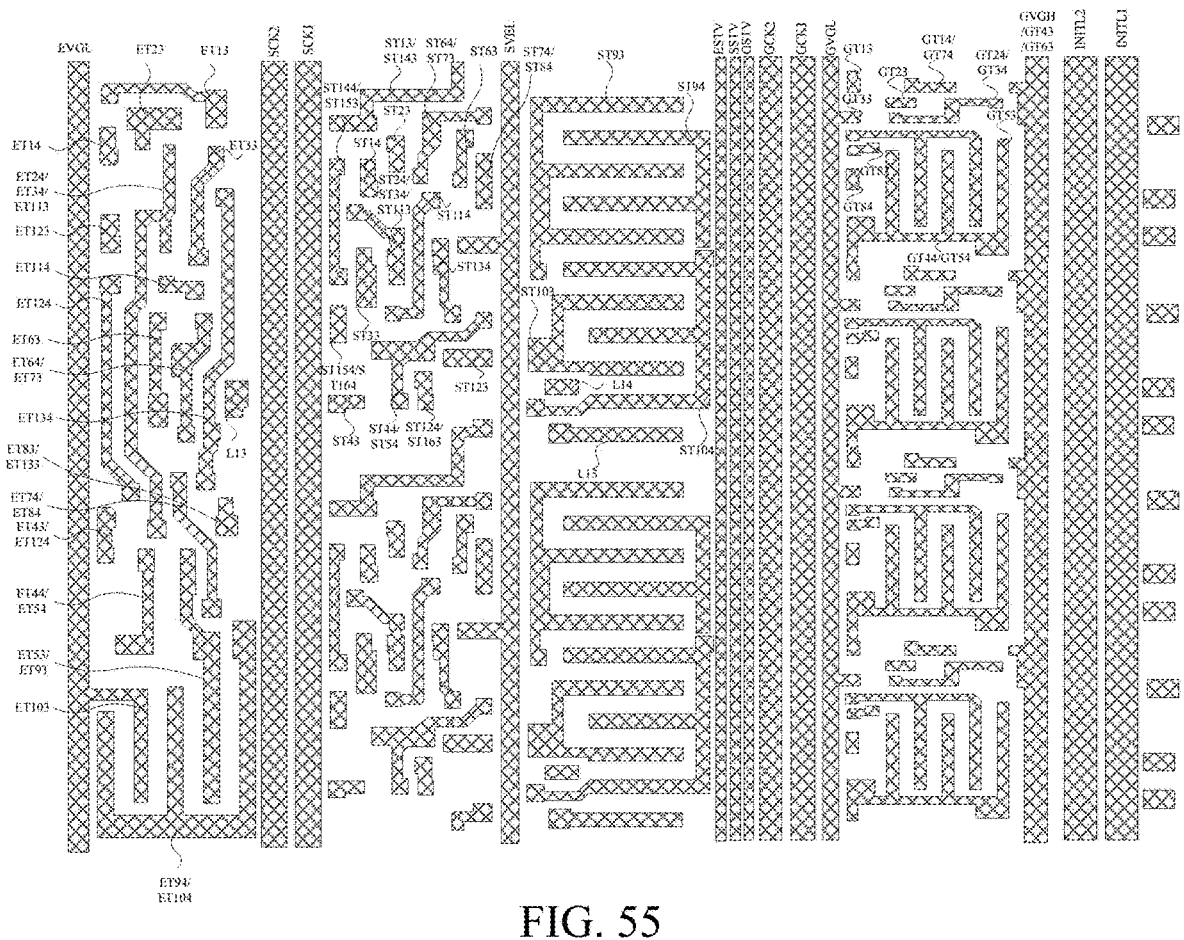
FIG. 55 is a schematic diagram of a pattern of a third conductive layer in FIG. 19.
Figure 56:
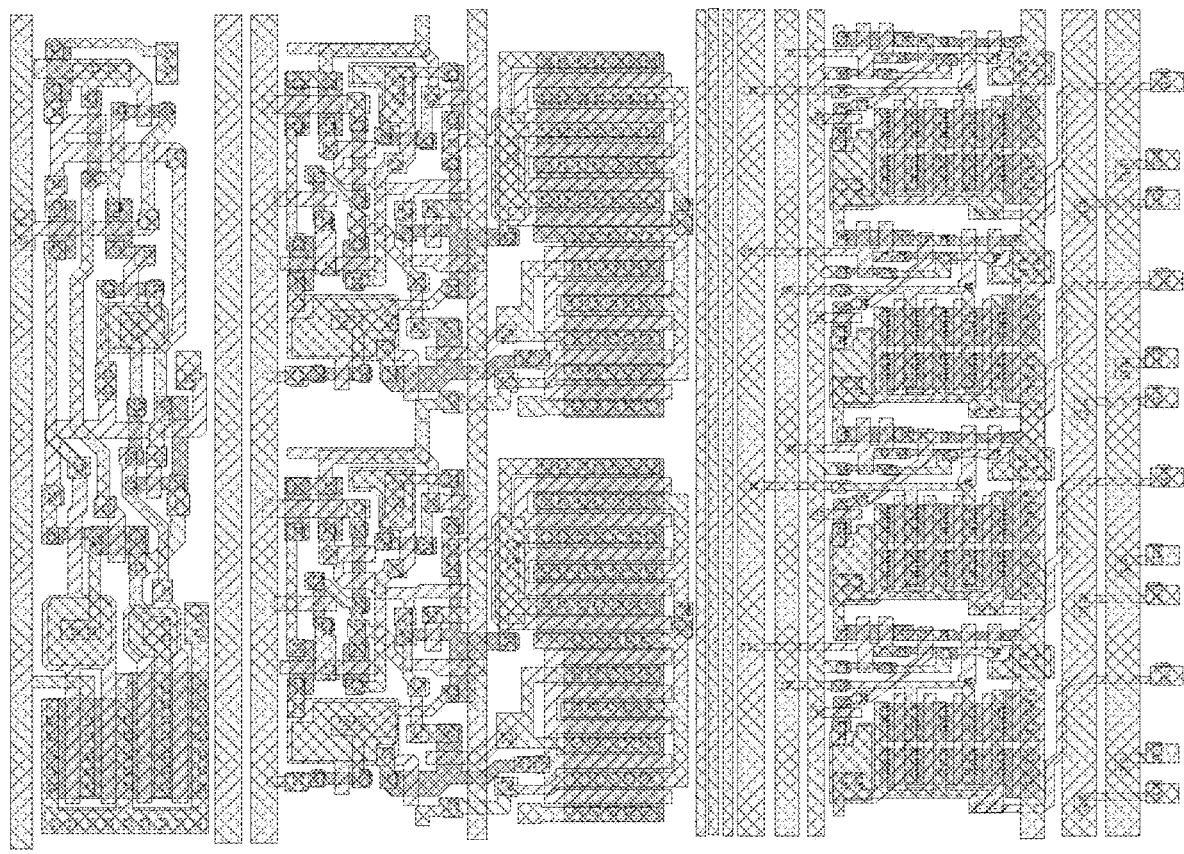
FIG. 56 is a schematic diagram after a pattern of a third conductive layer is formed in FIG. 19.
Figure 57:
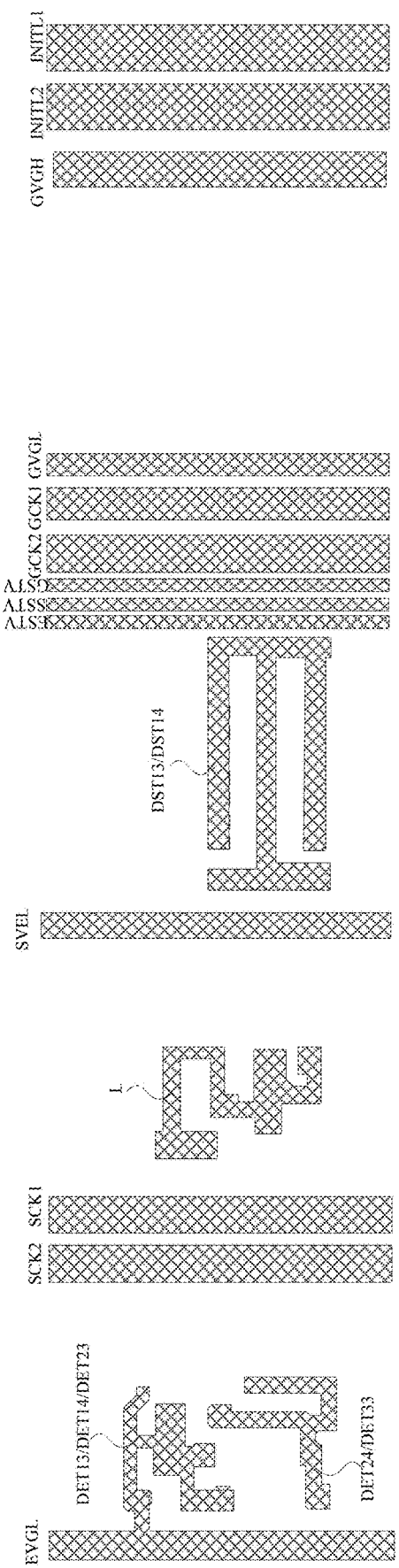
FIG. 57 is a schematic diagram of a pattern of a third conductive layer in FIG. 21.
Figure 58:
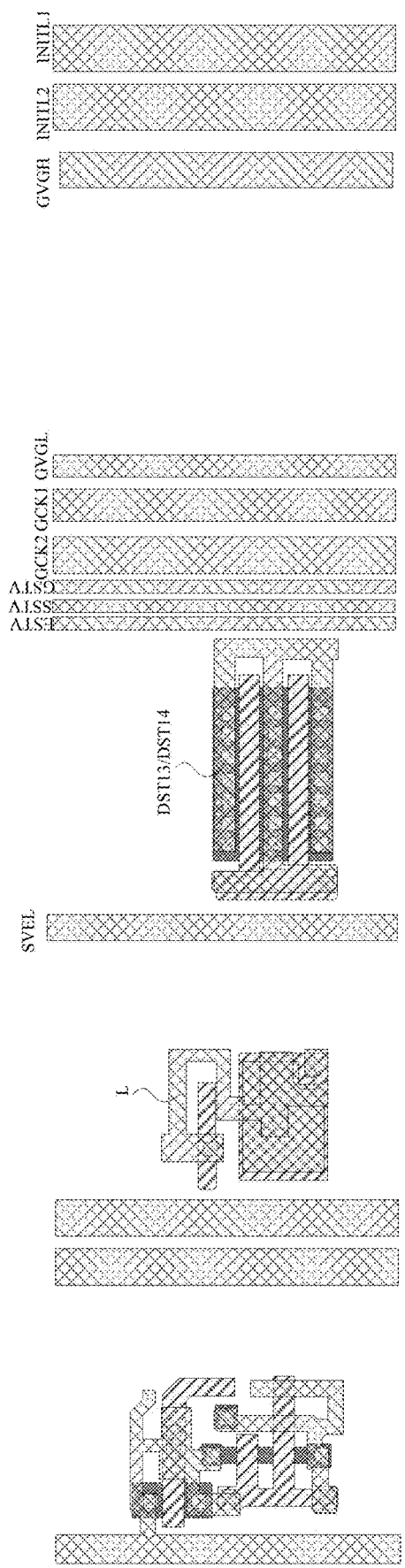
FIG. 58 is a schematic diagram after a pattern of a third conductive layer is formed in FIG. 21.

(5) A pattern of a third conductive layer is formed. In an exemplary implementation mode, forming a third conductive layer may include: depositing a third conductive thin film on the base substrate on which the above-mentioned patterns are formed, patterning the third conductive thin film using a patterning process to form a third conductive layer disposed on the third insulation layer, as shown in FIGS. 55 to 58, wherein FIG. 55 is a schematic diagram of a pattern of a third conductive layer in FIG. 19, FIG. 56 is a schematic diagram after a pattern of a third conductive layer is formed in FIG. 19, FIG. 57 is a schematic diagram of a pattern of a third conductive layer in FIG. 21, and FIG. 58 is a schematic diagram after a pattern of a third conductive layer is formed in FIG. 21. In an exemplary implementation mode, the third conductive layer may be referred to as a first source-drain metal (SD1) layer.

In an exemplary implementation mode, as shown in FIGS. 55 to 58, the pattern of the third conductive layer may at least include a light emitting initial signal line ESTV, a second light emitting power supply line EVGL, a control initial signal line SSTV, a first control clock signal line SCK1, a second control clock signal line SCK2, a third control power supply line SVEL, a scan initial signal line GSTV, a first scan clock signal line GCK1, a second scan clock signal line GCK2, a first scan power supply line GVGH, a second scan power supply line GVGL, initial power supply lines INITL1 and INITL2, and a first electrode ET13 and a second electrode ET14 of the first light emitting transistor to a first electrode ET133 and a second electrode ET132 of the thirteenth light emitting transistor, a first electrode ST13 and a second electrode ST14 of the first control transistor to a first electrode ST163 and a second electrode ST162 of the sixteenth control transistor, a first electrode GT13 and a second electrode GT14 of the first scan transistor to a first electrode GT83 and a second electrode GT84 of the eighth scan transistor, the thirteenth connection line L13, the fourteenth connection line L14, and the fifteenth connection line L15, that are located in the first region, and a first electrode DET13 and a second electrode DET14 of the first dummy light emitting transistor, a first electrode DET23 and a second electrode DET24 of the second dummy light emitting transistor, a first electrode DET33 of the third dummy light emitting transistor, and a first electrode DST13 and a second electrode DGT14 of the first control light emitting transistor, that are located in the second region.

In an exemplary implementation mode, as shown in FIGS. 55 and 56, the second electrode ET24 of the second light emitting transistor, the second electrode ET34 of the third light emitting transistor, and the first electrode ET113 of the eleventh light emitting transistor are of an integral structure. The first electrode ET43 of the fourth light emitting transistor and the second electrode ET124 of the twelfth light emitting transistor are of an integral structure, and the second electrode ET44 of the fourth light emitting transistor and the second electrode ET54 of the fifth light emitting transistor are of an integral structure. The first electrode ET53 of the fifth light emitting transistor and the first electrode ET93 of the ninth transistor are of an integral structure. The second electrode ET64 of the sixth light emitting transistor and the first electrode ET73 of the seventh light emitting transistor are of an integral structure. The first electrode ET83 of the eighth light emitting transistor and the first electrode ET133 of the thirteenth light emitting transistor are of an integral structure. The second electrode ET74 of the seventh light emitting transistor and the second electrode ET84 of the eighth light emitting transistor are of an integral structure. The second electrode ET94 of the ninth light emitting transistor and the second electrode ET104 of the tenth light emitting transistor are of an integral structure. The first electrode ET103 of the tenth light emitting transistor and the second light emitting power supply line EVGL are of an integral structure.

In an exemplary implementation mode, as shown in FIG. 56, the first electrode of the first light emitting transistor is electrically connected with the active layer of the first light emitting transistor through the first via and is electrically connected with the fifth connection line through the twenty-seventh via. The second electrode of the first light emitting transistor is electrically connected with the active layer of the first light emitting transistor through the first via and is electrically connected with the control electrode of the second light emitting transistor through the fifteenth via. The first electrode of the second light emitting transistor is electrically connected with the active layer of the second light emitting transistor through the second via, and is electrically connected with the control electrode of the first light emitting transistor (which is also the control electrode of the third light emitting transistor) through the fourteenth via. The second electrode of the second light emitting transistor (which is also the second electrode of the third light emitting transistor and the first electrode of the eleventh light emitting transistor) is electrically connected with the active layer of the second light emitting transistor through the second via, is electrically connected with the active layer of the third light emitting transistor through the third via, is electrically connected with the active layer of the eleventh light emitting transistor through the eleventh via, and is electrically connected with the control electrode of the fifth light emitting transistor through the seventeenth via. The first electrode of the third light emitting transistor is electrically connected with the active layer of the third light emitting transistor through the third via, and is electrically connected with the control electrode of the eleventh light emitting transistor (which is also the control electrode of the twelfth light emitting transistor) through the twenty-second via. The first electrode of the fourth light emitting transistor (which is also the second electrode of the twelfth light emitting transistor) is electrically connected with the active layer of the fourth light emitting transistor through the fourth via, is electrically connected with the active layer of the twelfth light emitting transistor through the twelfth via, and is electrically connected with the control electrode of the seventh light emitting transistor through the nineteenth via. The second electrode of the fourth light emitting transistor (which is also the second electrode of the fifth light emitting transistor) is electrically connected with the active layer of the fourth light emitting transistor through the fourth via, is electrically connected with the active layer of the fifth light emitting transistor through the fifth via, and is electrically connected with the second electrode plate of the third light emitting capacitor through the twenty-sixth via. The first electrode of the fifth light emitting transistor (which is also the first electrode of the ninth transistor) is electrically connected with the active layer of the fifth light emitting transistor through the fifth via, is electrically connected with the active layer of the ninth light emitting transistor through the ninth via, is electrically connected with the sixth connection line through the twenty-eighth via, and is electrically connected with the second electrode plate of the second light emitting capacitor through the twenty-fifth via. The first electrode of the sixth light emitting transistor is electrically connected with the active layer of the sixth light emitting transistor through the sixth via, and is electrically connected with the control electrode of the seventh light emitting transistor through the nineteenth via. The second electrode of the sixth light emitting transistor (which is also the first electrode of the seventh light emitting transistor) is electrically connected with the active layer of the sixth light emitting transistor through the sixth via, is electrically connected with the active layer of the seventh light emitting transistor through the seventh via, and is electrically connected with the second electrode plate of the first light emitting capacitor through the twenty-fourth via. The second electrode of the seventh light emitting transistor (which is also the second electrode of the eighth light emitting transistor) is electrically connected with the active layer of the seventh light emitting transistor through the seventh via, is electrically connected with the active layer of the eighth light emitting transistor through the eighth via, and is electrically connected with the control electrode of the ninth light emitting transistor (which is also the first electrode plate of the second light emitting capacitor) through the twenty-first via. The first electrode of the eighth light emitting transistor (which is also the first electrode of the thirteenth light emitting transistor) is electrically connected with the active layer of the eighth light emitting transistor through the eighth via, is electrically connected with the active layer of the thirteenth light emitting transistor through the thirteenth via, and is electrically connected with the sixth connection line through the twenty-eighth via. The second electrode of the ninth light emitting transistor (which is also the second electrode of the tenth light emitting transistor) is electrically connected with the active layer of the ninth light emitting transistor through the ninth via, and is electrically connected with the active layer of the tenth light emitting transistor through the tenth via, is electrically connected with the seventh connection line through the twenty-ninth via, and is electrically connected with the eighth connection line through the thirtieth via. The first electrode of the tenth light emitting transistor electrically connected with the active layer of the tenth light emitting transistor through the tenth via. The second electrode of the eleventh light emitting transistor is electrically connected with the active layer of the eleventh light emitting transistor through the eleventh via and is electrically connected with the control electrode of the sixth light emitting transistor (which is also the first electrode plate of the first light emitting capacitor) through the eighteenth via. The first electrode of the twelfth light emitting transistor is electrically connected with the active layer of the twelfth light emitting transistor through the twelfth via, and is electrically connected with the control electrode of the second light emitting transistor through the fifteenth via. The second electrode of the twelfth light emitting transistor is electrically connected with the active layer of the twelfth light emitting transistor through the twelfth via, and is electrically connected with the control electrode of the fourth light emitting transistor through the sixteenth via. The second electrode of the thirteenth light emitting transistor is electrically connected with the active layer of the thirteenth light emitting transistor through the thirteenth via, is electrically connected with the control electrode of the second light emitting transistor through the fifteenth via, and is electrically connected with the control electrode of the eighth light emitting transistor through the twentieth via. The control electrode of the eleventh light emitting transistor (which is also the control electrode of the twelfth light emitting transistor) is electrically connected with the second light emitting power supply line through the twenty-second via.

In an exemplary implementation mode, as shown in FIGS. 55 and 56, the first electrode ST13 of the first control transistor and the first electrode ST143 of the fourteenth control transistor are of an integral structure. The second electrode ST24 of the second control transistor, the second electrode ST34 of the third control transistor, and the first electrode ST113 of the eleventh control transistor are of an integral structure. The second electrode ST44 of the fourth control transistor and the second electrode ST54 of the fifth control transistor are of an integral structure. The second electrode ST64 of the sixth control transistor and the first electrode ST73 of the seventh control transistor are of an integral structure. The second electrode ST74 of the seventh control transistor and the first electrode ST84 of the eighth control transistor are of an integral structure. The second electrode ST124 of the twelfth control transistor and the first electrode ST163 of the sixteenth control transistor are of an integral structure. The second electrode ST144 of the fourteenth control transistor and the first electrode ST153 of the fifteenth control transistor are of an integral structure. The second electrode ST154 of the fifteenth control transistor and the second electrode ST164 of the sixteenth control transistor are of an integral structure.

In an exemplary implementation mode, as shown in FIG. 56, the first electrode of the first control transistor (which is also the first electrode of the fourteenth control transistor) is electrically connected with the active layer of the first control transistor through the thirty-first via and is electrically connected with the active layer of the fourteenth control transistor through the forty-fourth via. The second electrode of the first control transistor is electrically connected with the active layer of the first control transistor through the thirty-first via and is electrically connected with the control electrode of the second control transistor (which is also the control electrode of the eighth control transistor) through the forty-eighth via. The first electrode of the second control transistor is electrically connected with the active layer of the second control transistor through the thirty-second via and is electrically connected with the control electrode of the first control transistor (which is also the control electrode of the fourteenth control transistor) through the forty-seventh via. The second electrode of the second control transistor (which is also the second electrode of the third control transistor and the first electrode of the eleventh control transistor) is electrically connected with the active layer of the second control transistor through the thirty-second via, is electrically connected with the active layer of the third control transistor through the thirty-third via, is electrically connected with the active layer of the eleventh control transistor through the forty-first via, and is electrically connected with the control electrode of the fifth control transistor through the fiftieth via. The first electrode of the third control transistor is electrically connected with the active layer of the third control transistor through the thirty-third via, and is electrically connected with the control electrode of the eleventh control transistor (which is also the control electrode of the twelfth control transistor) through the fifty-fifth via. The first electrode of the fourth control transistor is electrically connected with the active layer of the fourth control transistor through the thirty-fourth via, and is electrically connected with the first connection line through the fifty-eighth via. The second electrode of the fourth control transistor (which is also the second electrode of the fifth control transistor) is electrically connected with the active layer of the fourth control transistor through the thirty-fourth via, is electrically connected with the active layer of the fifth control transistor through the thirty-fifth via, and is electrically connected with the second electrode plate of the third control capacitor through the sixty-second via. The first electrode of the sixth control transistor is electrically connected with the active layer of the sixth control transistor through the thirty-sixth via, and is electrically connected with the control electrode of the seventh control transistor through the fifty-second via. The second electrode of the sixth control transistor (which is also the first electrode of the seventh control transistor) is electrically connected with the active layer of the sixth control transistor through the thirty-sixth via, is electrically connected with the active layer of the seventh control transistor through the thirty-seventh via, and is electrically connected with the second electrode plate of the first control capacitor through the sixtieth via. The second electrode of the seventh control transistor (which is also the second electrode of the eighth control transistor) is electrically connected with the active layer of the seventh control transistor through the thirty-seventh via, is electrically connected with the active layer of the eighth control transistor through the thirty-eighth via, and is electrically connected with the control electrode of the ninth control transistor (which is also the first electrode plate of the second control capacitor) through the fifty-third via. The first electrode of the ninth control transistor is electrically connected with the active layer of the ninth control transistor through the thirty-ninth via and is electrically connected with the second electrode plate of the second control capacitor through the sixty-first via. The second electrode of the ninth control transistor is electrically connected with the active layer of the ninth control transistor through the thirty-ninth via and is electrically connected with the tenth connection line through the sixty-fourth via. The first electrode of the tenth control transistor is electrically connected with the active layer of the tenth control transistor through the fortieth via, and is electrically connected with the control electrode of the twelfth control transistor through the fifty-sixth via. The second electrode of the ninth control transistor is electrically connected with the active layer of the tenth control transistor through the fortieth via, is electrically connected with the ninth connection line through the sixty-third via, and is electrically connected with the tenth connection line through the sixty-fourth via. The second electrode of the eleventh control transistor is electrically connected with the active layer of the eleventh control transistor through the forty-first via, and is electrically connected with the control electrode of the sixth control transistor (which is also the first electrode plate of the first control capacitor) through the fifty-first via. The first electrode of the twelfth control transistor is electrically connected with the active layer of the twelfth control transistor through the forty-second via, and is electrically connected with the second connection line through the fifty-ninth via. The second electrode of the twelfth control transistor (which is also the first electrode of the sixteenth control transistor) is electrically connected with the active layer of the twelfth control transistor through the forty-second via, is electrically connected with the control electrode of the fourth control transistor through the forty-sixth via, and is electrically connected with the control electrode of the fourth control transistor (which is also the control electrode of the sixteenth control transistor and the first electrode plate of the third control capacitor) through the forty-ninth via. The second electrode of the thirteenth control transistor is electrically connected with the active layer of the thirteenth control transistor through the forty-third via, is electrically connected with the control electrode of the second control transistor (which is also the control electrode of the eighth control transistor) through the forty-eighth via, and is electrically connected with the second connection line through the fifty-ninth via. The second electrode of the fourteenth control transistor (which is also the first electrode of the fifteenth control transistor) is electrically connected with the active layer of the forty-third control transistor through the forty-fourth via, is electrically connected with the active layer of the fifteenth control transistor through the forty-fifth via. The second electrode of the fifteenth control transistor (which is also the second electrode of the sixteenth control transistor) is electrically connected with the active layer of the fifteenth control transistor through the forty-fifth via, is electrically connected with the active layer of the sixteenth control transistor through the forty-sixth via, and is electrically connected with the control electrode of the fourth control transistor (which is also the control electrode of the sixteenth control transistor and the first electrode plate of the third control capacitor) through the forty-ninth via.

The third control power supply line is electrically connected with the control electrode of the thirteenth control transistor through the fifty-seventh via.

In an exemplary implementation mode, as shown in FIGS. 55 and 56, the second electrode GT14 of the first scan transistor and the second electrode GT74 of the seventh scan transistor are of an integral structure, the second electrode GT24 of the second scan transistor and the second electrode GT34 of the third scan transistor are of an integral structure, the first electrode GT33 of the third scan transistor and the second scan power supply line GVGL are of an integral structure, the second electrode GT44 of the fourth scan transistor and the second electrode GT54 of the fifth scan transistor are of an integral structure, and the first electrode GT43 of the fourth scan transistor, the first electrode GT63 of the sixth scan transistor, and the first scan power supply line GVGH are of an integral structure.

In an exemplary implementation mode, as shown in FIG. 56, the first electrode of the first scan transistor is electrically connected with the active layer of the first scan transistor through the sixty-fifth via, the second electrode of the first scan transistor (which is also the second electrode of the seventh scan transistor) is electrically connected with the active layer of the first scan transistor through the sixty-fifth via, is electrically connected with the active layer of the seventh scan transistor through the seventy-first via, and is electrically connected with the control electrode of the second scan transistor through the seventy-fourth via. The first electrode of the second scan transistor is electrically connected with the active layer of the second scan transistor through the sixty-sixth via, and is electrically connected with the control electrode of the first scan transistor (which is also the control electrode of the third scan transistor) through the seventy-third via. The first electrode of the second scan transistor (which is also the second electrode of the third scan transistor) is electrically connected with the active layer of the second scan transistor through the sixty-sixth via, is electrically connected with the active layer of the third scan transistor through the sixty-seventh via, and is electrically connected with the control electrode of the fourth scan transistor (which is also the control electrode of the sixth scan transistor and the first electrode plate of the first scan capacitor) through the seventy-fifth via. The first electrode of the third scan transistor is electrically connected with the active layer of the third scan transistor through the sixty-seventh via, the first electrode of the fourth scan transistor (which is also the first electrode of the sixth scan transistor) is electrically connected with the active layer of the fourth scan transistor through the sixty-eighth via, is electrically connected with the active layer of the sixth scan transistor through the seventieth via, and is electrically connected with the second electrode plate of the first scan capacitor through the eighty-first via. The second electrode of the fourth scan transistor (which is also the second electrode of the fifth scan transistor) is electrically connected with the active layer of the fourth scan transistor through the sixty-eighth via, is electrically connected with the active layer of the fifth scan transistor through the sixty-ninth via, is electrically connected with the second electrode plate of the second scan capacitor through the eighty-second via, and is electrically connected with the fourth connection line through the eightieth via. The first electrode of the fifth scan transistor is electrically connected with the active layer of the fifth scan transistor through the sixty-ninth via, is electrically connected with the second electrode plate of the second scan capacitor through the eighty-second via, is electrically connected with the third connection line through the seventy-ninth via, is electrically connected with the fourth connection line through the eightieth via, and is electrically connected with the control electrode of the seventh scan transistor through the seventy-seventh via. The first electrode of the eighth scan transistor is electrically connected with the active layer of the eighth scan transistor through the seventy-second via, and is electrically connected with the control electrode of the second scan transistor through the seventy-fourth via. The second electrode of the eighth scan transistor is electrically connected with the active layer of the eighth scan transistor through the seventy-second via, and is electrically connected with the control electrode of the fifth scan transistor (which is also the first electrode plate of the second scan capacitor) through the seventy-sixth via. The control electrode of the eighth scan transistor is electrically connected with one of the first scan clock signal line and the second scan clock signal line through the seventy-eighth via. The control electrode of the first scan transistor (which is also the control electrode of the third scan transistor) is electrically connected with the other signal line of the first scan clock signal line and the second scan clock signal line through the seventy-third via, the first initial power supply line is electrically connected with the eleventh connection line through the eighty-third via, and the second initial power supply line is electrically connected with the twelfth connection line through the eighty-fourth via.

In an exemplary implementation mode, as shown in FIGS. 57 and 58, the first electrode DET13 and the second electrode DET14 of the first dummy light emitting transistor, and the first electrode DET23 of the second dummy light emitting transistor are of an integral structure with the second light emitting power supply line EVGL. The second electrode DET24 of the second dummy light emitting transistor and the second electrode DET33 of the third dummy light emitting transistor are of an integral structure. The first electrode DST13 and the second electrode DST14 of the first control light emitting transistor are of an integral structure.

In an exemplary implementation mode, as shown in FIG. 58, the first electrode of the first dummy light emitting transistor (which is also the second electrode of the first dummy light emitting transistor and the first electrode of the second dummy light emitting transistor) is electrically connected with the active layer of the first dummy light emitting transistor through the eighty-fifth via, is electrically connected with the active layer of the second dummy light emitting transistor through the eighty-sixth via, is electrically connected with the control electrode of the first dummy light emitting transistor (which is also the control electrode of the third dummy light emitting transistor) through the eighty-eighth via, and is electrically connected with the control electrode of the second dummy light emitting transistor through the eighty-ninth via. The second electrode of the second dummy light emitting transistor (which is also the second electrode of the third dummy light emitting transistor) is electrically connected with the active layer of the second dummy light emitting transistor through the eighty-sixth via, is electrically connected with the active layer of the third dummy light emitting transistor through the eighty-seventh via, and is electrically connected with the control electrode of the second dummy light emitting transistor through the eighty-ninth via.

In an exemplary implementation mode, as shown in FIG. 58, the first electrode of the first control light emitting transistor (which is also the second electrode of the first control light emitting transistor) is electrically connected with the active layer of the first dummy control transistor through the ninetieth via, and is electrically connected with the control electrode of the first dummy control transistor through the ninety-second via. A connection line is electrically connected with the dummy connection line through the ninety-first via, is electrically connected with the first electrode plate of the dummy control capacitor through the ninety-third via, and is electrically connected with the second electrode plate of the dummy control capacitor through the ninety-fourth via.

(6) A pattern of a planarization layer is formed. In an exemplary implementation mode, forming a pattern of a planarization layer may include: depositing a fourth insulation thin film on the base substrate on which the above-mentioned patterns are formed, coating a planarization thin film on the fourth insulation thin film, patterning the fourth insulation thin film and the planarization thin film using a patterning process to form a fourth insulation layer and a planarization layer covering the third conductive layer, and patterns of a plurality of via are disposed on the planarization layer, as shown in FIGS. 59 and 60, FIG. 59 is a schematic diagram after a pattern of a planarization layer is formed in FIG. 19, and FIG. 60 is a schematic diagram after a pattern of a planarization layer is formed in FIG. 21.

Figure 59:
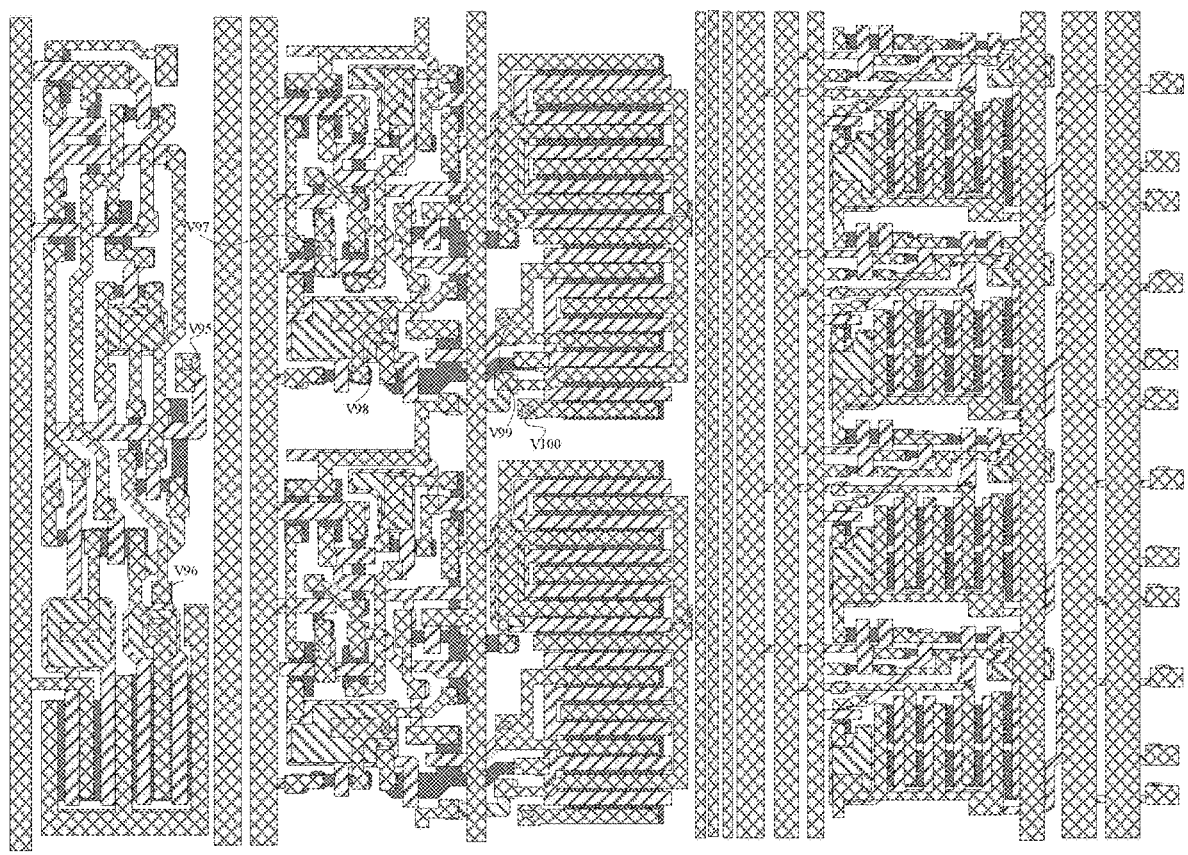
FIG. 59 is a schematic diagram after a pattern of a planarization layer is formed in FIG. 19.
Figure 60:
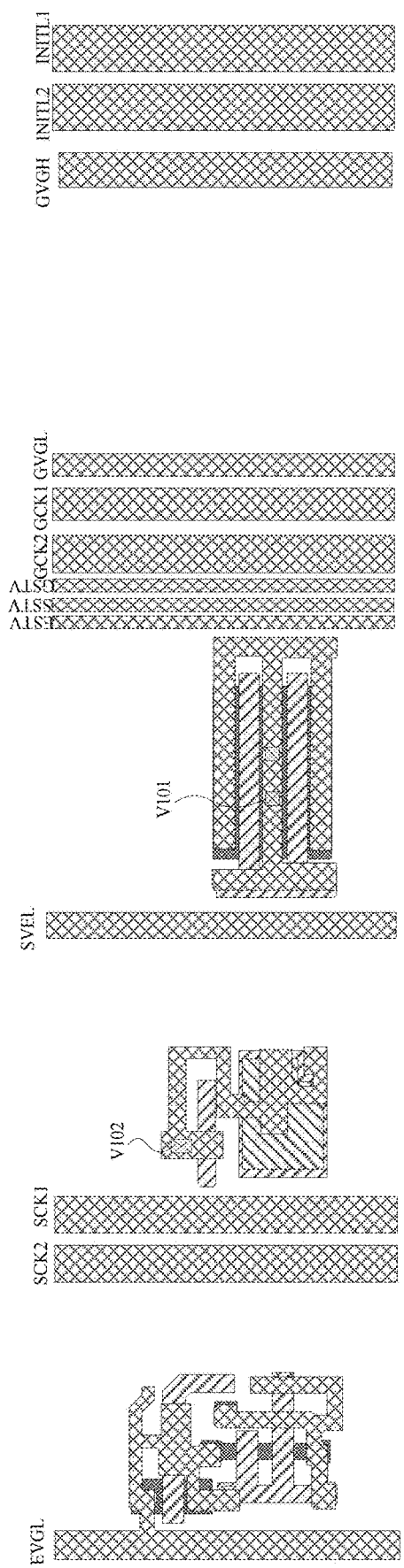
FIG. 60 is a schematic diagram after a pattern of a planarization layer is formed in FIG. 21.

In an exemplary implementation mode, as shown in FIGS. 59 and 60, the patterns of the plurality of via may at least include a ninety-fifth via V95 to a hundredth via V100 located in the first region and a hundred-first via V101 to a hundred-second via V102 located in the second region.

In an exemplary implementation mode, as shown in FIG. 59, the ninety-fifth via V95 exposes the thirteenth connection line, the ninety-sixth via V96 exposes the first electrode of the fifth light emitting transistor (which is also the first electrode of the ninth control transistor), the ninety-seventh via V97 exposes the first electrode of the third control transistor, the ninety-eighth via V98 exposes the second electrode of the fourth control transistor (which is also the second electrode of the fifth control transistor), the ninety-ninth via V99 exposes the first electrode of the tenth control transistor, and the hundredth via V100 exposes the fifteenth connection line L15.

In an exemplary implementation mode, as shown in FIG. 60, the hundred-first via V101 exposes the first electrode of the first control light emitting transistor (which is also the second electrode of the first control light emitting transistor), and the hundred-second via V102 exposes the connection line.

Figure 61:
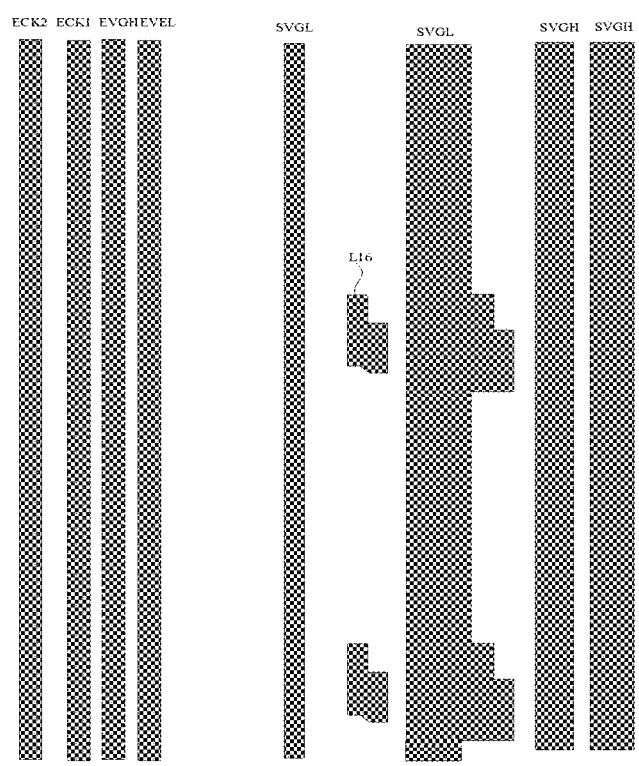
FIG. 61 is a schematic diagram of a pattern of a fourth conductive layer in FIG. 19.
Figure 62:
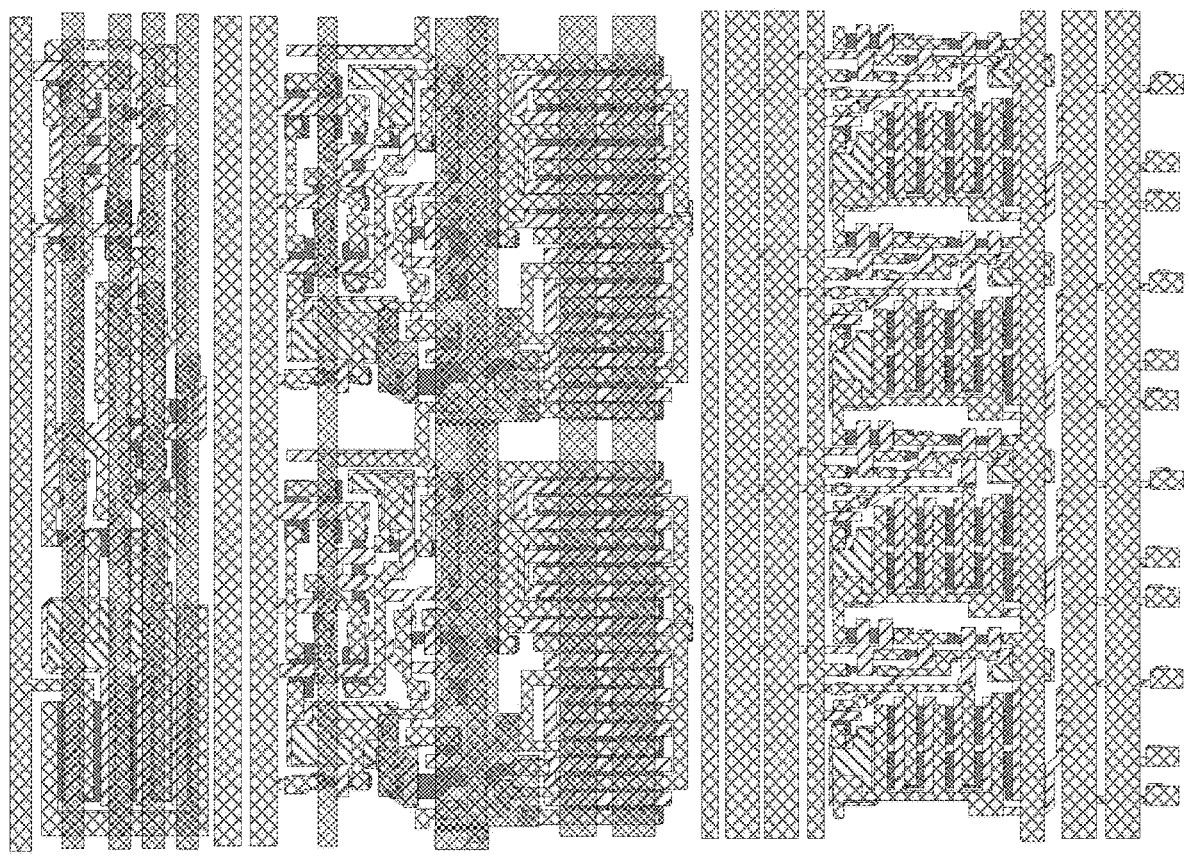
FIG. 62 is a schematic diagram after a pattern of a fourth conductive layer is formed in FIG. 19.
Figure 63:
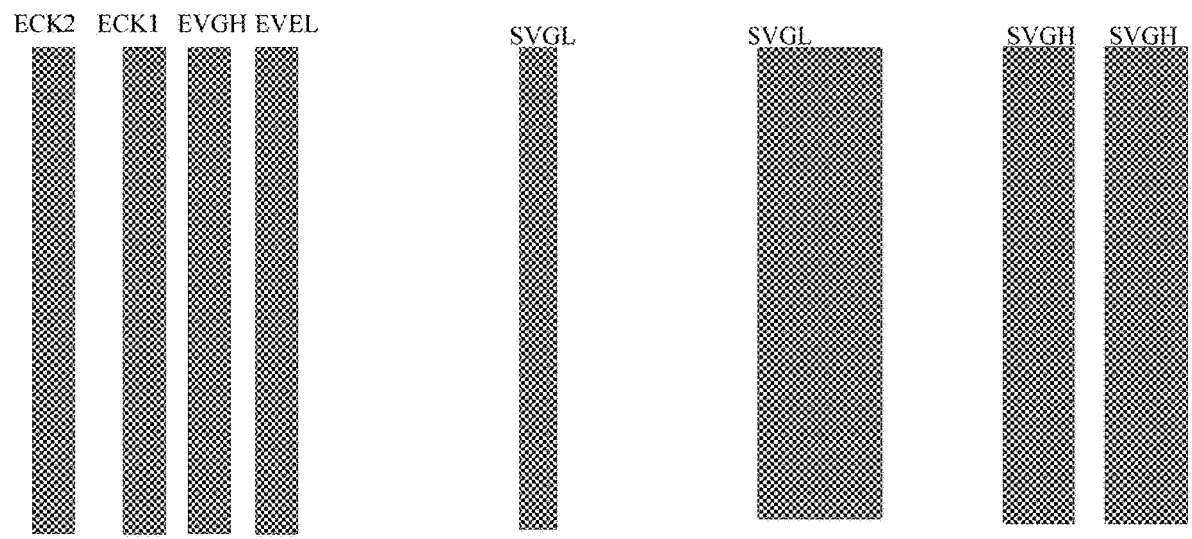
FIG. 63 is a schematic diagram of a pattern of a fourth conductive layer in FIG. 21.
Figure 64:
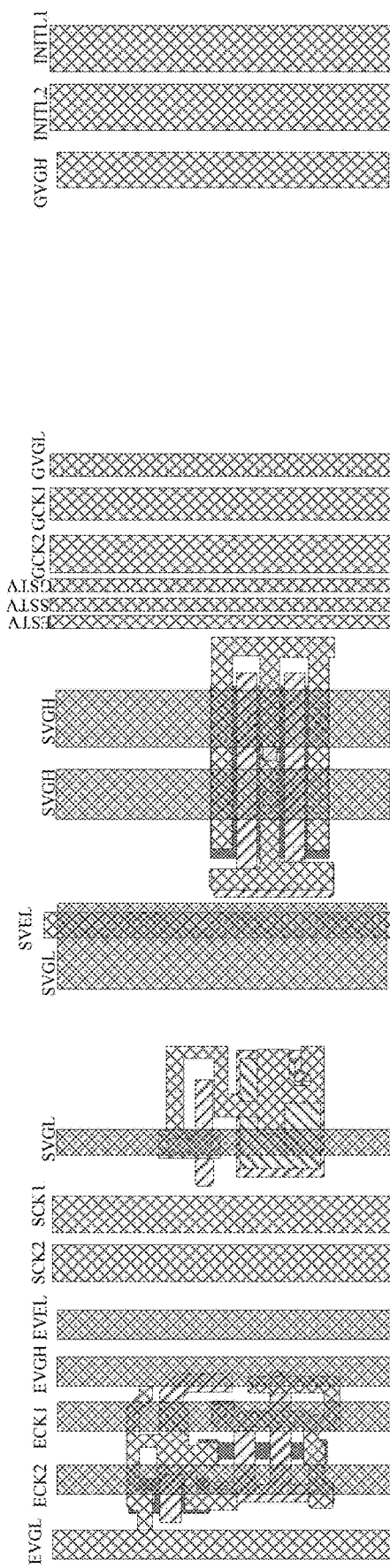
FIG. 64 is a schematic diagram after a pattern of a fourth conductive layer is formed in FIG. 21.

(7) A pattern of a fourth conductive layer is formed. In an exemplary implementation mode, forming a fourth conductive layer may include: depositing a fourth conductive thin film on the base substrate on which the above-mentioned patterns are formed, patterning the fourth conductive thin film using a patterning process to form the fourth conductive layer disposed on the planarization layer, as shown in FIGS. 61 to 64, wherein FIG. 61 is a schematic diagram of a pattern of a fourth conductive layer in FIG. 19, FIG. 62 is a schematic diagram after a pattern of a fourth conductive layer is formed in FIG. 19, FIG. 63 is a schematic diagram of a pattern of a fourth conductive layer in FIG. 21, and FIG. 64 is a schematic diagram after a pattern of a fourth conductive layer is formed in FIG. 21. In an exemplary implementation mode, the fourth conductive layer may be referred to as a second source-drain metal (SD2) layer.

In an exemplary implementation mode, as shown in FIGS. 61 to 64, the fourth conductive layer may at least include a first light emitting clock signal line ECK1, a second light emitting clock signal line ECK2, a first light emitting power supply line EVGH, a third light emitting power supply line EVEL, a first control power supply line SVGH, and a second control power supply line SVGL, and a sixteenth connection line L16 located in the first region.

In an exemplary implementation mode, as shown in FIG. 62, the third light emitting power supply line EVEL is electrically connected with the thirteenth connection line through the ninety-fifth via, the first light emitting power supply line EVGH is electrically connected with the first electrode of the fifth light emitting transistor (which is also the first electrode of the ninth control transistor) through the ninety-sixth via. The second control power supply line SVGL is electrically connected with the first electrode of the third control transistor through the ninety-seventh via, is electrically connected with the first electrode of the tenth control transistor through the ninety-ninth via, and is electrically connected with the fifteenth connection line through the hundredth via. The sixteenth connection line is electrically connected with the second electrode of the fourth control transistor (which is also the second electrode of the fifth control transistor) through the ninety-eighth via.

In an exemplary implementation mode, as shown in FIG. 62, the first control power supply line SVGH is electrically connected with the first electrode of the first control light emitting transistor (which is also the second electrode of the first control light emitting transistor) through the hundred-first via V101, and the second control power supply line SVGL is electrically connected with the connection line through the hundred-second via.

At this point, the drive circuit layer of the display substrate provided in FIG. 16A is prepared on the base substrate. The drive circuit layer may include the semiconductor layer, the first insulation layer, the first conductive layer, the second insulation layer, the second conductive layer, the third insulation layer, the third conductive layer, the fourth insulation layer, the planarization layer, and the fourth conductive layer that are sequentially disposed on the base substrate.

In an exemplary implementation mode, the semiconductor layer may be a metal oxide layer. For the metal oxide layer, an oxide containing indium and tin, an oxide containing tungsten and indium, an oxide containing tungsten and indium and zinc, an oxide containing titanium and indium, an oxide containing titanium and indium and tin, an oxide containing indium and zinc, an oxide containing silicon and indium and tin, or an oxide containing indium or gallium and zinc, may be adopted. The metal oxide layer may be a single layer, a double-layer, or a multi-layer. An active layer thin film may be made of an amorphous Indium Gallium Zinc Oxide (a-IGZO), Zinc OxyNitride (ZnON), Indium Zinc Tin Oxide (IZTO), amorphous Silicon (a-Si), polycrystalline Silicon (p-Si), hexathiophene, polythiophene, and other materials, that is, the present disclosure is applicable to transistors manufactured based on an oxide technology, a silicon technology, and an organic matter technology.

In an exemplary implementation mode, the first conductive layer, the second conductive layer, the third conductive layer, and the fourth conductive layer may be made of a metal material, such as any one or more of Argentum (Ag), Copper (Cu), Aluminum (Al), and Molybdenum (Mo), or an alloy material of the above metals, such as an Aluminum Neodymium alloy (AlNd) or a Molybdenum Niobium alloy (MoNb), and may be of a single-layer structure or a multi-layer composite structure, such as Mo/Cu/Mo.

In an exemplary implementation mode, the first insulation layer, the second insulation layer, the third insulation layer, and the fourth insulation layer may be made of any one or more of Silicon Oxide (SiOx), Silicon Nitride (SiNx), and Silicon Oxynitride (SiON), and may be a single layer, a multi-layer, or a composite layer. The first insulation layer and the second insulation layer may be referred to as Gate Insulation (GI) layers, and the third insulation layer and the fourth insulation layer may be referred to as Interlayer Dielectric (ILD) layers.

In an exemplary implementation mode, the planarization layer may be made of an organic material.

In an exemplary implementation mode, after preparation of the drive circuit layer is completed, a light emitting structure layer is prepared on the drive circuit layer, and a preparation process of the light emitting structure layer may include following operations.

A light emitting structure layer is formed. In an exemplary implementation mode, forming a light emitting structure layer may include: coating a first planarization thin film on the base substrate on which the above-mentioned patterns are formed, patterning the first planarization thin film using a patterning process to form a first planarization layer, depositing an anode conductive thin film on the base substrate on which the above-mentioned patterns are formed, patterning the anode conductive thin film using a patterning process to form an anode conductive layer disposed on the planarization layer, the anode conductive layer at least includes patterns of a plurality of anodes, coating a pixel definition thin film on the base substrate on which the above-mentioned patterns are formed, patterning the pixel definition thin film using a patterning process to form a pixel definition layer, forming an organic emitting layer using an evaporation process and inkjet printing process on the base substrate on which the above-mentioned patterns first, then forming a cathode on the organic emitting layer, and then forming an encapsulation structure layer.

In an exemplary implementation mode, the encapsulation structure layer may include a first encapsulation layer, a second encapsulation layer, and a third encapsulation layer that are stacked. The first encapsulation layer and the third encapsulation layer may be made of an inorganic material, and the second encapsulation layer may be made of an organic material. The second encapsulation layer is disposed between the first encapsulation layer and the third encapsulation layer, which may ensure that external water vapor cannot enter the light emitting structure layer.

In an exemplary implementation mode, a material of the pixel definition layer may include polyimide, acrylic, or polyethylene terephthalate.

In an exemplary implementation mode, an anode thin film may be made of Indium Tin Oxide (ITO) or Indium Zinc Oxide (IZO).

In an exemplary implementation mode, a cathode thin film may be made of any one or more of Magnesium (Mg), Argentum (Ag), Aluminum (Al), Copper (Cu), and Lithium (Li), or an alloy made of any one or more of the above metals.

The display substrate according to the embodiment of the present disclosure may be applied to a display product with any resolution.

An embodiment of the present disclosure also provides a display apparatus, including a display substrate.

In an exemplary implementation mode, the display apparatus may be any product or component with any display function, such as a display, a television, a mobile phone, a tablet computer, a navigator, a digital photo frame, and a wearable display product.

The display substrate is the display substrate according to any of the aforementioned embodiments, and has similar implementation principles and implementation effects, which will not be repeated here.

The drawings in the present disclosure relate only to structures involved in the embodiments of the present disclosure, and other structures may be referred to conventional designs.

For the sake of clarity, a thickness and size of a layer or a micro structure are enlarged in the accompanying drawings used for describing the embodiments of the present disclosure. It may be understood that when an element such as a layer, film, region, or substrate is described as being "on" or "under" another element, the element may be "directly" located "on" or "under" the another element, or there may be an intermediate element.

Although implementation modes disclosed in the present disclosure are as above, the described contents are only implementation modes used for convenience of understanding the present disclosure and are not intended to limit the present disclosure. Any skilled person in the art to which the present disclosure pertains may make any modification and alteration in forms and details of implementation without departing from the spirit and scope of the present disclosure. However, the patent protection scope of the present disclosure should be subject to the scope defined in the appended claims.

The invention claimed is:

1. A display substrate, comprising: a base substrate and a drive circuit layer disposed on the base substrate, wherein the base substrate comprises: a display region and a non-display region, the drive circuit layer comprises: a pixel drive circuit located in the display region and a gate drive circuit located in the non-display region; a boundary of the display region comprises an arc-shaped boundary, and a non-display region located on an outside of the arc-shaped boundary is a rounded corner region, the rounded corner region comprises a plurality of first regions and at least one second region;

the gate drive circuit is configured to provide a drive signal to the pixel drive circuit, and is partially located within a first region, the second region is located between two adjacent first regions, two boundary lines of the second region which are used to separate from the two adjacent first regions are not parallel, and an area of the second region is smaller than that of the first region, wherein the second region is provided with a dummy via when an included angle between first regions located on two sides of the second region is smaller than a threshold angle value;

the second region is provided with a dummy register when the included angle between the first regions located on two sides of the second region is larger than the threshold angle value.

2. The display substrate according to claim 1, wherein the drive circuit layer further comprises: at least one of the dummy register and the dummy via.

3. The display substrate according to claim 1, wherein the threshold angle value is within a range of 10 degrees to 14 degrees.

4. The display substrate according to claim 2, wherein when the drive circuit layer comprises the dummy register, a structure of the dummy register is the same as that of a part of the gate drive circuit.

5. The display substrate according to claim 2, wherein when the drive circuit layer comprises the dummy via, the drive circuit layer further comprises: a dummy active layer, an orthographic projection of the dummy via on the base substrate is at least partially overlapped with an orthographic projection of the dummy active layer on the base substrate, and the dummy active layer is exposed.

6. The display substrate according to claim 5, wherein the display region comprises a plurality of sub-pixels in which a plurality of transistors and vias exposing active layers of the plurality of transistors are provided;
 a ratio between a sum of areas of all dummy vias located in the second region and an area of the second region is a first ratio, and a ratio between a sum of areas of all vias located in a sub-pixel and an area of the sub-pixel is a second ratio, the first ratio and the second ratio are approximately equal.

7. The display substrate according to claim 2, wherein the boundary of the display region further comprises: a straight line boundary connected with the arc-shaped boundary, a non-display region located on an outside of the straight line boundary is a straight line region, and a part of the gate drive circuit is located in the straight line region;
 the gate drive circuit comprises a plurality of drive circuits, wherein an arrangement direction of a plurality of drive circuits located in the rounded corner region is an extension direction of a boundary of at least one first region close to the second region, and an arrangement direction of a plurality of drive circuits located in the straight line region is not parallel with an extension direction of the straight line boundary;
 the first region is provided with a partial circuit of each drive circuit.

8. The display substrate according to claim 7, wherein the pixel drive circuit comprises: a light emitting transistor and a writing transistor, and the plurality of drive circuits comprise: a light emitting drive circuit and a scan drive circuit, the light emitting drive circuit is electrically connected with the light emitting transistor, the scan drive circuit is electrically connected with the writing transistor, and the scan drive circuit is located on a side of the light emitting drive circuit close to the display region;
 the light emitting drive circuit comprises a plurality of cascaded light emitting shift registers, and the scan drive circuit comprises a plurality of cascaded scan shift registers;
 the first region is provided with one light emitting shift register and at least one scan shift register.

9. The display substrate according to claim 8, wherein the drive circuit layer further comprises: a light emitting initial signal line, a first light emitting clock signal line, a second light emitting clock signal line, a first light emitting power supply line, a second light emitting power supply line, a scan initial signal line, a first scan clock signal line, a second scan clock signal line, a first scan power supply line, and a second scan power supply line that are located in the non-display region;
 the light emitting drive circuit is electrically connected with the light emitting initial signal line, the first light emitting clock signal line, the second light emitting clock signal line, the first light emitting power supply line, and the second light emitting power supply line, respectively, and is located between the first light emitting power supply line and the second light emitting power supply line; the scan drive circuit is electrically connected with the scan initial signal line, the second scan clock signal line, the first scan clock signal line, the first scan power supply line, and the second scan power supply line, respectively, and is located between the first scan power supply line and the second scan power supply line;
 the second light emitting clock signal line is located on a side of the light emitting initial signal line close to the display region, the first light emitting clock signal line is located on a side of the second light emitting clock signal line close to the display region, the second light emitting power supply line is located on a side of the first light emitting clock signal line close to the display region, the first light emitting power supply line is located on a side of the second light emitting power supply line close to the display region, the scan initial signal line is located on a side of the first light emitting power supply line close to the display region, the second scan clock signal line is located on a side of the scan initial signal line close to the display region, the first scan clock signal line is located on a side of the scan initial signal line close to the display region, the second scan power supply line is located on a side of the first scan clock signal line close to the display region, and the first scan power supply line is located on a side of the second scan power supply line close to the display region.

10. The display substrate according to claim 9, wherein a first signal line located in the straight line region has a shape of a straight line and an extension direction is the same as the extension direction of the straight line boundary, the first signal line is any one of the light emitting initial signal line, the first light emitting clock signal line, the second light emitting clock signal line, the first light emitting power supply line, the second light emitting power supply line, the scan initial signal line, the first scan clock signal line, the second scan clock signal line, the first scan power supply line, and the second scan power supply line;
 a first signal line located in the rounded corner region has a shape of a bending line and is composed of a plurality of straight line segments, an extension direction of a straight line segment is the same as an extension direction of a boundary of a first region or the second region where the straight line segment is located away from the display region.

11. The display substrate according to claim 9, wherein the light emitting shift register comprises a plurality of light emitting transistors and a plurality of light emitting capacitors, the scan shift register comprises a plurality of scan transistors and a plurality of scan capacitors, the light emitting capacitors and the scan capacitors each comprise a first electrode plate and a second electrode plate, and the drive circuit layer comprises: a semiconductor layer, a first conductive layer, a second conductive layer, and a third conductive layer stacked sequentially;
 the semiconductor layer at least comprises active layers of the plurality of light emitting transistors and active layers of the plurality of scan transistors;
 the first conductive layer at least comprises control electrodes of the plurality of light emitting transistors, first electrode plates of the plurality of light emitting capacitors, control electrodes of the plurality of scan transistors, and first electrode plates of the plurality of scan capacitors;

the second conductive layer at least comprises second electrode plates of the plurality of light emitting capacitors and second electrode plates of the plurality of scan capacitors;

the third conductive layer at least comprises the light emitting initial signal line, the first light emitting clock signal line, the second light emitting clock signal line, the first light emitting power supply line, the second light emitting power supply line, the scan initial signal line, the first scan clock signal line, the second scan clock signal line, the first scan power supply line, the second scan power supply line, first electrodes and second electrodes of the plurality of light emitting transistors, and first electrodes and second electrodes of the plurality of scan transistors.

12. The display substrate according to claim 11, wherein when the second region comprises a dummy register, the dummy register comprises: at least one of a dummy light emitting shift register and a dummy scan shift register;

the dummy light emitting shift register is electrically connected with at least one of the first light emitting power supply line and the second light emitting power supply line, and is located between the first light emitting power supply line and the second light emitting power supply line, and the dummy scan shift register is electrically connected with at least one of the first scan power supply line and the second scan power supply line, and is located between the first scan power supply line and the second scan power supply line.

13. The display substrate according to claim 11, wherein the semiconductor layer further comprises a dummy active layer when the second region comprises a dummy via;

the drive circuit layer further comprises a first insulation layer, a second insulation layer, and a third insulation layer which are stacked sequentially, wherein the first insulation layer is located between the semiconductor layer and the first conductive layer, the second insulation layer is located between the first conductive layer and the second conductive layer, and the third insulation layer is located between the second conductive layer and the third conductive layer, and the dummy via is disposed on the first insulation layer, the second insulation layer, and the third insulation layer.

14. The display substrate according to claim 11, wherein the drive circuit layer further comprises: at least one initial power supply line located in the non-display region;

the initial power supply line is configured to provide an initial signal to the pixel drive circuit, the initial power supply line is located on a side of the first scan power supply line close to the display region and is located on the third conductive layer.

15. The display substrate according to claim 7, wherein the pixel drive circuit comprises: a light emitting transistor, a writing transistor, and a control transistor, the plurality of drive circuits comprise a light emitting drive circuit, a control drive circuit, and a scan drive circuit, the light emitting drive circuit is electrically connected with the light emitting transistor, the scan drive circuit is electrically connected with the writing transistor, and the control drive circuit is electrically connected with the control transistor, transistor types of the writing transistor and the control transistor are opposite, the control drive circuit is located on a side of the light emitting drive circuit close to the display region, and the scan drive circuit is located on a side of the control drive circuit close to the display region;

the light emitting drive circuit comprises a plurality of cascaded light emitting shift registers, the control drive circuit comprises a plurality of cascaded control shift registers, and the scan drive circuit comprises a plurality of cascaded scan shift registers;

the first region is provided with one light emitting shift register, at least one control shift register, and at least one scan shift register.

16. The display substrate according to claim 15, wherein the drive circuit layer further comprises: a light emitting initial signal line, a first light emitting clock signal line, a second light emitting clock signal line, a first light emitting power supply line, a second light emitting power supply line, a third light emitting power supply line, a control initial signal line, a first control clock signal line, a second control clock signal line, a first control power supply line, a second control power supply line, a third control power supply line, a scan initial signal line, a first scan clock signal line, a second scan clock signal line, a first scan power supply line, and a second scan power supply line that are located in the non-display region;

the light emitting drive circuit is electrically connected with the light emitting initial signal line, the first light emitting clock signal line, the second light emitting clock signal line, the first light emitting power supply line, the second light emitting power supply line, and the third light emitting power supply line, and an orthographic projection of the light emitting drive circuit on the base substrate is partially overlapped with orthographic projections of the first light emitting clock signal line, the second light emitting clock signal line, the first light emitting power supply line, and the third light emitting power supply line on the base substrate, the control drive circuit is electrically connected with the control initial signal line, the first control clock signal line, the second control clock signal line, the first control power supply line, the second control power supply line, and the third control power supply line respectively, the control drive circuit is located between the second control clock signal line and the control initial signal line, and an orthographic projection of the control drive circuit on the base substrate is partially overlapped with orthographic projections of the first control power supply line, the second control power supply line, and the third control power supply line on the base substrate, the scan drive circuit is electrically connected with the scan initial signal line, the first scan clock signal line, the second scan clock signal line, the first scan power supply line, and the second scan power supply line respectively, and is located between the first scan power supply line and the second scan power supply line;

the second light emitting clock signal line is located on a side of the second light emitting power supply line close to the display region, the first light emitting clock signal line is located on a side of the second light emitting clock signal line close to the display region, the first light emitting power supply line is located on a side of the first light emitting clock signal line close to the display region, the third light emitting power supply line is located on a side of the first light emitting power supply line close to the display region, the second control clock signal line is located on a side of the third light emitting power supply line close to the display region, the first control clock signal line is located on a side of the second light emitting power supply line close to the display region, the second control power supply line is located on a side of the first control clock signal line close to the display region, the first control power supply line is located on a side of the second control power supply line close to the display region, the light emitting initial signal line is located on a side of the first control power supply line close to the display region, the control initial signal line is located on a side of the light emitting initial signal line close to the display region, the scan initial signal line is located on a side of the control initial signal line close to the display region, the second scan clock signal line is located on a side of the scan initial signal line close to the display region, the first scan clock signal line is located on a side of the scan initial signal line close to the display region, the second scan power supply line is located on a side of the first scan clock signal line close to the display region, the first scan power supply line is located on a side of the second scan power supply line close to the display region, and an orthographic projection of the second control power supply line on the base substrate is at least partially overlapped with an orthographic projection of the third control power supply line on the base substrate.

17. The display substrate according to claim 16, wherein a second signal line located in the straight line region has a shape of a straight line and an extension direction is the same as the extension direction of the straight line boundary; the second signal line is any one of the light emitting initial signal line, the first light emitting clock signal line, the second light emitting clock signal line, the first light emitting power supply line, the second light emitting power supply line, the third light emitting power supply line, the control initial signal line, the first control clock signal line, the second control clock signal line, the first control power supply line, the second control power supply line, the third control power supply line, the scan initial signal line, the first scan clock signal line, the second scan clock signal line, the first scan power supply line, and the second scan power supply line;

a second signal line located in the rounded corner region has a shape of a bending line and is composed of a plurality of straight line segments, an extension direction of a straight line segment is the same as an extension direction of a boundary of a first region or the second region where the straight line segment is located away from the display region.

18. The display substrate according to claim 16, wherein the light emitting shift register comprises a plurality of light emitting transistors and a plurality of light emitting capacitors, the control shift register comprises a plurality of control transistors and a plurality of control capacitors, the scan shift register comprises a plurality of scan transistors and a plurality of scan capacitors, the light emitting capacitors, the control capacitors, and the scan capacitors each comprise a first electrode plate and a second electrode plate, and the drive circuit layer comprises: a semiconductor layer, a first conductive layer, a second conductive layer, a third conductive layer, and a fourth conductive layer stacked sequentially;

the semiconductor layer at least comprises active layers of the plurality of light emitting transistors, active layers of the plurality of control transistors, and active layers of the plurality of scan transistors;

the first conductive layer at least comprises control electrodes of the plurality of light emitting transistors, first electrode plates of the plurality of light emitting capacitors, control electrodes of the plurality of control transistors, first electrode plates of the plurality of control capacitors, control electrodes of the plurality of scan transistors, and first electrode plates of the plurality of scan capacitors;

the second conductive layer at least comprises second electrode plates of the plurality of light emitting capacitors, second electrode plates of the plurality of control capacitors, and second electrode plates of the plurality of scan capacitors;

the third conductive layer at least comprises the second light emitting power supply line, the first control clock signal line, the second control clock signal line, the third control power supply line, the light emitting initial signal line, the control initial signal line, the scan initial signal line, the first scan clock signal line, the second scan clock signal line, the first scan power supply line, the second scan power supply line, first electrodes and second electrodes of the plurality of light emitting transistors, first electrodes and second electrodes of the plurality of control transistors, and first electrodes and second electrodes of the plurality of scan transistors;

the fourth conductive layer at least comprises the first light emitting clock signal line, the second light emitting clock signal line, the first light emitting power supply line, the third light emitting power supply line, the first control power supply line, and the second control power supply line.

19. A display apparatus, comprising a display substrate according to claim 1.

* * * * *